United States Patent
Brightman et al.

(10) Patent No.: US 7,100,020 B1
(45) Date of Patent: Aug. 29, 2006

(54) DIGITAL COMMUNICATIONS PROCESSOR

(75) Inventors: Thomas B. Brightman, North Hampton, NH (US); Andrew T. Brown, Fort Collins, CO (US); John F. Brown, Wellesley, MA (US); James A. Farrell, Harvard, MA (US); Andrew D. Funk, Boxford, MA (US); David J. Husak, Windham, NH (US); Edward J. McLellan, Holliston, MA (US); Mark A. Sankey, Acton, MA (US); Paul Schmitt, Princeton, MA (US); Donald A. Priore, Maynard, MA (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/674,864

(22) PCT Filed: May 7, 1999

(86) PCT No.: PCT/US99/10002

§ 371 (c)(1),
(2), (4) Date: Mar. 30, 2001

(87) PCT Pub. No.: WO99/59078

PCT Pub. Date: Nov. 18, 1999

Related U.S. Application Data

(60) Provisional application No. 60/105,823, filed on Oct. 27, 1998, provisional application No. 60/084,706, filed on May 8, 1998.

(51) Int. Cl.
*G06F 15/00* (2006.01)

(52) U.S. Cl. .......................... 712/18; 712/13; 712/14; 712/15; 712/16; 712/17; 712/35; 712/36; 712/37; 709/231; 709/232; 709/236; 709/238

(58) Field of Classification Search ................ 709/201, 709/231, 232, 236, 238; 712/13–18, 32, 712/35–37
See application file for complete search history.

(56) References Cited

U.S. PATENT DOCUMENTS

| | | | | |
|---|---|---|---|---|
| 5,105,424 A | * | 4/1992 | Flaig et al. | 709/243 |
| 5,230,057 A | * | 7/1993 | Shido et al. | 712/22 |
| 5,257,379 A | * | 10/1993 | Cwiakala et al. | 713/1 |
| 5,371,860 A | * | 12/1994 | Mura et al. | 710/22 |
| 5,444,853 A | * | 8/1995 | Lentz | 711/123 |
| 5,526,051 A | * | 6/1996 | Gove et al. | 375/240.01 |
| 5,535,406 A | * | 7/1996 | Kolchinsky | 712/10 |
| 5,546,343 A | * | 8/1996 | Elliott et al. | 365/189.04 |

(Continued)

*Primary Examiner*—Nabil El-Hady
(74) *Attorney, Agent, or Firm*—Gordon E. Nelson

(57) ABSTRACT

An integrated circuit (203) for use in processing streams of data generally and streams of packets in particular. The integrated circuit (203) includes a number of packet processors (307, 313, 303), a table look up engine (301), a queue management engine (305) and a buffer management engine (315). The packet processors (307, 313, 303) include a receive processor (421), a transmit processor (427) and a risc core processor (401), all of which are programmable. The receive processor (421) and the core processor (401) cooperate to receive and route packets being received and the core processor (401) and the transmit processor (427) cooperate to transmit packets. Routing is done by using information from the table look up engine (301) to determine a queue (215) in the queue management engine (305) which is to receive a descriptor (217) describing the received packet's payload.

9 Claims, 47 Drawing Sheets

U.S. PATENT DOCUMENTS

| | | | |
|---|---|---|---|
| 5,682,491 A * | 10/1997 | Pechanek et al. | 712/209 |
| 5,701,507 A * | 12/1997 | Bonneau et al. | 716/8 |
| 5,784,076 A * | 7/1998 | Crump et al. | 345/519 |
| 5,784,636 A * | 7/1998 | Rupp | 712/37 |
| 5,794,060 A * | 8/1998 | Hansen et al. | 712/1 |
| 5,809,176 A * | 9/1998 | Yajima | 382/247 |
| 5,828,858 A * | 10/1998 | Athanas et al. | 710/317 |
| 5,870,436 A * | 2/1999 | Kolanek et al. | 375/316 |
| 5,872,988 A * | 2/1999 | Duranton | 712/22 |
| 6,055,619 A * | 4/2000 | North et al. | 712/36 |
| 6,128,307 A * | 10/2000 | Brown | 370/412 |
| 6,163,539 A * | 12/2000 | Alexander et al. | 370/392 |
| 6,172,990 B1 * | 1/2001 | Deb et al. | 370/474 |
| 6,192,073 B1 * | 2/2001 | Reader et al. | 375/240.23 |
| 6,195,739 B1 * | 2/2001 | Wright et al. | 712/19 |
| 6,205,543 B1 * | 3/2001 | Tremblay et al. | 712/228 |
| 6,216,179 B1 * | 4/2001 | Murata et al. | 710/8 |
| 6,292,483 B1 * | 9/2001 | Kerstein | 370/389 |
| 6,295,299 B1 * | 9/2001 | Haddock et al. | 370/423 |
| 6,324,164 B1 * | 11/2001 | Luijten et al. | 370/230 |
| 6,643,285 B1 * | 11/2003 | Vincent et al. | 370/389 |

* cited by examiner

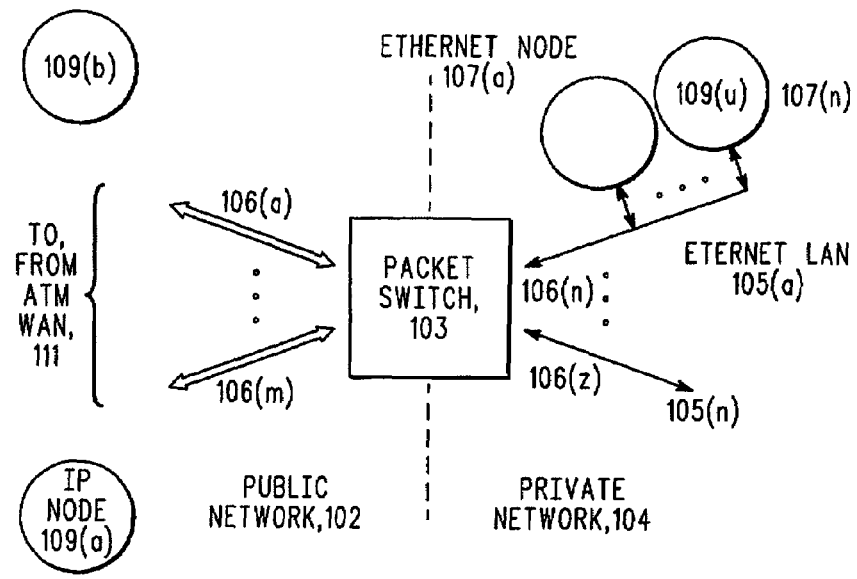
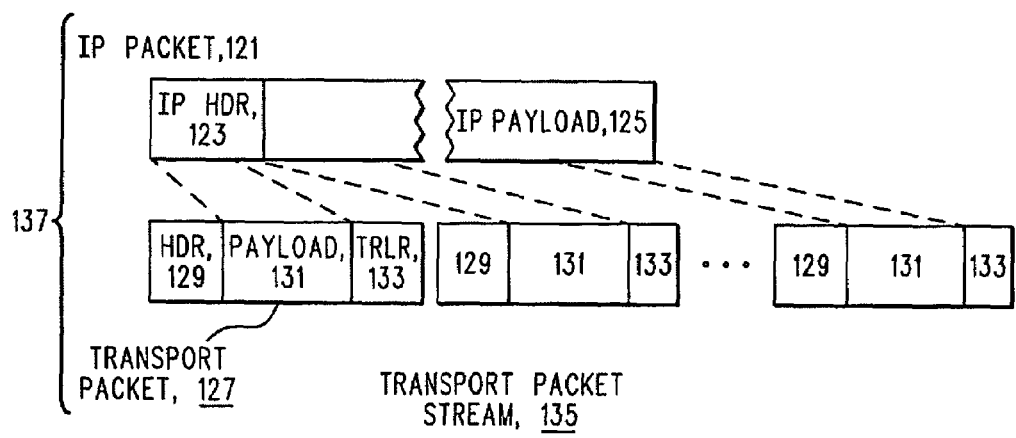
Fig.1
(PRIOR ART)

| OWN, 935 | L5:L0 937 | BUSY, 941 |

635

| BTAG, 933 |
| OFFSET, 931 |
| Av, 929 | NR, 927 | Err, 925 | OWN, 921 |
| SDPST, 915 | EOP, 927 | BCTL, ST 919 | |
| LENGTH, 911 |
| BUFFER POOL NO, 909 |
| DMEM DMAADDR, 907 |
| TxRcy ADDR., 905 |
| RxRcy ADDR., 903 |
| DMEM BYTE ADDR., 901 |

} RxCBCTL, 913

| COMMAND | COMMAND ID | RETURN DATA | DESCRIPTION | |
|---|---|---|---|---|
| WRITE(VTABLE#,INDEX, MASK,DATA,OFFSET, LENGTH) | 0X2 | NONE | WRITE DATA INTO A VIRTUAL TABLE AT INDEX. | 2401 |
| READ(VTABLE#,INDEX, OFFSET,LENGTH) | 0X3 | DATA | READS DATA FROM A VIRTUAL TABLE. | 2403 |
| FINDW(ALG#,KEY) | 0X6 | PHYSICAL TABLE, INDEX, ERROR | FINDS A KEY USING ALG#. SETS RING BUS ERROR FLAG IF KEY IS NOT FOUND. | 2405 |
| FINDW(ALG#,KEY,DATA, OFFSET,LENGTH) | 0X4 | PASS/FAIL, INDEX, ERROR | WRITES DATA INTO A TABLE USING A KEY. SETS RING BUS ERROR FLAG IF THE KEY IS NOT FOUND. | 2407 |
| FINDR(ALG#,KEY,DATA, OFFSET,LENGTH) | 0X5 | PASS/FAIL, INDEX, DATA | READS LENGTH DWORDS OF DATA FROM A VTABLE# USING A KEY AT OFFSET DWORDS. SETS RING BUS ERROR FLAG IF THE KEY IS NOT FOUND | 2409 |
| XOR(VTABLE#,INDEX, DATA/PCRC,OFFSET, MASK,CRC,LAST) | 0X1 | NONE OR CRC IN CRC MODE | XOR'S UP TO A 32 BIT VALUE TO OFFSET. ONLY MASKS OF UP TO FOUR CONSECUTIVE BYTES ARE VALID. A SPECIAL MODE EXISTS FOR CRC CALCULATIONS. | 2411 |
| ADD(VTABLE#,INDEX, DATA,OFFSET,MASK) | 0X7 | NONE | ADDS UP TO A 32-BIT VALUE TO OFFSET. ONLY MASKS OF UP TO FOUR CONSECUTIVE BYTES ARE VALID. | 2413 |
| WRITEREG(REG-ADDR, DATA) | 0X0,0x10 | NONE | WRITE DATA TO TLE REGISTER AT REG_ADDR. | 2415 |
| READREG(REG_ADDR, DATA) | 0X0,0x11 | DATA | READ DATA FROM TLE REGISTER AT REG_ADDR. | 2417 |
| ECHO(DATA) | 0X0,0x04 | DATA | RETURN DATA FROM TLE FOR TEST PURPOSES | 2419 |
| NOP() | 0X0,0x05 | NONE | INSERTS A NOP INTO THE TLE PIPE | 2420 |

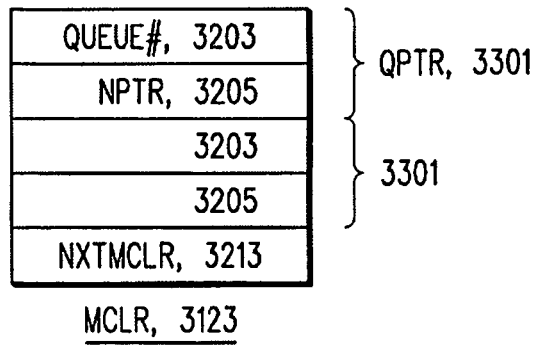
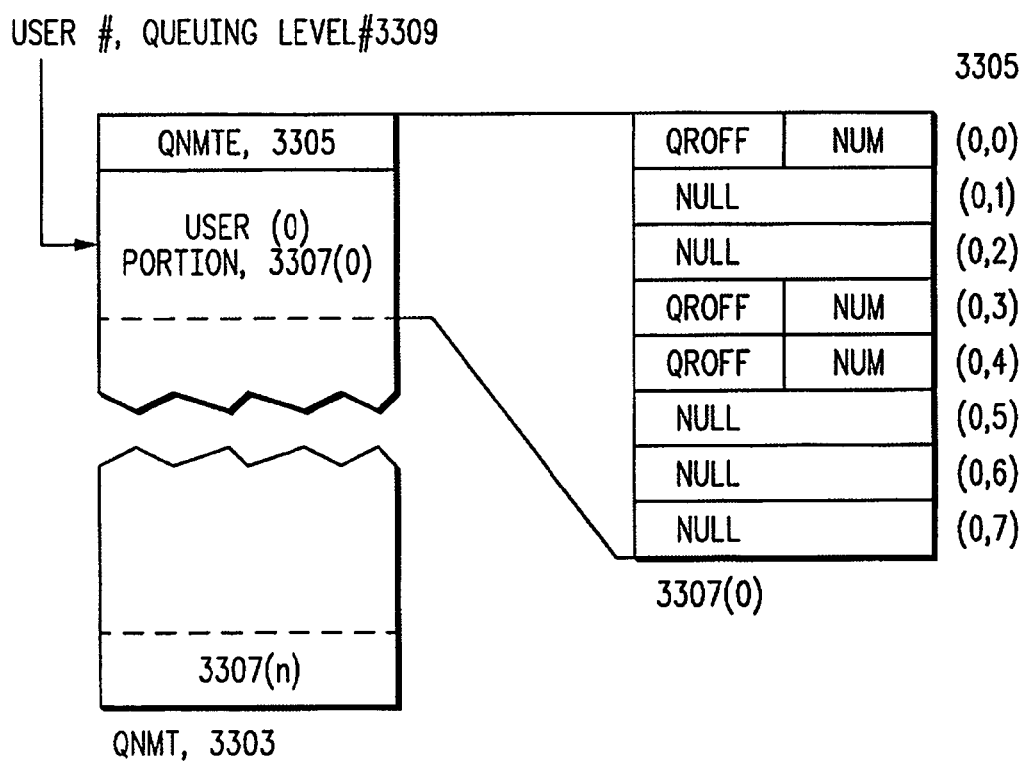
Fig. 33

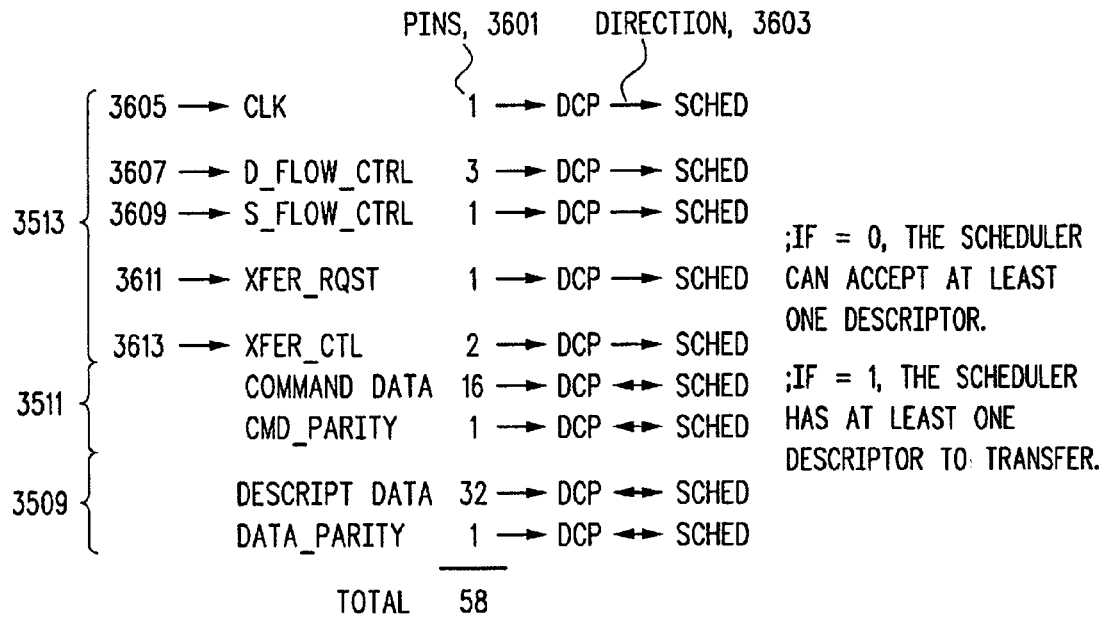
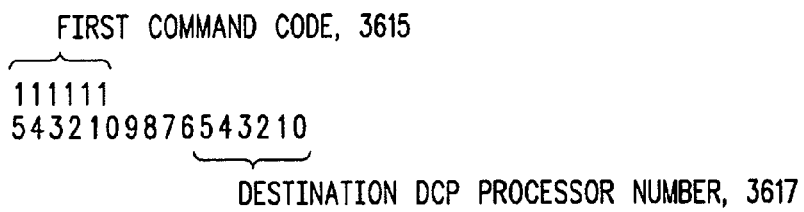
Fig. 36

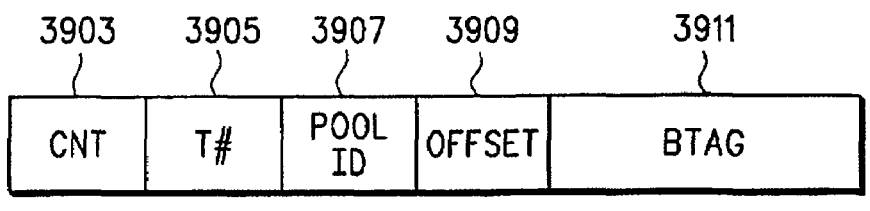
PAYLOAD BUS
BUFFER READ/WRITE COMMAND, 3901
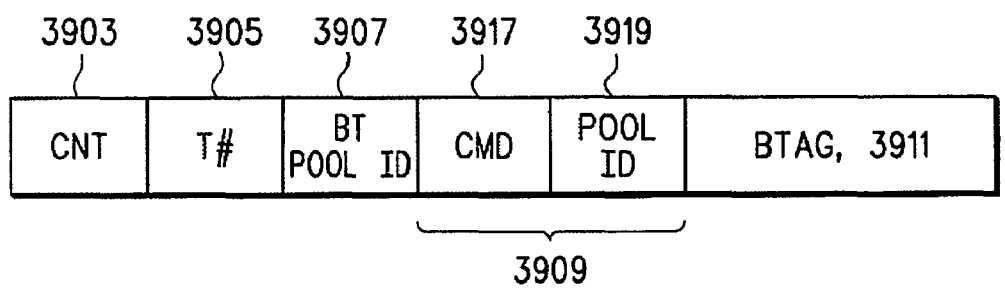
PAYLOAD BUS BTAG – COMMAND, 3915
Fig. 39

229

| PIN | PURPOSE | RMII | OC-3 | DS1 | DS3 | GMII (Tx) | GMII (Rx) | TBI (Tx) | TBI (Rx) | OC-12 |
|---|---|---|---|---|---|---|---|---|---|---|
| CP0_0 | OUTCLK | REF_CLK | RCLK_H | TCLK | TCLK | TCLK | nc | TCLK | nc | TCLK |
| _1 | INCLK | CRS_DV | RCLK_L | RCLK | RCLK | CRS | nc | | nc | TCLK1 |
| _2 | DATA | TXD(0) | TXD_H | TDATA | TDATA | TXD(0) | nc | TXD(0) | nc | TDX(0) |
| _3 | DATA | TXD(1) | TXD_L | TxFRAME | TxFRAME | TXD(1) | nc | TXD(1) | nc | TDX(1) |
| _4 | DATA | RXD(0) | RXD_H | RDATA | RDATA | TXD(2) | nc | TXD(2) | nc | TDX(2) |
| _5 | DATA | RXD(1) | RXD_L | RxFRAME | RxFRAME | TXD(3) | nc | TXD(3) | nc | TDX(3) |
| _6 | DATA | TX-EN | SIGNAL_DET | | | TX_EN | nc | TXD(4) | nc | |
| CP1_0 | OUTCLK | REF_CLK | RCLK_H | TCLK | TCLK | | | | | |
| _1 | INCLK | CRS_DV | RCLK_L | RCLK | RCLK | COL | nc | | | |
| _2 | DATA | TXD(0) | TXD_H | TDATA | TDATA | TXD(4) | nc | TXD(5) | nc | TDX(4) |
| _3 | DATA | TXD(1) | TXD_L | TxFRAME | TxFRAME | TXD(5) | nc | TXD(6) | nc | TDX(5) |
| _4 | DATA | RXD(0) | RXD_H | RDATA | RDATA | TXD(6) | nc | TXD(7) | nc | TDX(6) |
| _5 | DATA | RXD(1) | RXD_L | RxFRAME | RxFRAME | TXD(7) | nc | TXD(8) | nc | TDX(7) |
| _6 | DATA | TX-EN | SIGNAL_DET | | | TX_ER | nc | TXD(9) | nc | |
| CP2_0 | OUTCLK | REF_CLK | RCLK_H | TCLK | TCLK | | | | | |
| _1 | INCLK | CRS_DV | RCLK_L | RCLK | RCLK | nc | RCLX | nc | RCLK | RCLK1 |
| _2 | DATA | TXD(0) | TXD_H | TDATA | TDATA | nc | RXD(0) | nc | RXD(1) | RDX(0) |
| _3 | DATA | TXD(1) | TXD_L | TxFRAME | TxFRAME | nc | RXD(1) | nc | RXD(0) | RDX(1) |
| _4 | DATA | RXD(0) | RXD_H | RDATA | RDATA | nc | RXD(2) | nc | RXD(2) | RDX(2) |
| _5 | DATA | RXD(1) | RXD_L | RxFRAME | RxFRAME | nc | RXD(3) | nc | RXD(3) | RDX(3) |
| _6 | DATA | TX-EN | SIGNAL_DET | | | nc | RX_DV | | RXD(8) | FP |
| CP3_0 | OUTCLK | REF_CLK | RCLK_H | TCLK | TCLK | | | | | |
| _1 | INCLK | CRS_DV | RCLK_L | RCLK | RCLK | | | nc | RCLKN | |
| _2 | DATA | TXD(0) | TXD_H | TDATA | TDATA | nc | RXD(4) | nc | RXD(4) | RDX(4) |
| _3 | DATA | TXD(1) | TXD_L | TxFRAME | TxFRAME | nc | RXD(5) | nc | RXD(5) | RDX(5) |
| _4 | DATA | RXD(0) | RXD_H | RDATA | RDATA | nc | RXD(6) | nc | RXD(6) | RDX(6) |
| _5 | DATA | RXD(1) | RXD_L | RxFRAME | RxFRAME | nc | RXD(7) | nc | RXD(7) | RDX(7) |
| _6 | DATA | TX-EN | SIGNAL_DET | | | nc | RX_ER | nc | RXD(9) | LOCKDET |

Fig. 46

DIGITAL COMMUNICATIONS PROCESSOR

CROSS REFERENCES TO RELATED APPLICATIONS

This patent application claims priority from the following U.S. provisional applications:

60/084,705, Brown, et al., Programmable packet switch, filed May 8, 1998; and

60/105,823, Brown et al., Digital communications processor, filed Oct. 27, 1998.

BACKGROUND OF THE INVENTION

1. Field of the Invention

The invention concerns digital packet networks generally and more particularly concerns the switches used in such networks.

2. Description of the Prior Art: FIG. 1

Packets and Protocols

Communication among digital systems is generally by means of packets. A packet is shown at 113 in FIG. 1. A packet is simply a sequence of bits whose meaning is determined by a protocol. The protocol defines how the digital devices which process the packet are to interpret the bits in the packet. Regardless of protocol, most packets have a header 115, which indicates how that particular packet is to be processed according to the protocol, and a payload 117, which is the actual information being communicated by the packet. A packet may also have a trailer 119, which may simply indicate the end of the packet, but may also contain information which permits detection and/or correction of errors that have occurred during transmission or processing of the packet. Depending on the protocol which defines it, a packet may have a fixed length or a varying length. In the following discussion, the contents of the header 115 and trailer 119 will be termed protocol data, since the manner in which these contents are interpreted is determined completely by the protocol, and the contents of payload 117 will be termed payload data. Packets for certain protocols are often termed frames or cells.

Packets are used for communication in digital systems at many different levels. Thus, the payload of a group of packets at one level of the digital system may be a packet at a higher level. That is shown at 137 in FIG. 1. IP packet 121 is a packet which is interpreted according to the IP protocol. IP packets 121 have an IP header 123 and a varying-length IP payload 125. Included in the information in IP header 123 is the length of IP payload 125. When IP packet 121 is transported across a physical network, it is carried in the payload of a stream 135 of transport packets 127. Each transport packet 127 has its own header 129, payload 131, and trailer 133. What are termed transport packets herein are packets at the link layer of the ISO seven-layer model. Transport packets may have fixed or varying lengths, depending on the protocol used in the link layer.

The devices that deal with the transport packets do so as indicated by header 129 and trailer 133 in the packets, and do not examine the contents of payload 131. When a transport packet reaches its destination, the payload is passed to the part of the system for which it is intended, in this case, a component which operates according to the IP protocol, and this component deals with IP packet 121 as indicated in IP header 123. Of course, IP payload 125 may be a packet for another, still higher level. For example, it may be a packet destined for a decrypter, and the payload of that packet may be an encrypted IP packet 121. In such a case, the component that deals with IP packet 121 passes the payload to the decrypter, which decrypts the encrypted IP packet 121 and returns the decrypted IP packet to the component that deals with IP packets for further processing. That processing may of course include sending the decrypted IP packet to another destination, and if communication with that destination is via the protocol for transport packets 127, the component that deals with IP packets will provide the decrypted IP packet to the component that produces transport packet streams and the decrypted IP packet will be carried in the payload of the transport packets 127.

Packet Switches

When packets are used to communicate between digital systems that are located remotely from each other, the packets move on digital networks that connect the systems. At the physical level, the digital network may employ any medium to transmit a signal between two devices, for example, the ether, a conducting wire, or an optical cable. Packets are routed among transmission paths by packet switches. The packet switch routes the packet according to information that is typically contained in the packet header.

As one would expect, each kind of protocol has its own routing rules. For example, the IP protocol uses logical routing; each source or destination of an IP packet has a logical IP address, and an IP packet intended for a given destination has that destination's logical IP address in its header. The header does not indicate the physical location of the destination. The IP packet switch must translate the IP address into a physical address that will get the packet at least part of the way to its destination and must also make a stream 135 of transport packets directed to that physical address that carry the IP packet as their payload 131. Thus, IP node 109(n) is on Ethernet node 107(n) on Ethernet LAN 105(a) and an IP packet switch that is connected to LAN 105(a) must respond to an IP packet addressed to IP node 109(n) by making a stream of Ethernet packets directed to Ethernet node 107(n) that carry the IP packet as their payload.

A typical packet switch is shown at 101. Packet switch 101 is connected to a number of physical media 106, by means of which packet switch 101 may receive and transmit data. Examples of such media may be fiber optic cables or cables made up of electrical conductors. Each such medium 106 has its own protocol for defining the data sent via the medium; for example, one widely-used protocol for sending data via an optical cable is the SONET protocol. In FIG. 1, media 106(a . . . m) are optical cables using the SONET protocol, while media 106(n . . . z) are electrical cables. Packets at the level of the medium, termed herein medium packets, have as their payload transport packets. In terms of the ISO 7-layer model, the medium packets are physical-layer packets. In switch 103, the transport packets that are sent and received on the optical cables are packets made according to the ATM protocol used in ATM wide-area network 111, while the transport packets that are sent and received on the electrical cables are made according to the Ethernet™ protocol used in local area networks 109. In many cases, the transport packets have IP packets as their payloads, and in those cases, packet switch 103 routes the IP packets to IP nodes 109. As described above, it does so by determining the medium 106(i) upon which the IP packet should move to reach its destination and then making a stream of packets according to the protocol required for the medium that have the transport packet stream used with that medium as their payloads, and these in turn have the IP packet as their payload. Thus, if packet switch 103 receives an IP packet from WAN 111 that is directed to IP node 109(n) and IP node 109(n) is in Ethernet node 107(n) on Ethernet LAN 105(a), packet switch 103 must make a stream of packets in the form required by medium 106(n) whose payload is a stream of Ethernet packets directed to Ethernet node 107(n) that in turn carry the IP packet as their payload.

Switch 103 must thus be able to do the following:
Read incoming streams of packets that have the form required by the input medium's protocol and retrieve the transport packets that are their payloads and the other kinds of packets that are the transport packets' payloads;
route transport packets received on ATM WAN 111 to another destination on ATM WAN 111;
route transport packets received on one Ethernet LAN 105 to another destination on one of the Ethernet LANs connected to packet switch 103;
with IP packets, route the packet as required by the IP address.
produce outgoing streams of packets that have the form required by the output medium's protocol and that have transport packets as their payload that in turn contain other kinds of packets as their payloads.

Such routing may require translation from one kind of transport packet to another kind of transport packet. For example, if an IP packet comes in from ATM WAN 111 and has as its destination Ethernet node 109(n) in Ethernet LAN 105(a), packet switch 103 must extract the IP packet from the payloads of the ATM transport packets and then put it into the payloads of Ethernet packets directed to Ethernet node 107(n).

In addition, packet switches are often used to perform security functions such as filtering, encryption/decryption, or scrambling/descrambling. Packet switch 103 is shown here as being at the boundary between a private network 104 and a public network 102. The header of each IP packet 121 contains the source IP address and destination IP address for the packet, and the security policies of private network 104 bar access by IP packets from public network 102 with certain source addresses to private network 104 and also bar access by packets from private network 104 with certain source addresses to public network 102. Switch 103 filters each incoming IP packet by comparing its source address with a list of source addresses which are to be barred, and if the incoming packet is on the list, it is discarded. Switch 103 filters outgoing packets in a similar fashion. As regards encryption/decryption, packet switch 103 may receive an IP packet from public network 102 whose payload is an encrypted IP packet destined for an IP address in private network 104. In such a case, packet switch 103 will take the encrypted IP packet, decrypt it, and then send it on to its destination in private network 104. Similarly, packet switch 103 may receive an IP packet which will be sent to a destination belonging to private network 104 via public network 102 and may encrypt the IP packet and place it as payload in another IP packet before sending the other IP packet via public network 102.

Problems Posed by Packet Switches

The design of a packet switch poses many problems for an engineer. As is apparent from the foregoing discussion, a packet switch must perform complex actions such as locating payload in incoming packet streams and producing outgoing packet streams, routing at the transport level and higher, translation of information in packets, filtering, and encryption/decryption. The packet switch must do these actions both quickly and with high throughput. The packet switch must also be able to handle classes of service ranging from services such as e-mail where all that is required is that the e-mail arrive at a reasonable time (measured in hours) after it has been posted through services such as digital TV, in which the packets must arrive at their destination within fixed time intervals of each other, to packet telephony, where there are strict constraints not only on the time intervals between packets, but also on the total length of time it takes a packet to traverse the network from its source to its destination.

In modern electronic devices, high speed, high throughput, and the satisfaction of time constraints have been achieved by the use of special-purpose hardware, while complexity has been dealt with by the use of programmable processors. Devices based on special-purpose hardware are typically fast, but expensive, inflexible, and incapable of complex processing; devices based on programmable processors are typically cheap, flexible, and capable of any processing desired, but slow.

High-speed packet switches have thus been based on special-purpose hardware. As one would expect, such packet switches have been fast, have had high throughput, and have been able to satisfy timing constraints, but they have also been expensive, inflexible, and unable to perform complex functions such as filtering or encryption/decryption. Moreover, each kind of transport protocol has required its own special hardware, and for that reason, a change in the transport protocols used in a high-speed switch has required that the switch's special-purpose hardware be changed.

Lower-speed packet switches have been based on programmable processors. Again, as one would expect, these switches have been relatively cheap to begin with, have been able to perform functions of any desired complexity, and need only to be reprogrammed to deal with changes in transport or other protocols. Packet switches based on programmable processors have not, however, had the speed, throughput, or ability to satisfy time constraints found in packet switches made with special-purpose hardware.

What is needed is packet switches that have the flexibility, low cost, and ability to perform complex functions characteristic of packet switches based on programmable processors, but are also able to satisfy time constraints and to provide high speed and high throughput. It is an object of the digital communications processor described herein to provide such packet switches.

SUMMARY OF THE INVENTION

The invention overcomes the foregoing problems of packet switches and of devices in general which process streams of data by providing an integrated circuit which includes a number of data stream processors, a stream context processor, a queue manager, and a buffer manager.

A data stream processor that is receiving a data stream extracts control information from the data stream, provides it to the context processor to be interpreted as required by the data stream's context, and uses the result provided by the context processor to process the data stream. Where the data stream is to be transmitted further, the data stream processor provides the payload from the incoming data stream to the buffer manager for storage in a buffer and sends an enqueue command to the queue manager. The enqueue command includes a descriptor including at least a tag identifying the buffer and a queue specifier for a queue which is being read by the data stream processor that is transmitting the data stream. The queue manager enqueues the descriptor on the proper queue. When the transmitting data stream processor dequeues the descriptor from the queue, it uses the tag to fetch the payload from the buffer and makes an output data stream using the payload, adding control information as required for the output data stream. The descriptor is completely defined by the program running on the data stream processor, and consequently, the queue manager provides a general mechanism for passing information in an ordered manner between a receiving data stream processor and a transmitting data stream processor.

A data stream processor includes a receive processor, a transmit processor, a control data processor, local memory, and a DMA engine which provides DMA access between the receive processor, the transmit processor, and the buffer manager as well as between the local memory and the buffer manager. The local memory belonging to each of the data stream processors, as well as local memory belonging to the buffer manager and the queue manager are all part of a single global address space and may be read or written by any device which has access to the global address space. When a data stream processor is receiving a data stream, the receive processor and the control data processor cooperate to process the stream as follows: the transmit processor receives the stream, extracts the control information from the stream and passes it to the control data processor, and DMAs the payload to the buffer manager. While the transmit processor is working on the next portion of the stream, the control data processor uses the context processor to process any context information for the portion that has been DMA'd and sends an enqueue command with the descriptor for the DMA'd payload to the queue manager. A data structure called a data scope simplifies the exchange of information between the control data processor and the receive processor. The interaction between the transmit processor and the control data processor is substantially the same, but with the payload moving in the reverse direction.

The data stream processors include serial data stream processors and at least one parallel data stream processor. The parallel data stream processor may be used to connect the integrated circuit to another integrated circuit of the same type, to a bus, or to a switching fabric.

The serial data processors are highly configurable. Configuration is done by means of registers in the global address space. Each serial data processor may receive and/or transmit separate data streams or groups of serial data processors may be aggregated to cooperate in processing one data stream. The I/O pins of a serial data processor may be configured to meet the electrical requirements of different physical media and may also be configured such that all of the serial data processors in an aggregation receive the same input. Various devices within a receive processor or a transmit processor may be enabled or disabled as required to deal with the particular kind of serial input stream being received or transmitted and the receive or transmit processor may also recirculate a data stream it has already processed.

Other objects and advantages will be apparent to those skilled in the arts to which the invention pertains upon perusal of the following Detailed Description and drawing, wherein:

BRIEF DESCRIPTION OF THE DRAWING

FIG. 1 is a block diagram of a packet switch in a network;
FIG. 9 shows receive and transmit data scopes;
FIG. 24 shows the commands executed by TLE 301;
FIG. 26 is an example of aggregation of RxSDPs 421 in a cluster;
FIG. 33 is a detail of MCL 3123 in a preferred embodiment;
FIG. 36 shows details of the scheduler expansion interface;
FIG. 39 shows details of BME 305's commands.

FIG. 46 shows details of various configurations of configurable pin logic 443.

Figure 2:
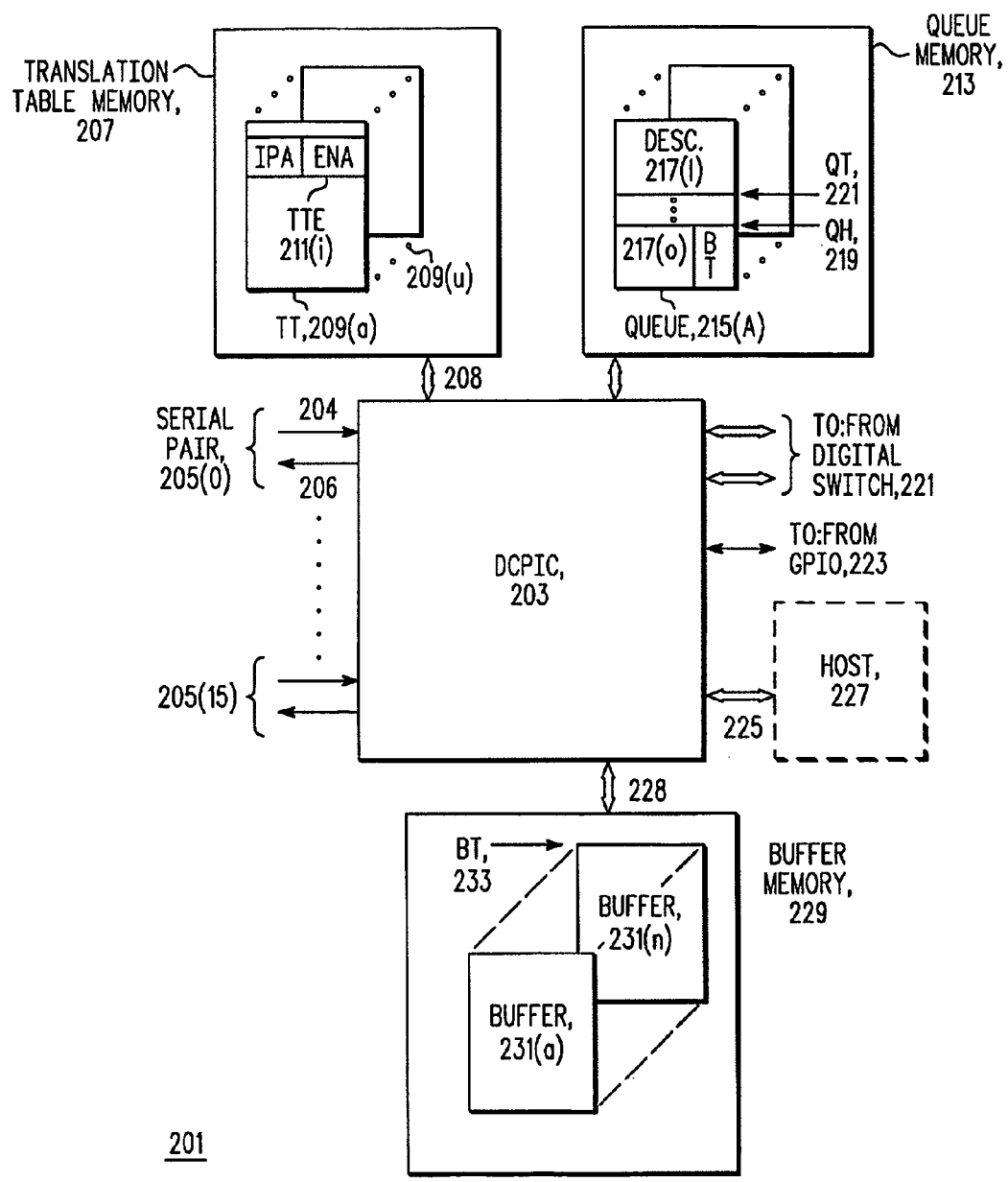
FIG. 2 is a high-level block diagram of a packet switch that includes the digital signal processor of the invention.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with an overview of the structure and operation of a digital packet switch that includes the digital communications processor of the invention, will continue with an overview of the structure and operation of the digital communications processor, and will thereupon present details of the structure and operation of components of the digital communications processor.

A Digital Packet Switch that Includes the Digital Communications Processor: FIG. 2

FIG. 2 is a block diagram of a packet switch 201 that is built using a digital communications processor integrated circuit 203 which implements the digital communications processor of the invention. Integrated circuit 201 has interfaces for the following external devices:

up to 16 pairs 205(0 . . . 15) of serial inputs 204 and serial outputs 206 for packets being sent or received according to transport protocols;

a 32 bit output to and a 32 bit input from an optional digital switching device (interface 221);

a PCI bus interface 225 to an optional host processor 227;

a 128 bit-wide interface 228 to an SDRAM buffer memory 229;

a 64 bit-wide interface to a SRAM translation table memory 207; and a 32 bit-wide interface to a queue memory 213.

Continuing in more detail about these interfaces, digital communications processor 203 may be programmed so that the serial inputs and outputs in a single DCP 203 may be used for many different medium and transport protocols. If the network(s) in which the DCP 203 is being used change, the DCP 203 may be reprogrammed to deal with the new network arrangements. High-speed protocols may be handled by connecting several serial inputs or outputs to the transmission medium for the high-speed protocol. In a preferred embodiment, the medium and transport protocols include 10 Mb Ethernet;
100 Mb Ethernet;
1 Gb Ethernet;
T1/E1 interface;
T3/E3 interface;
OC-3c interface; and
OC-12c interface.

DCP 203 receives medium packets in the inputs 204 and outputs medium packets from the outputs 206. What happens between the time a medium packet is received at an input 204 and transmitted at an output 206 depends on how the DCP has been programmed. The ways in which DCP 203 is programmable include the following:

each input has a receive processor and each output has a transmit processor; these processors may be individually programmed to deal with different types of medium packets, transport packets, and packets that are payloads of transport packets;

inputs and outputs may be aggregated;

Operations on state associated with a stream of packets are programmable; examples are address translation and error correction code processing;

Relationships between sources and destinations of packets in the DCP are programmable; and The information passed from a packet source to a packet destination is programmable, as is the manner in which it is interpreted at the destination.

For a typical packet switching application, DCP 203 is programmed to operate as follows: As each medium packet is received in an input 204, DCP 203 stores data from the medium packet's payload in a buffer 231 in buffer memory 229; This stored data is termed herein a protocol data unit or PDU; in many cases, the PDU will be a transport packet that is part of the medium packet's payload. When a medium packet is output, DCP 203 retrieves the PDU from a buffer 231, makes any necessary modifications in it (for example, changing routing information in the transport packet or changing the kind of transport packet), and adds the protocol data for the medium packet.

DCP 203 routes transport and higher-level packets using translation tables 209 in translation table memory 207. Once the packet is routed, DCP 203 places a descriptor 217 for the buffer 231 that contains the PDU for the packet at the tail of a queue 215 in queue memory 213 for the output 206 from which the packet is to be output. In general, each queue 215 is associated with a single output 206, but packets received at an input 204 may be placed at the tail of any queue 215, thus permitting packets received at one input 204 to be output via a number of outputs 206. A packet may also be multicast, that is, enqueued on more than one queue 215. DCP 203 then takes descriptors 217 from the head of a queue associated with an output 206 and outputs the contents of buffer 231 identified by the descriptor to the queue's output 206.

DCP 203 may also receive packet data from and provide the packet data to an optional digital switching fabric, as shown at 221. The switching fabric may be another packet switch like packet switch 201, or it may be any other device which is capable of routing streams of digital data. For example, packet switch 201 may be connected with other packet switches to a crossbar switch or even to a bus. Routing of packet data received from or output to interface 221 is essentially as described above for packets received in a serial input 204. Finally, DCP 203 may receive packet data from and provide packet data to optional host 227 via PCI bus 225.

External control interfaces include GPIO interface 223 and PCI bus interface 225. GPIO interface 223 is a utility interface for monitoring and control of external system elements such as LEDs, nonvolatile memory, physical layer serial transmission and receiving components, and power supplies. PCI bus interface 225 communicates between DCP 203 and a host processor which may control switching system 201 and which may also perform higher-level operations such as access checking on packet contents received in system 201.

Detailed Example of Operation

The example of the Description of related art will be used to show how the components of packet switch 201 may be programmed to route packets in more detail. For purposes of the example, serial input 204(*i*) of serial pair 205(*i*) is receiving a stream of SONET packets that have as their payload a stream of ATM transport packets. The ATM transport packets have as their payload an IP packet directed to IP node 109(*n*), which is on a device 107(*n*) attached to Ethernet LAN 105(*a*). Ethernet LAN 105(*a*) is connected to serial output 206(*j*) of serial pair 205(*j*). Since packet switch 201 is being used to route IP packets, DCP 203 has been programmed to scan incoming transport packets on serial input 204(*i*) for payloads containing headers for IP packets. When an IP packet header is found, DCP 203 begins directing the payload from the ATM transport packets to a buffer 231 in buffer memory 229 that is specified by a buffer tag 233. If the IP packet is longer than the buffer, additional buffers are employed.

While the IP packet is being transferred to buffer memory 229, DCP 203 processes information in the IP packet's header to determine how the IP packet is to be routed and then routes the IP packet The processing of the header information is done using the translation tables in translation table memory 207. In this case, two translations have to be made: the IP destination address in the header of the IP packet has to be translated into the Ethernet address of device 107(*n*) at which the IP node with the destination address is located and the Ethernet address of device 107(*n*) has to be translated into an identifier for the queue in queue memory 213 from which serial output 206(*j*) is outputting Ethernet packets. The translation table entry 211(*i*) for one of these, the translation from IP destination address (IPA) to Ethernet address (ENA) is shown in translation table 209(*a*).

DCP 203 uses the information from the IP packet's header and the translation table(s) 209 to make a descriptor 207 for the IP packet. Included in the descriptor are the Ethernet address and the buffer tag 233 for the buffer 231 that contains the packet. DCP 203 then puts the descriptor 207 on the tail 221 of queue 215(*j*) for packets being output from serial output 206(*j*). When descriptor 207 reaches the head of queue 215(*j*), DCP 203 fetches the contents of the buffer 231 that contains the transport packets and makes the content into a stream of packets having the medium protocol proper for serial output 206(*j*). These medium packets have as their payload Ethernet transport packets. Using information descriptor 207, DCP 203 gives the Ethernet transport packets the Ethernet address of device 107(*n*). The payload for the Ethernet transport packets in turn is the IP packet stored in the buffer specified by the buffer tag.

It should be noted here that DCP 203 is of course performing the operations described above or variations on them simultaneously for up to 16 serial streams of incoming and 16 streams of outgoing transport packets and in some cases is at the same time transferring streams of data between itself and a digital switch at interface 221 and/or between itself an external host 227 via PCI interface 227. Moreover, as explained above, in many cases, the packet switching operations are governed by strict timing constraints. As will be explained in more detail in the following, a key element in the design of DCP 203 is providing data paths and memory structures inside DCP 203 that have the speed and latency properties necessary for the kind of operation that has just been described.

Figure 3:
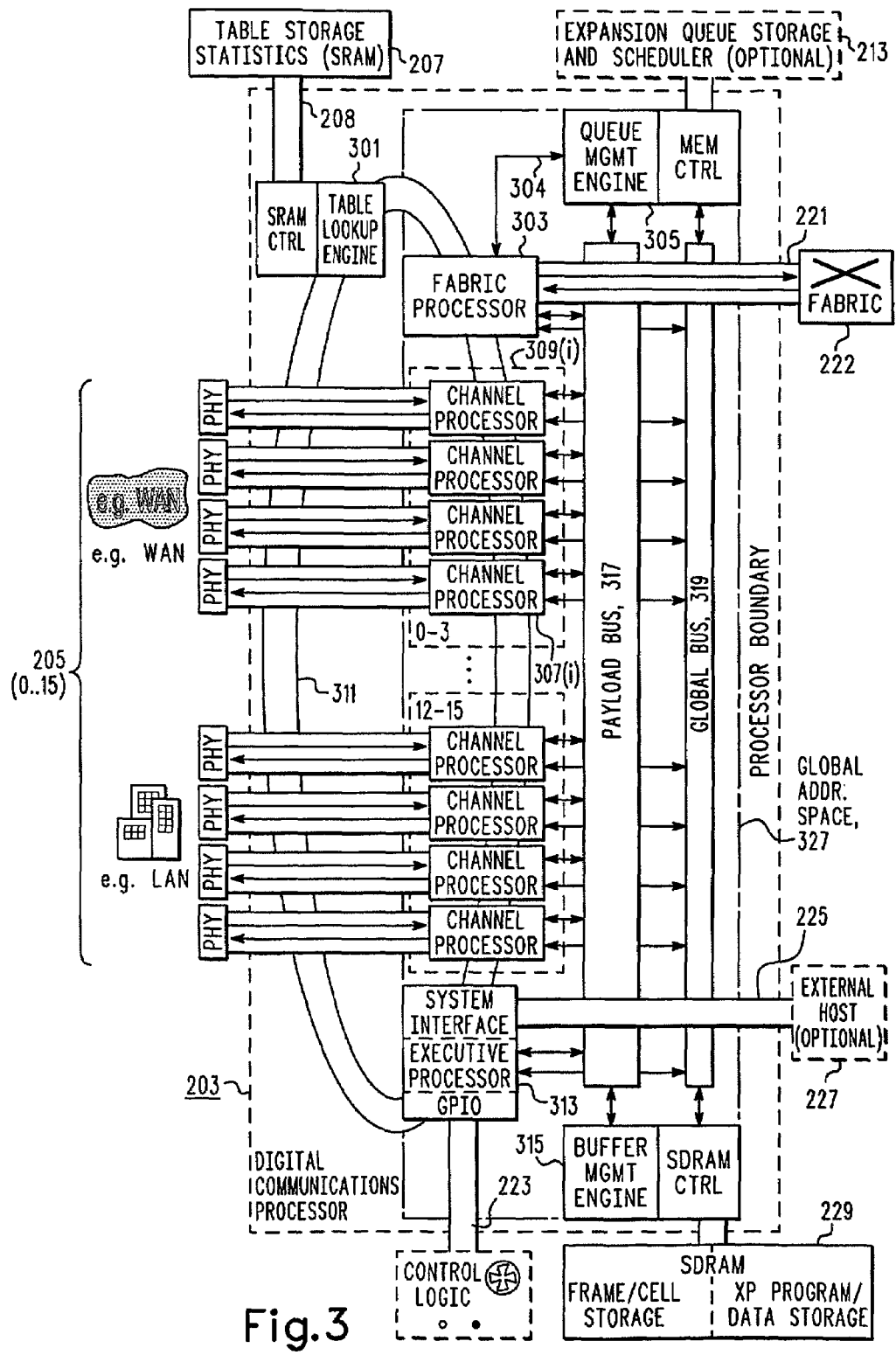
FIG. 3 is a high-level block diagram of the digital communications processor of the invention.
Figure 5:
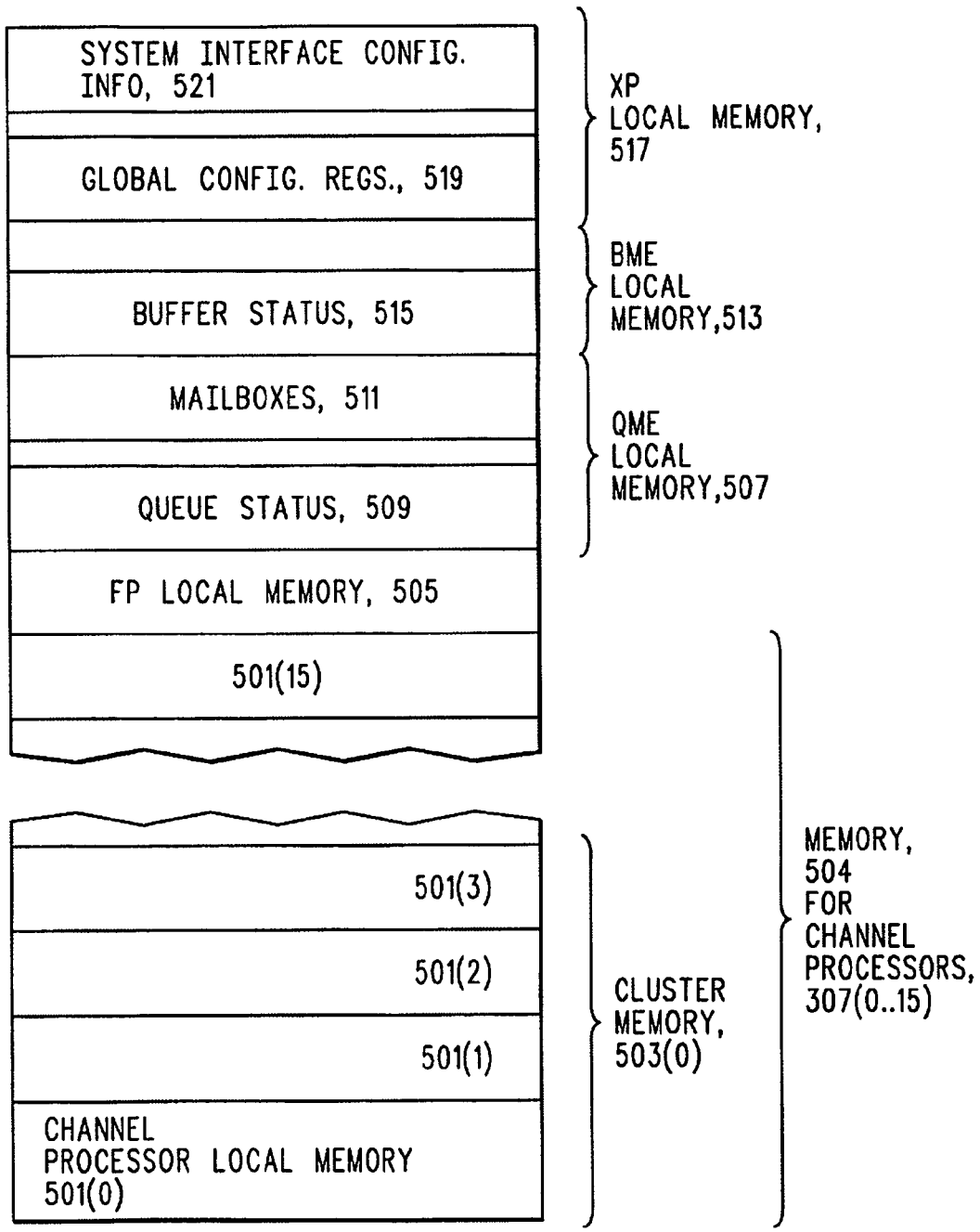
FIG. 5 is a map of global address space.

Structure of DCP 203: FIGS. 3 and 5

FIG. 3 is a high-level block diagram of the internal structure of DCP 203. Components of FIG. 2 that appear in FIG. 3 have the reference numbers they bore in FIG. 2. Beginning with the serial inputs and outputs 205 upon which transport packets are sent and received, each serial pair 205 is connected to its own programmable channel processor 307, which processes the serial input from and serial output to the pair. There are thus 16 channel processors 307 in the preferred embodiment. For very high-speed transport protocols, up to 4 channel processors 307 may be combined in a channel processor cluster, as shown at 309.

Fabric processor 303 is like the channel processors, except that it processes parallel data that it receives from and provides to interface 221. Table look up engine 301 does the address translation using the tables in translation table memory 207. Queue management engine 305 manages the queues 215 of descriptors. In some embodiments, the queues are stored in memory in DCP IC 203; in others, queue memory 213 is a separate external memory. Buffer management engine 315 manages the buffers 231 in buffer memory 229. Executive processor 313 initializes and maintains data in the other components, manages the PCI bus interface with the optional external host 227 and the GPIO interface, and performs higher-level processing where needed. Programs and data for executive processor 313 are stored in SDRAM 229. Executive processor 313, the channel processors 309, and fabric processor 303 all use the facilities of TLE 301, QME 305, and BME 315 to process packets and/or frames and will be collectively termed herein packet processors. It should be pointed out here, however, that a packet processor may be used to process not only packets, but any other stream of data, and could be considered a general purpose bit/nybble/byte/ or (in the case of the fabric processor) 32-bit word stream processor.

All of the processing components of DCP 203 are programmable. The channel processors 307 are individually programmable to handle different kinds of medium packets, transport packets, and transport packet payloads and fabric processor 303 is programmable to handle the data employed in the different switching devices. The tables in table storage 207 may be written as well as read and table lookup engine 301 may be programmed to do different kinds of lookups on the tables. Queue management engine 305 may be programmed to set up different numbers of queues and to use different-sized descriptors in the queues and buffer management engine 315 may be programmed to buffer pools of different sizes, with different buffer sizes within the pools. XP 313, finally, is a general-purpose processor and may be programmed to perform any function. The programs for the components are loaded when DCP 203 is initialized. The program code may be loaded into SDRAM 229 by external host 227 or it may be stored in an external PROM that is part of the address space managed by BME 315. In either case, XP 313 loads the code into the components' memories.

The bus and memory structure of digital communications processor 203 make it possible for DCP 203 to satisfy the speed and time constraints of packet switching while employing table lookup engine 301, queue management engine 305, and buffer management engine 315 as shared resources. All of the components of digital communications processor 203 except table look up engine 301 share a single global address space 321. Each of the packet processors has its own local memory in global address space 321 and can access the local memory of the other packet processors whose local memory belongs to global address space 321 as well as memory belonging to BME 315 and QME 305. Each of the packet processors has direct access to its own local memory and access via a 32-bit global bus 319 to the local memory of the other components. Additionally, fabric processor 303 has its own path 304 to queue management engine 305.

FIG. 5 provides an overview of global address space 321. There is first the portion 504 of global address space that is made up of the local memories 501 of channel processors 307(0 . . . 15). Portion 504 is further subdivided into cluster memory 503 for each of the clusters 309 of channel processors. A given channel processor 307(i) has fastest access to its own local memory 501(i), next fastest access to the local memories of the other channel processors in its cluster, which together make up its cluster memory 503, and the least fast access to the remainder of global address space 321. The other components whose local memory is part of global address space 321 are fabric processor 303, whose local memory is seen at 505, QME 305, whose local memory is seen at 507, BME 315, whose local memory is seen at 513, and XP 313, whose local memory is seen at 517. The processors that share global address space can in general use global address space for inter-processor communication, for example, processors may set up semaphores in global address space to coordinate their operations. In order to make and use such semaphores, the processors in the preferred embodiment have a test-and-set-bit instruction. Other information that is available in global address space includes queue status information 505 in QME local memory 507, buffer status information 515 in buffer management engine local memory 513, and global configuration registers 519 and system interface configuration information 521 in XP local memory 517. QME 305, finally, writes queue status information for the queues read by a packet processor to the packet processor's local memory.

Continuing with FIG. 3, each of the components' local memory is coupled to buffer management engine 315 by payload bus 317. It is a 128-bit wide bus that operates in four-cycle bursts to transfer up to 64 bytes of data between SDRAM 229 and the other components. The data transferred via payload bus 317 includes the following:

- programs and data used by executive processor 313;
- the data which executive processor 313 uses to configure DCP 203;
- protocol data units that are being transferred between SDRAM 229 and a packet processor;
- buffer tags 233; and
- descriptors that are enqueued and dequeued by packet processors.

Transfers between SDRAM 229 and the local memories are done by means of a direct memory access (DMA) mechanism. The component doing the transfer provides a DMA instruction for the transfer to the DMA mechanism and the DMA mechanism then performs the transfer without further intervention from the component. This arrangement permits transfers of protocol data units and other processing by a component to occur in parallel, which greatly increases the speed of operation and throughput of DCP 203.

Table look up engine 301 and the packet processors are all connected via ring bus 311. Ring bus 311 is 64 bits wide and is time-multiplexed among the nodes it connects. At any given moment, each of these components has between 1 and 5 ring bus slots allocated to it. Each slot can carry a 64-bit message. Because the bus is time-multiplexed among its nodes and each node has a predetermined maximum number of slots, it is possible to guarantee that a message will travel from one node to another on ring bus 311 within a fixed amount of time. In a presently-preferred embodiment, executive processor 313 uses ring bus messages to configure and read the tables in table storage 207 and the packet processors use ring bus messages to provide information to table look up engine 301 for translation, and table look up engine 301 uses ring bus messages to provide the results of the translation to the packet processors. Any device coupled to ring bus 311 can send ring bus messages to and receive them from any other device coupled to ring bus 311, so in other embodiments, ring bus messages may, for example, be used to coordinate activities of the channel processors 307 making up a cluster 309.

Example of Cooperation of the Components of DCP 203

Continuing with the example of FIGS. 1 and 2 at the level of detail offered by FIG. 3, the stream of ATM packets is being received on input line 204(i). Input line 204(i) belongs to channel processor 307(i). As the ATM packets arrive, channel processor 307(i) begins a series of DMA transfers that first transfer the packets to channel processor 307(i)'s local memory and then to a buffer 231 that is specified by a buffer tag 233 that is in possession of channel processor 307(i). While this is going on, channel processor 307(i) scans the payload of the ATM packets for IP packets. When it finds the start of an IP packet, channel processor 307(i) extracts the destination address for the IP packet from the IP packet header and makes a message containing the destination address for table lookup engine 301. In this case, the destination address specifies IP node 109(n) on device 107(n) which is connected to Ethernet LAN 105(a). Ethernet LAN 105(a) receives packets output from serial output 206(j). Channel processor 307(i) then places the message in one of its slots in ring bus 311. When channel processor 307(i) receives the reply to the message with the Ethernet address of device 107(n) and the number m of the queue which is served by serial output 206(j), it makes a descriptor 217(k) which contains at least the Ethernet address and the buffer tag 233 of the buffer. Channel processor 307(i) then writes an enqueue command via payload bus 317 to a mailbox belonging to channel processor 307(i). The enqueue command includes at least the descriptor 217(k) and the queue number m. Queue management engine 305 responds to the command by placing descriptor 217(k) at the tail 221 of queue 215(m).

Serial output 206(j) belongs to channel processor 307(j), to which queue management engine 305 provides descriptors from the head 219 of queue 215(m). It does so by writing a dequeue command specifying queue 215(m) via payload bus 317 to its mailbox. Queue management engine 305 responds to the dequeue command by providing the descriptor 217 at the head 219 of queue 215(m) to channel processor 307(j) via payload bus 317.

Eventually, the descriptor 217 at head 219 of queue 215(m) is descriptor 217(k). Once channel processor 307(j) has descriptor 217(k), it uses buffer tag 233 in descriptor 217(k) to begin a DMA transfer of the IP packet from the buffers 231 that contain it to channel processor 307(j)'s local memory. As the IP packet arrives, channel processor 307(j) makes a stream of Ethernet transport packets which are addressed to Ethernet device 107(n) and have the IP packet as their payload and outputs the stream of Ethernet packets to serial output 206(j). The Ethernet address in the packets of course comes from descriptor 217(k).

Advantages of the Bus and Memory Architecture of DCP 203

As is apparent from the foregoing description, the bus and memory architecture of DCP 203 permit a packet processor to do packet header processing, protocol data unit transfer, and enqueueing and dequeuing in parallel; moreover, the different buses not only provide different paths, but provide paths that meet the latency requirements of the operations that are performed over them. Thus, the most time-sensitive operation is the translation of information in the packet headers, since routing cannot be done until the results of the translation are available. Because every one of the packet processors has slots in ring bus 311, each packet processor has access to table lookup engine 301 within a guaranteed amount of time, and consequently, the time constraints for translation can be satisfied.

The transfer of protocol data units between packet processors and SDRAM 229, on the other hand, requires high-bandwidth bursts, and exactly that is provided by the DMA transfers via payload bus 317 between the local memory and SDRAM 229. The transfer of buffer tags from buffer management engine 315 and a channel processor 307(*i*) and the transfer of descriptors between queue management engine 305 to a channel processor 307(*i*) are also time-critical, so they, too, are done on payload bus 317.

Less time-critical operations can be done as reads and writes in global address space 321. The time required for such reads and writes depends on where they are in global address space. The time is least for reads and writes to a given processor's own local portion of global address space, next least for reads and writes to processors that belong to the given processor's cluster 309, and longest for reads and writes to processors that do not belong to the given processor's cluster 309.

The fact that all of the processors of DCP 203 except TLE 301 share global address space 321 makes interprocessor communications easy. For example, executive processor 313 can initialize and/or reconfigure the other components simply by writing data to their portions of global address space 321, a packet processor 307 can obtain status information about the queues 215 being managed by queue management engine 305, the buffers 231 being managed by buffer management engine 315, or the status of other packet processors in its cluster 309 simply by reading the status information from the portion of global address space belonging to those devices, and the processors can coordinate their behavior by means of semaphores in global address space. A receiving packet processor can further use global address space in some applications to write protocol data units which it receives directly to the local memory of the transmitting packet processor which is to output the protocol data unit. Executive processor 313 can finally use global address space to determine the status of each of the processors with which executive processor 313 shares global address space.

Where global address space operations are very frequent, special hardware support is provided. For example, fabric processor 303 has its own private access to queue management engine 305's global address space and can thus obtain queue status information without burdening global bus 319. Similarly, each packet processor has status bits for its mailbox in QME 305 in its portion of global address space and these bits are directly wired to queue management engine 305, so that each packet processor can determine the status of its mailbox without burdening global bus 319.

Details of the Packet Processors

The following sections will first describe channel processors 307(0 ... *n*) in detail, then describe fabric processor 303, and finally describe executive processor 313.

Figure 4:
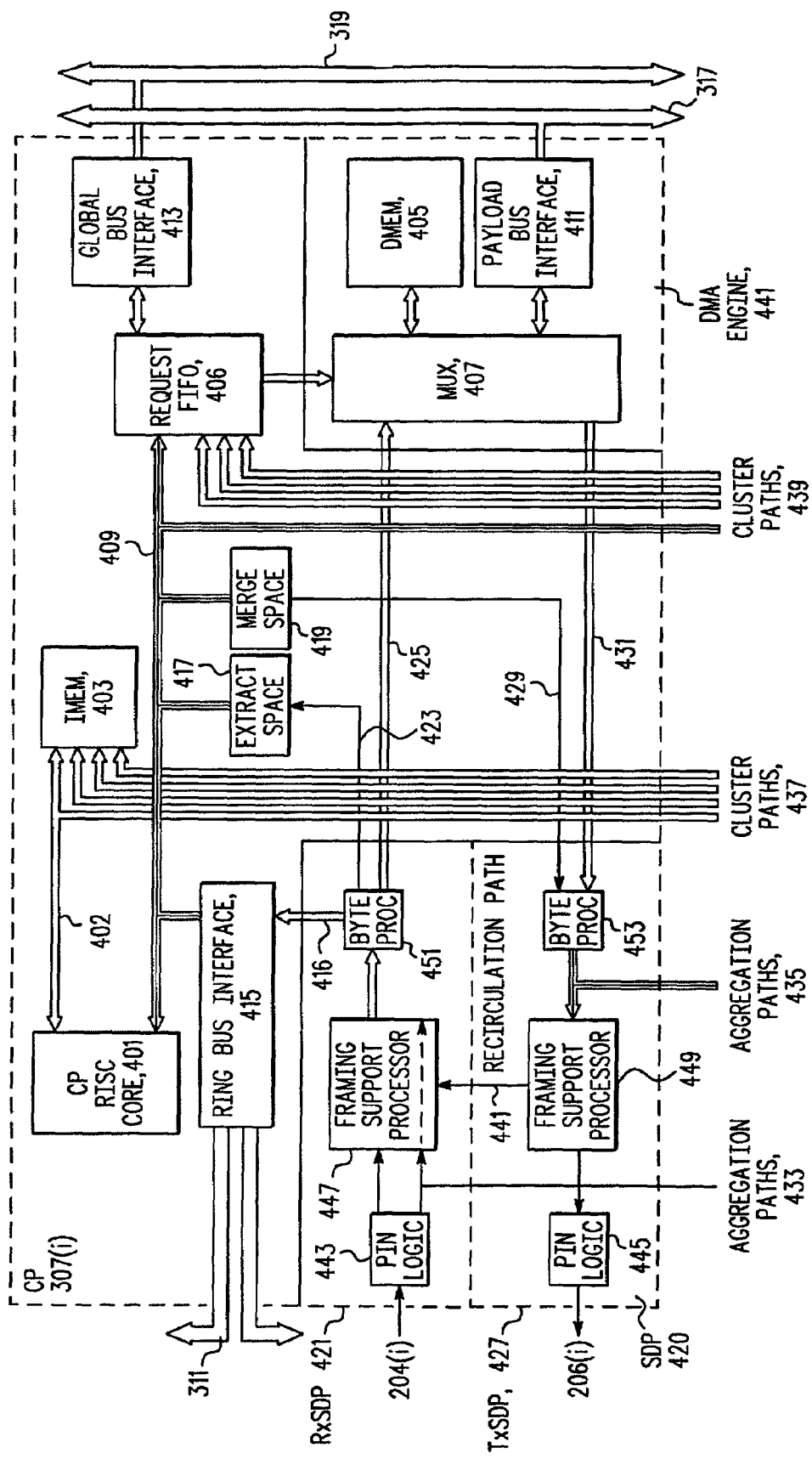
FIG. 4 is a high-level block diagram of a channel processor in the digital communications processor.
Figure 6:
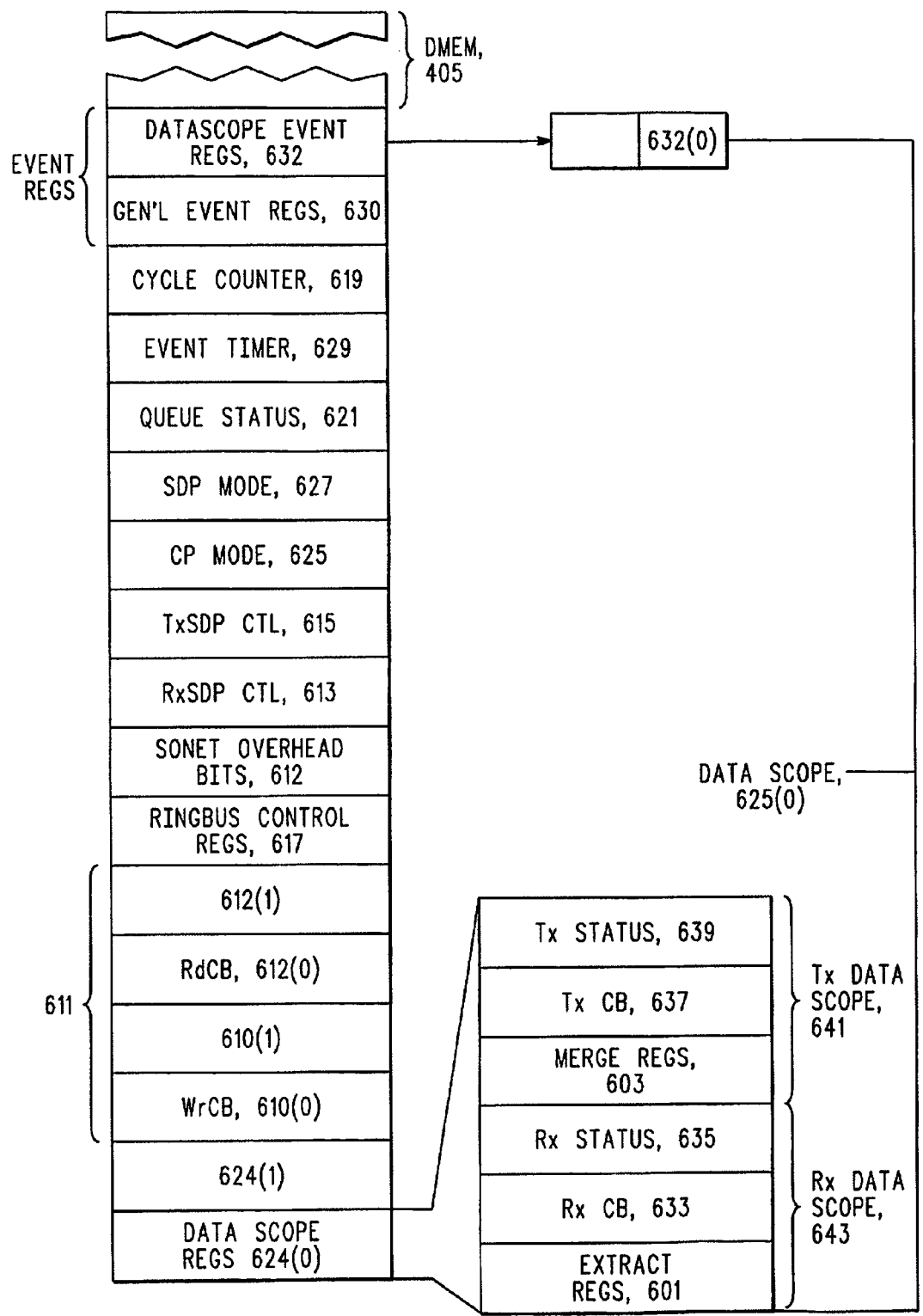
FIG. 6 is a map of a channel processor's local memory.

Overview of a Channel Processor 307(*i*): FIGS. 4 and 6

FIG. 4 is a block diagram of the components of a channel processor 307(*i*). As was seen in FIG. 3, channel processor 307(*i*) receives serial packet inputs via serial input 204(*i*), provides serial packet outputs via serial output 206(*i*), is connected to and has slots in ring bus 311, and is connected to payload bus 317 and global bus 319. Aggregation paths 433 and 435 and cluster paths 437 and 439 permit channel processor 307(*i*) to be aggregated with other channel processors 307 in its cluster 309 in order to handle extremely high-speed transmission media.

At a high level, channel processor 307(*i*) has three components: channel processor risc core (CPRC) 401, which is a general-purpose processor that controls operation of the other components and has access to global address space 321, serial data processor (SDP) 420, which does the processing involved in receiving packets from serial input 204(*i*) and outputting packets to serial output 206(*i*), and DMA engine 411, which handles data transfers via global bus 317 between channel processor 307(*i*) and BME 315 or QME 305. Both SDP 420 and CP RISC core 401 are connected via ring bus interface 415 to ring bus 311. SDP 420 has two subcomponents: RxSDP 421, which processes incoming packets, and TxSDP 427, which processes outgoing packets.

Continuing with details of CPRC 401, CPRC 401 is a general-purpose microprocessor that employs a subset of the well-known MIPS1 instruction set. It can send and receive messages on ring bus 311 and shares two register files with SDP 420. Extract space 417 is used to store protocol data extracted from incoming packets by SDP 420 for use by CPRC 401, while merge space 419 is used to store protocol data provided by CPRC 401 to SDP 420 for use in making outgoing packets.

CPRC has four contexts, i.e., independent sets of register files. CPRC 401 can switch among the contexts, either in response to a BREAK command in a program or in response to a hardware interrupt. The contexts are prioritized according to their number, with context 0 having the highest priority and context 3 having the lowest. Each context has a context entry register and a context return register; when a context is changed, the address of the next instruction to be executed in the current context is stored in the current context's context return register and execution continues with the instruction at the address stored in the new context's context entry register.

There are five system events that cause context switching:
Master Reset
Non-maskable interrupt
Debug interrupt
User interrupt 1
User interrupt 2

The settings of the context entry registers for the master reset event and the debug interrupt event are system-defined; for the other events, they are programmable.

Instruction memory 403 contains code for execution by CPRC 401. It may be read and written only by CPRC 401 and the CPRCs of the other CPs 307 in the cluster 309 to which CP 307(*i*) belongs. In a preferred embodiment, code is loaded into IMEM 403 as follows: first, executive processor 313 loads the code into DMEM 407 via global bus 319 and then CPRC 401 transfers the code from DMEM 407 to IMEM 403.

DMEM 405 is channel processor 307(*i*)'s local data memory. It is used both for local storage by CPRC 401 and for DMAing data via payload bus 413. DMEM 405, extract space 417, and merge space 419 are all part of global address space 321 and are accessible to other channel processors 307 in channel processor 307(*i*)'s cluster 309 and to other processors in DCP 203 via global bus 317. The memory components in addition to DMEM 405 which implement this arrangement in a preferred embodiment are request FIFO 406, MUX 407, global bus interface 413, and payload bus interface 411. MUX 407 multiplexes access to DMEM 405 among RxSDP 421, TxSDP 427, payload bus interface 411, and Request FIFO 406. Request FIFO 406 in turn permits the other processors in CCP 203 that are coupled to global bus 319 access to DMEM 405, access by CPRC 401 to DM405 and global address space 321, and access by the other CPRC's 401 in the channel processors 307 in CP 307(*i*)'s cluster 309 to DMEM 405. Mux 407, DMEM 405, and payload bus interface 411 together make up DMA engine 441, which performs DMA operations via payload bus 317 between SRAM 229 and CPRC 401 and SDP 420.

As is implied by the above arrangement, RxSDP 421, TxSDP 427, and payload bus interface 411 have first priority of access to DMEM 411, while global bus interface 413, CPRC 401, and the other CPRCs 401 must contend for the remaining access. The arrangement thus gives first priority to DMA transfers of protocol data units between SDP 420 and DMEM 405 on the one hand and between DMEM 405 and SDRAM 229 on the other.

Continuing in more detail with the components of serial data processor 420, RxSDP 421 is specialized for the processing of streams of incoming packets. It extracts fields containing protocol data from the incoming stream and provides the contents of a field either to ring bus 311 via ring bus interface 413 or to CPRC 401 via extract space 417. It provides the protocol data units from the packet stream via DMA transfers to DMEM 405. RxSDP 421 has three main subcomponents: pin logic 443, which receives the physical signals that represent the packet stream in the transmission medium, framing support processor 407, which locates the medium packets and transport packets in the packet stream, and byte processor 453, which extracts protocol information from the transport packets and their payloads while passing the transport packets on to DMEM 405 via path 425. Byte processor 451 can place the extracted protocol information in extract space 417 and/or place it in a ring bus message via ring bus interface 415.

TxSDP 427 is specialized for producing a stream of outgoing transport packets that carry protocol data units which TxSDP 427 obtains via DMA from DMEM 405. To do this, it merges the protocol data which CPRC 401 has placed in merge space 419 into the protocol data units. The components of TxSDP 427 are functionally comparable to those of RxSDP 421. Thus, byte processor 453 manipulates protocol data in the transport packets and their payloads, framing support processor 449 provides the protocol information needed for the medium packets, and pin logic 445 puts the data into the form required for the physical medium to which it is being output.

Further interesting features of SDP 420 are recirculation path 441 and aggregation paths 433 and 435. Recirculation path 441 permits packets stored in DMEM 405 to be returned to RxSDP 421 for further processing and output to DMEM 405. Aggregation paths 433 permits all of the RxSDPs 421 in a cluster 309 to receive the same input data and aggregation paths 435 permit TxSDP 427 to receive data for output from the TxSDPs in the other CPs 307 of the cluster to which CP 307(*i*) belongs.

Figure 25:
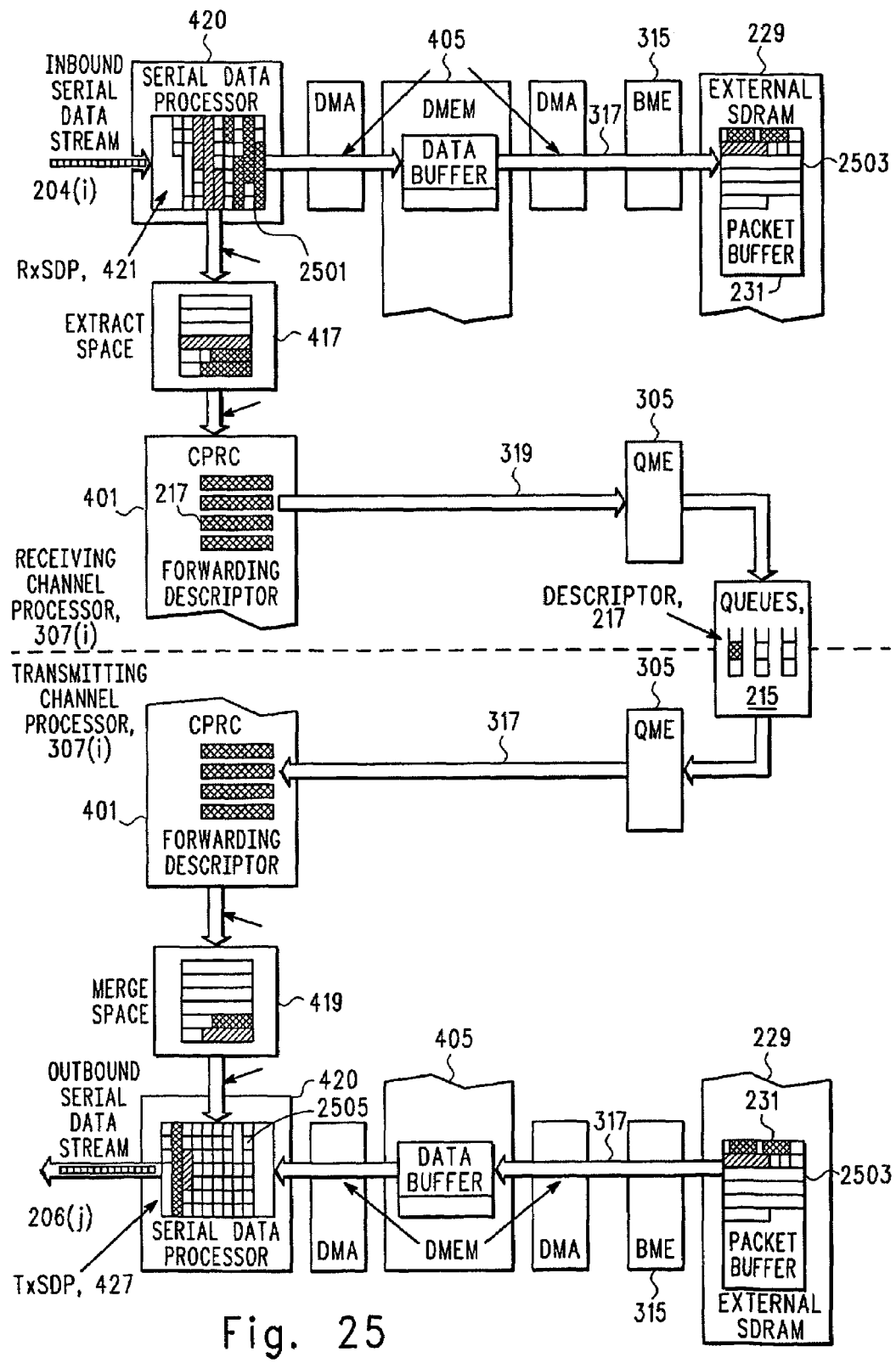
FIG. 25 shows how a receiving channel processor 307($i$) and a transmitting channel processor 307($j$) cooperate to switch a sequence of transport packets.

Example of Operation of Channel Processors 307: FIG. 25

FIG. 25 shows how a receiving channel processor 307(*i*) can cooperate with a transmitting channel processor 3070) to receive a stream of medium packets containing a sequence of transport packets at an input 204(*i*) belonging to receiving channel processor 307(*i*) and output a sequence of medium packets containing a sequence of transport packets at an output 2060) belonging to transmitting channel processor 3070) whose payload is the payload of the transport packets received in channel processor 307(*i*). The received and transmitted medium packets and transport packets may of course belong to different protocols.

The received medium packets are received in RxSDP 421 in channel processor 307(*i*). RxSDP 421 extracts protocol data from the transport packets and their payload to extract space 417 and DMAs protocol data units made up of the transport packets via DMEM 405 and payload bus 317 to BME 315, which places the protocol data units in buffer 231 in SDRAM 229, where the protocol data units are seen at 2503. Meanwhile, CPRC 401 in channel processor 307(*i*) uses the protocol data to make a descriptor 217, which it forwards to QME 305 for enqueueing via payload bus 317. (Not shown here is sending some of the protocol data via ring bus 311 to TLE 301 for translation.) When CPRC 401 sends descriptor 217 to be enqueued, CPRC 401 specifies that it be enqueued at the tail of a queue 215 whose head is being read by transmitting channel processor 307(*j*). QME 305 enqueues descriptor 207 at the tail of the specified queue 215.

When channel processor 307(*j*) dequeues a descriptor 207 from the head of queue 215, QME 305 sends it via payload bus 317 to channel processor 307(*j*). Channel processor 307(*j*) uses descriptor 207 to make protocol data for the stream of packets that is to be output and places the protocol data in merge space 419. It then initiates a DMA operation that transfers protocol data units 2503 from buffer 231 in SDRAM 229 via pay load bus 317 and DMEM 405 to serial data processor 420. There, TxSDP 427 adds the protocol data necessary to create a stream of medium packets 2505 for output 206(*j*) which carries the protocol data units 2503 from the packets received at 204(*i*).

Detail of Local Memory 501: FIG. 6

FIG. 6 shows local memory 501(*i*) for channel processor 307(*i*). As previously indicated, all of local memory 501(*i*) may be read or written by any of the components of digital communications processor 203 which share global address space 321.

Data Scopes 625(0) and 625(1)

As described above, RxSDP 421 DMAs the incoming packet stream to SDRAM 229 and as it does so, extracts protocol data from the incoming packet stream and provides it to CPRC 401 for processing, while TxSDP 421 receives the outgoing protocol data unit from SDRAM 229 and as it does so, receives protocol data from CPRC 401 and places it in the proper places in the outgoing packet stream. For a given transport packet, then, the processing involves two steps.

In the case of an incoming packet, they are:
  extracting the protocol data and DMAing the protocol data unit to SDRAM 229; and
  processing the protocol data in CPRC 401.

In channel processor 307, these two steps are pipelined: in the case of the incoming packet stream, CPRC 401 processes the protocol data extracted from the previous protocol data unit while RxSDP 421 extracts protocol data from the packet stream and DMAs the current protocol data unit from the packet stream. Transmissions are handled the same way, with TxSDP 421 transmitting the current protocol data unit while CPRC 401 processes the protocol data to be included with the next protocol data unit.

The pipelining is made possible by data scopes 625(0) and 625(1). These are data structures which are visible to and accessible by CPRC 401 and which control operation of SDP 420 and the interaction between CPRC 401 and SDP 420. A given data scope 625(*i*) contains a set of data scope registers 624 and a set of flags 632(*i*) in datascope event registers 632. Data scope registers 624 are further made up of a Tx data scope 641 and an Rx data scope 643. Rx data scope 643 receives the protocol data extracted by RxSDP 421 from the incoming packet stream during the first step and CPRC 401 processes the protocol data in the second step; similarly, Tx data scope 643 receives the protocol data which CPRC 401 processes for the outgoing packet stream during the first step and TxSDP 427 outputs the protocol data from Tx data scope 643 during the second step.

In addition to providing for pipelining of packet processing, the data scopes 625 also provide a uniform interface for programs executing on CPRC 401 to the stream of packets currently being received by the SDP's RxSDP 421 or transmitted by TxSDP 427. In applications where further processing of a stream is necessary, the number of data scopes can be increased. For example, RxSDP processing that involved processing an incoming stream, storing the resulting PDU in DMEM 405, then using recirculation path 441 to again process the PDU stored in DMEM 405, and then DMAing the final PDU to SDRAM 229 might involve four data scopes.

Programs executing on CPRC 401 determine which of the data scopes is currently being used by SDP 420. While SPD 420 is extracting protocol data to and merging protocol data from data scope 625(0), CPRC 401 is processing protocol data in data scope 621(1). When SDP 420 is done with data scope 625(0), it signals CPRC 401 and CPRC 401 sets up data scope 625(1) so that SDP 420 can begin working on it and begins working itself on data scope 621(0).

Continuing in more detail with the contents of data scope 625(*i*), Rx data scope 643 includes extract registers 601, which contain the protocol information extracted by RxSDP 601, RxCB 633, which contains the information necessary to DMA the packets being received by RxSDP 421 to SDRAM 229, and Rx status 635, which contains status information about RxSDP 421, including whether it is finished DMAing the packet it is working on. Tx data scope 641 contains analogous registers for packet transmission. Merge registers 603 contain the protocol data to be merged with the outgoing packets, TxCB 633 contains the information necessary to DMA the packets being transmitted by TxSDP from SDRAM 229, and Tx status contains status information about TxSDP 427, including whether it is finished with the packet it is working on.

Control Block Registers 611

Control block registers 611 are a set of four registers that control DMA transfers between CPRC 401 and SDRAM 229. A WrCB 610 controls DMA transfers from CPRC 401 to SDRAM 229 and a RdCB controls DMA transfers to CPRC 401.

Ring Bus Control Registers 617

These registers are part of ring bus interface 415. They permit RxSDP 421 and CPRC 401 to send messages on the ring bus and CPRC 401 to receive messages on the ring bus. There are 4 registers for sending messages, 8 registers for receiving replies to messages sent by CP 307(*i*), and a queue of registers for receiving unsolicited messages.

SONET Overhead Bits 612

This register contains the SONET overhead bits for SONET packets being output by CP 307(*i*).

RxSDP Control 613 and TxSDP Control 615

These registers contain parameters which control the operation of RxSDP 421 and TxSDP 427 respectively.

CP Mode Register 625

This register contains parameters which control operation of CP 307(*i*).

SDP Mode Register 627

This register contains parameters which control operation of SDP 420.

Queue Status 621

Queue status 621 contains information about the status of channel processor 307(*i*)'s mailbox in QME 305 and about the status of queues being read by channel processor 307(*i*). The hardware for the register indicating the status of channel processor 307(*i*)'s mailbox is controlled directly by QME 305. Reading and writing the register thus does not result in traffic on global bus 319. QME 305 DMAs the status of the queues being read by channel processor 307(*i*) via payload bus 317 to DMEM 405.

Event Timer 620

This register contains an event timer that can be set and started by software executing in CPRC 401; when the timer expires, an event results to which CPRC 401's event mechanism responds.

Cycle Counter Register 619

Cycle counter register 619 contains a counter value, a clock division value, and a CC enable bit. CPRC 401 can set the counter value, the clock division value, and the CC enable bit. The clock division value specifies the rate at which the counter value increments relative to the CPRC 401's clock. When CPRC 401 sets the CC enable bit, the counter begins running; when CPRC 401 clears the CC enable bit, the counter stops running. The current counter value is not affected by setting or clearing the CC enable bit.

Event Register 631

This register contains flags that indicate whether an asynchronous event that CPRC 401 must respond to has occurred. There are two classes of events: general events, whose flags are in register 630, and events related to data scopes 625, whose flags are in data scope event registers 632.

Along with all of the registers thus described, a CPRC 401 can also access data in its local data memory 405 and can set up DMA transfers as described above between SDRAM 229 and local data memory 405 and between an SDP and SDRAM 229 via local memory 405.

Figure 7:
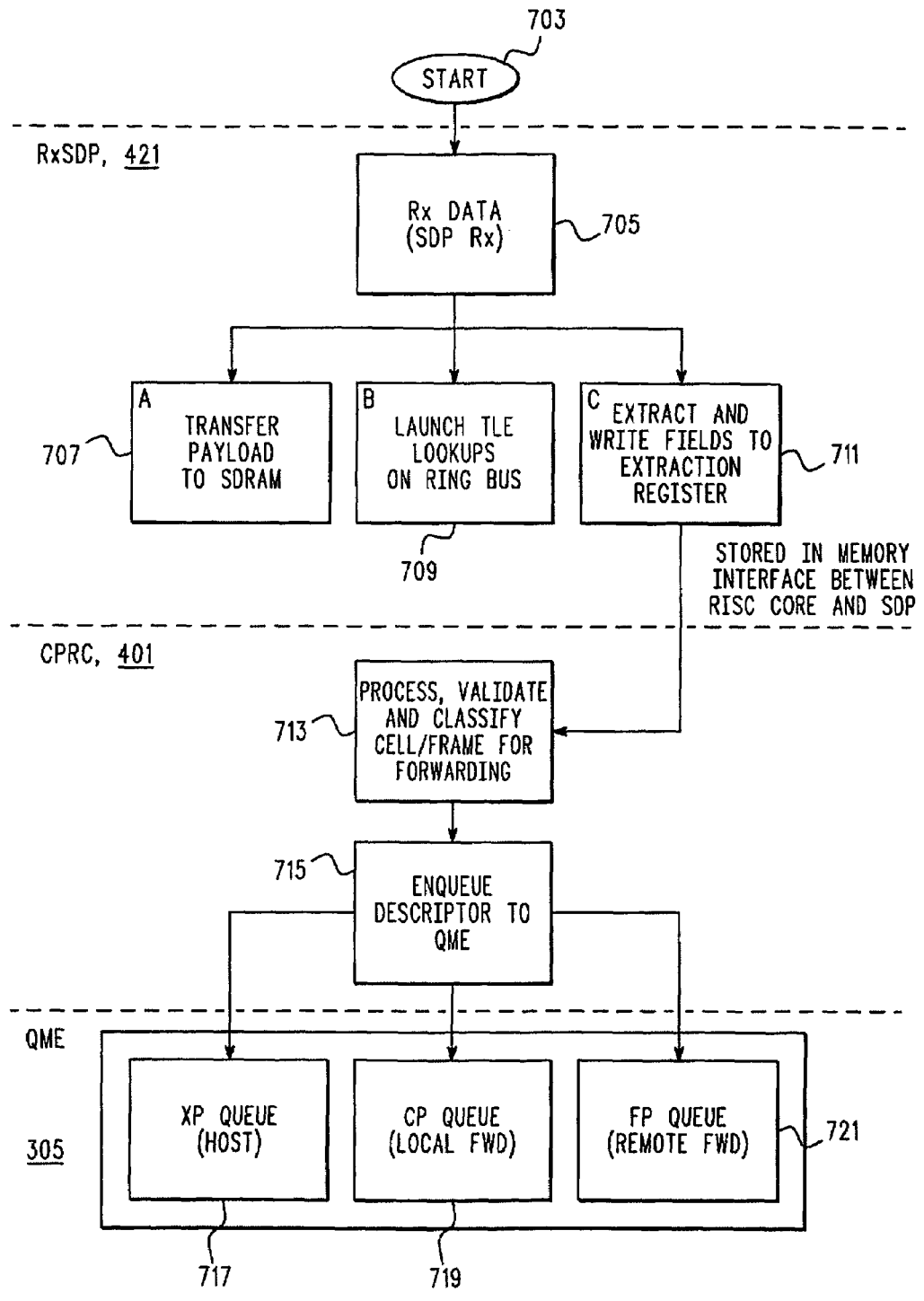
FIG. 7 is a flowchart of the processing of packets received in a channel processor.
Figure 8:
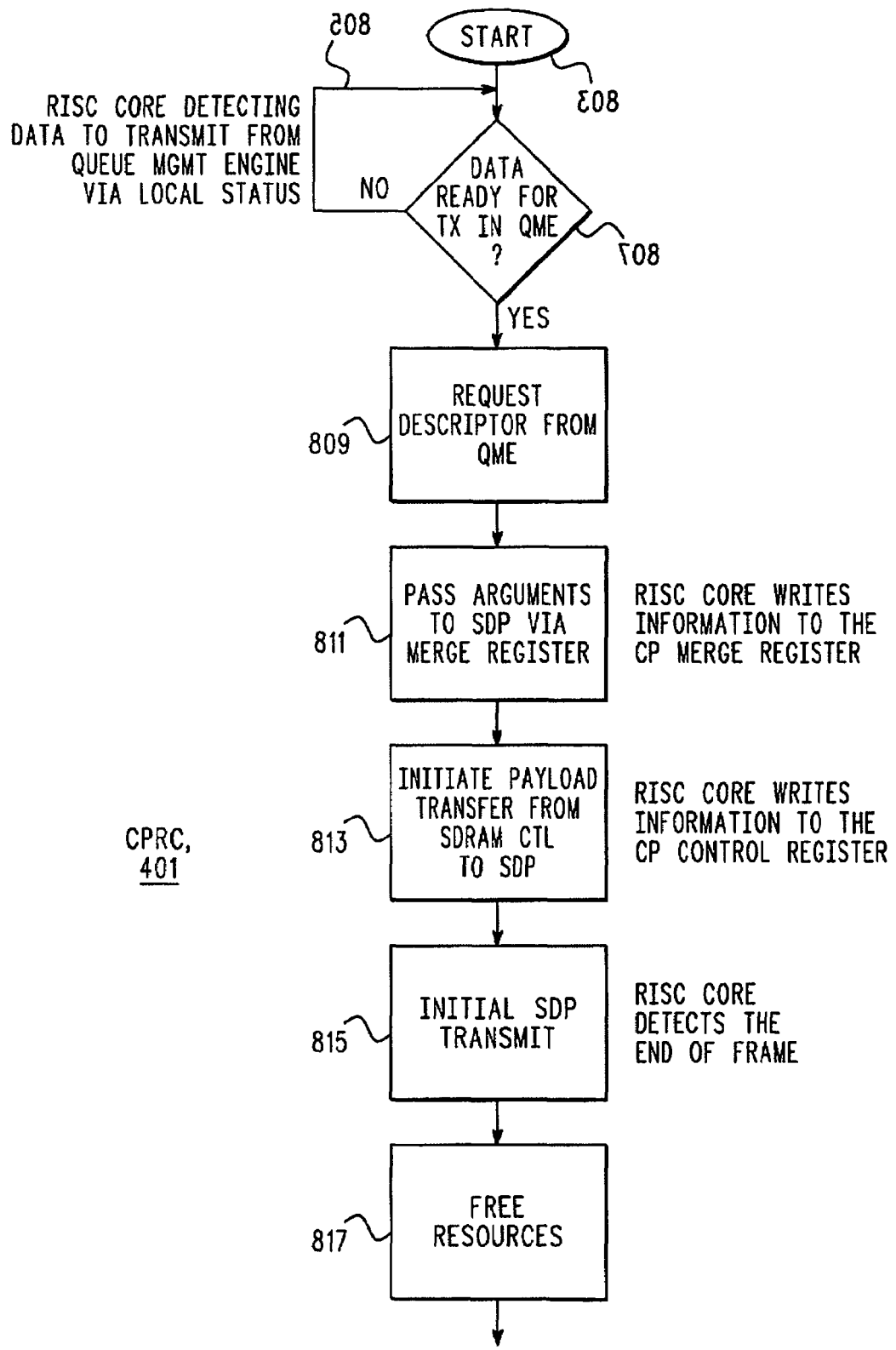
FIG. 8 is a flowchart of the processing of packets output by a channel processor.

Details of an Example of Cooperation of CPRC 401, RxSDP 421, and TxSDP 427: FIGS. 7–9

FIG. 7 provides an overview of how RxSDP 421 and CPRC 401 can be programmed to interact in dealing with a stream of incoming packets. Flowchart 701 indicates not only the actions performed, but which of RxSDP 421, CPRC 401, and QME 305 performs the actions. Starting at 703, an incoming packet is read by RxSDP 421(705). What RxSDP 421 does with what it reads depends on the position of the material in the packet. There are three kinds of information RxSDP 421 has to deal with: protocol data units, protocol information that must be translated by TLE 301, and protocol information that must be processed by CPRC 401. As shown at box 707, RxSDP 421 uses DMA to transfer the protocol data unit as it reads it to SDRAM 229 via DMEM 405; as shown at 709, RxSDP 421 uses ring bus 311 to send a message to TLE 301 with the protocol information that TLE 301 must translate; as shown at 711, finally, RxSDP 421 uses extract space 601 to transfer the information that CPRC 401 needs to process the protocol information to CPRC 401.

At block 713, CPRC 401 uses the information it receives from RxSDP 421 and the reply it receives from TLE 301 in response to RxSDP 421's message to determine what should be done with the transport packet. If the transport packet is invalid, either because its contents have been corrupted or because its payload is from a source that is filtered out by the packet switch, CPRC 401 marks the packet for discarding. In response to the mark (contained in a trailer that is added during DMA), the DMA engine stops transmitting and BME 315 frees the buffer 231 that was receiving the packet.

If the transport packet is valid, CPRC 401 uses the information it has received from TLE 301 and the information in extract space 601 to determine the queue 215 that the protocol data unit from the packet is to be placed in and to make a descriptor 217 for the queue. Then, at 751, it places an enqueue command containing the descriptor and the number of the queue in which the protocol data unit is to be placed on payload bus 317.

QME 305 responds to the enqueue command by putting the descriptor 217 in the proper queue 215. As shown at boxes 717, 719, and 721, there are three broad classes of queue, depending on the component of DCP 203 that reads the queue: queues read by XP processor 313; queues read by a channel processor 307; and queues read by fabric processor 303. In the case of the queues read by XP processor 313, the protocol data unit corresponding to the descriptor may go to host 227; in the case of the queues read by fabric processor 303, the protocol data unit corresponding to the descriptor goes to a switch fabric.

It should be pointed out here that because RxSDP 421, CPRC 401, and QME 305 are all independently-operating processors, the processing shown in flowchart 701 can be done in parallel. Pipelining with RxSDP 421 and CPRC 401 has already been explained; moreover, CPRC 401 does not have to wait for QME 305 to respond to CPRC 401's enqueue command.

Continuing in more detail with the role of data scopes 625 in the interaction of CPRC 401 and RxSDP 421, details of receive data scope 643 are shown in FIG. 9. Beginning with Rx status register 635, that register indicates the state of the interaction between RxSDP 421 and CPRC 401; the register has four fields that are of interest: OWN field 935 is set by hardware; the bit indicates whether RxSDP 421 or CPRC 401 is presently using the data scope 625 to which Rx status 635 presently belongs. L5:L0 937 are six handshake bits that are set and reset by RxSDP 421 and CPRC 401 under program control. Busy 941 is set by RxSDP 941 and indicates whether RxSDP 421 is busy. Tx Status 639 is similar in function and contents to RxStatus 635.

RxCB 633 governs the interaction between RxSDP 421 and DMA engine 441 during DMA of the incoming packets. CPRC 401 sets up RxCB 633 when it owns the data scope 625(*i*) to which RxCB 633 belongs and RxSDP 421 uses RxCB 633 to continue DMAing incoming packets while it and CPRC 401 are alternating ownership of data scope 625(*i*). Most of the fields in RxCB 633 contain the various kinds of addressing information needed to perform the DMAs. Buffer pool number 909, BTAG 933, and Offset 931 together specify the location in DRAM 229 to which DMA engine 441 is currently writing the packets received by RxSDP 421.

As will be explained in more detail later, DRAM 229 is divided into buffer pools. BTAG 933 is the buffer tag 233 for the buffer in the pool, and offset 931 is the offset in the buffer to which data is presently being written. As DMA engine 441 writes data, it updates offset 931. DMEM DMA address 907 is the address of the 16-byte line of data in DMEM 405 from which DMA engine 441 is currently DMAing data to DRAM 229. Txrcy address 905 and Rxrcy address 903 are special addresses that RxSDP 421 uses when it is recycling data from DMEM 405.

Txrcy address 905 specifies the DMEM 405 line to which data is currently being written by DMA engine 441 for TxSDP 427, while Rxrcy address 903 specifies the DMEM 405 line for which RxSDP 421 is currently writing data. The addresses thus permit RxSDP 421 to recycle packets either before they have been written to SDRAM 229 or after they have been written to SDRAM 229. DMEM byte address 901 is the line in DMEM 405 for which RxSDP 421 is currently writing data.

RxDBCTL 913 contain control and status fields which govern the interaction between CPRC 401, RxSDP 421, and DMA engine 441:

Avail 929 indicates whether RxCB 633 is available for use;

NR 927 indicates the number of requests that DMA engine 441 should make to transfer data to DRAM 229 before giving up on the transfer;

Error 925 indicates whether an error has occurred during the transfer currently represented by RxCB 933;

Own 921 indicates whether the line in DMEM 405 to which RxSDP 421 writes and from which DMA engine 411 reads is currently being written by RxSDP 421 or read by DMA engine 411;

EOP 917 is set by RxSDP 421 when it encounters an end of packet indicator in the data to be written to the line in DMEM 405;

ST 915 is the current status of SDP 420;

BCTL state 919 is the current state of payload bus 317; and

Length 911 is set by RxSDP 421. It is the length of the data in the line in DMEM 405 which RxSDP 421 is writing to.

TxCB 637 is substantially like RxCB 633, except that the DMA transfers it governs are going in the opposite direction and the fields have the meanings corresponding to that direction.

When RxSDP 421 sets OWN bit 935, L2 Done 937, or L1 done 939 in Rx status register 636 or Avail bit 929 in RxCB 633, the result is an interrupt to CPRC 401; which action produced the interrupt is indicated by bits in data scope event registers 632 for the scope in which RxSDP is in when it sets the bit in question. The same arrangement is used for the corresponding bits in Tx data scope 641.

Initially, CPRC 401 has set up data scope 625(0) and given ownership to RxSDP 421. CPRC 401 now owns data scope 625(1). When a packet comes in, RxSDP 421 extracts protocol data and writes it to extract space registers 601(0). It sends a message containing protocol data that requires translation to TLE 301 in Txmsg 645(0). The results of the lookup will appear in a RxResp register 647(0,*i*). While this is going on, RxSDP 421 begins writing the protocol data unit to the line in DMEM 405 specified in RxCB 633(0). When the entire line has been received, RxSDP 421 sets owner bit 935 in Rx status 635 to indicate that CPRC 401 now has ownership of data scope 625(0), sets owner bit 921 in RxCB633(0) to indicate that DMA engine 411 may now read the line it has written, and produces a signal which automatically switches RxSDP 421 to data scope 910(1). RxSDP 421 then examines data scope 625(1)'s owner bit 935 bit to see whether CPRC 401 still has control of it. If CPRC 401 has control, RxSDP 421 waits until CPRC 401 relinquishes control of data scope 625(1) before it begins processing the next packet. Processing is as above, except that RxSDP 421 uses the resources of data scope 625(1) instead of data scope 625(0).

While RxSDP 421 is working with receive data scope 625(1), CPRC 401 processes receive data scope 625(0). It examines and/or removes the protocol data which RxSDP 421 placed in extract space registers 601(0), examines RxCB 633(0) to determine whether the DMA to SDRAM 229 finished without error and sets up RxCB 633(0) for its next use by RxSDP 421. It then uses the protocol data which RxSDP 421 placed in extract registers 601 and any translations received from TLE 301 in RxRsp structure **647(0,*i*) to make a descriptor for the data being written to SDRAM 229 and places the descriptor in channel processor 307's mailbox in QME 305. When it has done all of this, it sets owner bit 935(0) so that receive data scope 625(0) is again available to RxSDP 421. If owner bit 935(1) is set, indicating that RxSDP 421 is finished with receive data scope 625(1), CPRC 401 works on receive data scope 625(1) in the same fashion as described for receive data scope 625(0)**.

FIG. 8 provides an overview of how CPRC 401 and TxSDP 429 interact in transmitting a stream of transport protocols. Transmitting is much simpler than receiving since the outgoing packets need only be assembled and transmitted, not interpreted. Most of the work on transmission is done by CPRC 401. Beginning at 803, CPRC 401 first executes loop 805; that is, it checks the queue status information it has received from QME 305 to see whether there is a descriptor in a queue 217 being read by channel processor **307(*i*). As indicated at 807, if there is one, CPRC 401 places a dequeue command on payload bus 317 and receives the descriptor from QME 305, also via payload bus 317. CPRC 401 then uses the information in the descriptor to set up merge registers 603 as required for the packets being transmitted (811), uses the buffer tag in the descriptor to set up registers in Tx control block register 637 to transfer the contents of the buffer from SDRAM 229 to TxSDP 427 (813), and then initiates the transfer (815). When status 915 or EOP 917 indicate the end of the transfer, CPRC 401 frees TxSDP 427 and the other resources involved in the transfer (817). TxSDP 427 and CPRC 401 alternate in the use of data scopes 625(0) and (1) in the same fashion as RxSDP 421 and CPRC 401. Since alternation between data scopes is under control of the program being executed by CPRC 401, the program can do whatever is necessary to allocate the resources represented by a data scope between TxSDP 427 and RxSDP 421**.

Figure 10:
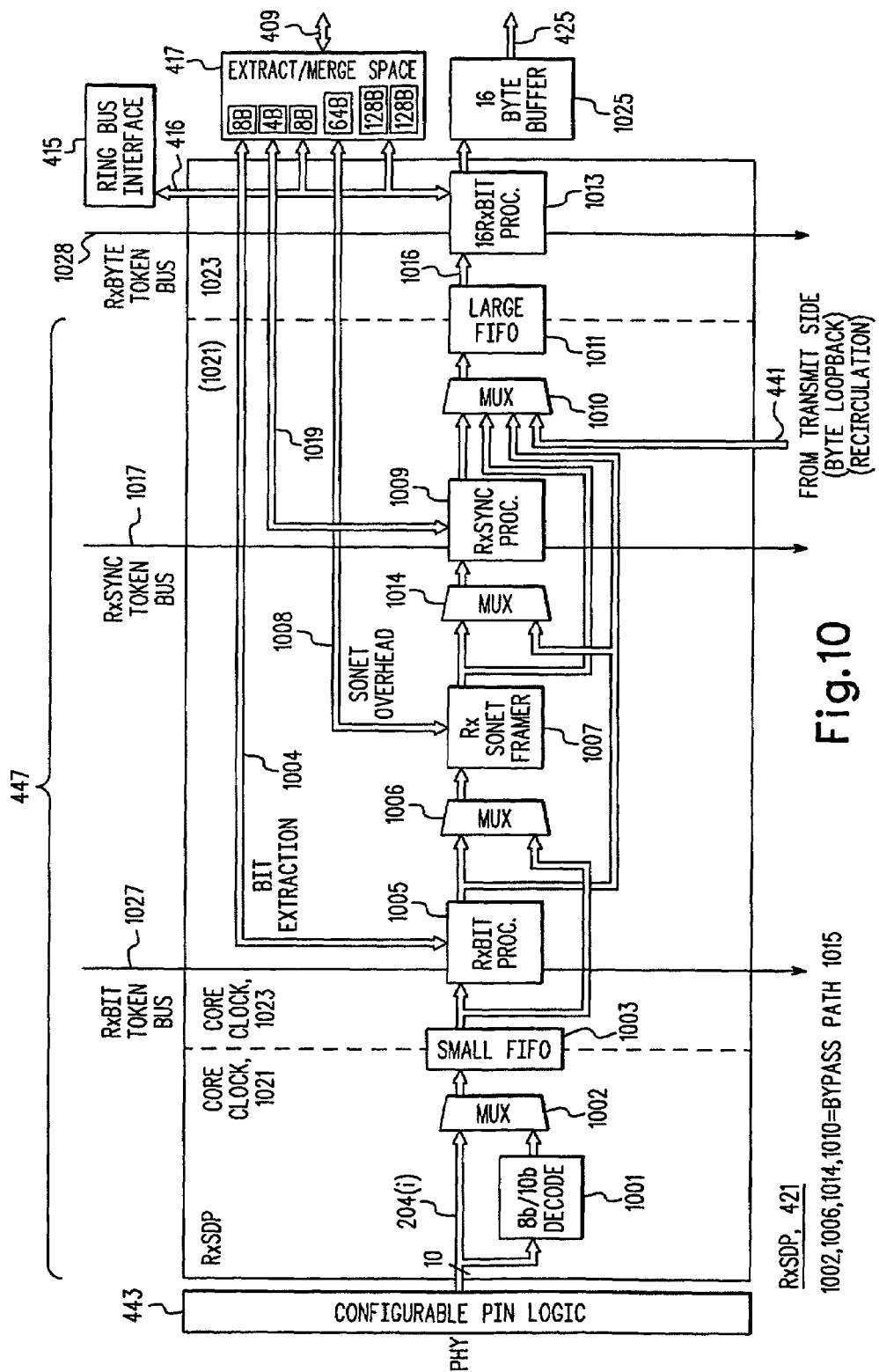
FIG. 10 is a detailed block diagram of a receive processor 421.
Figure 11:
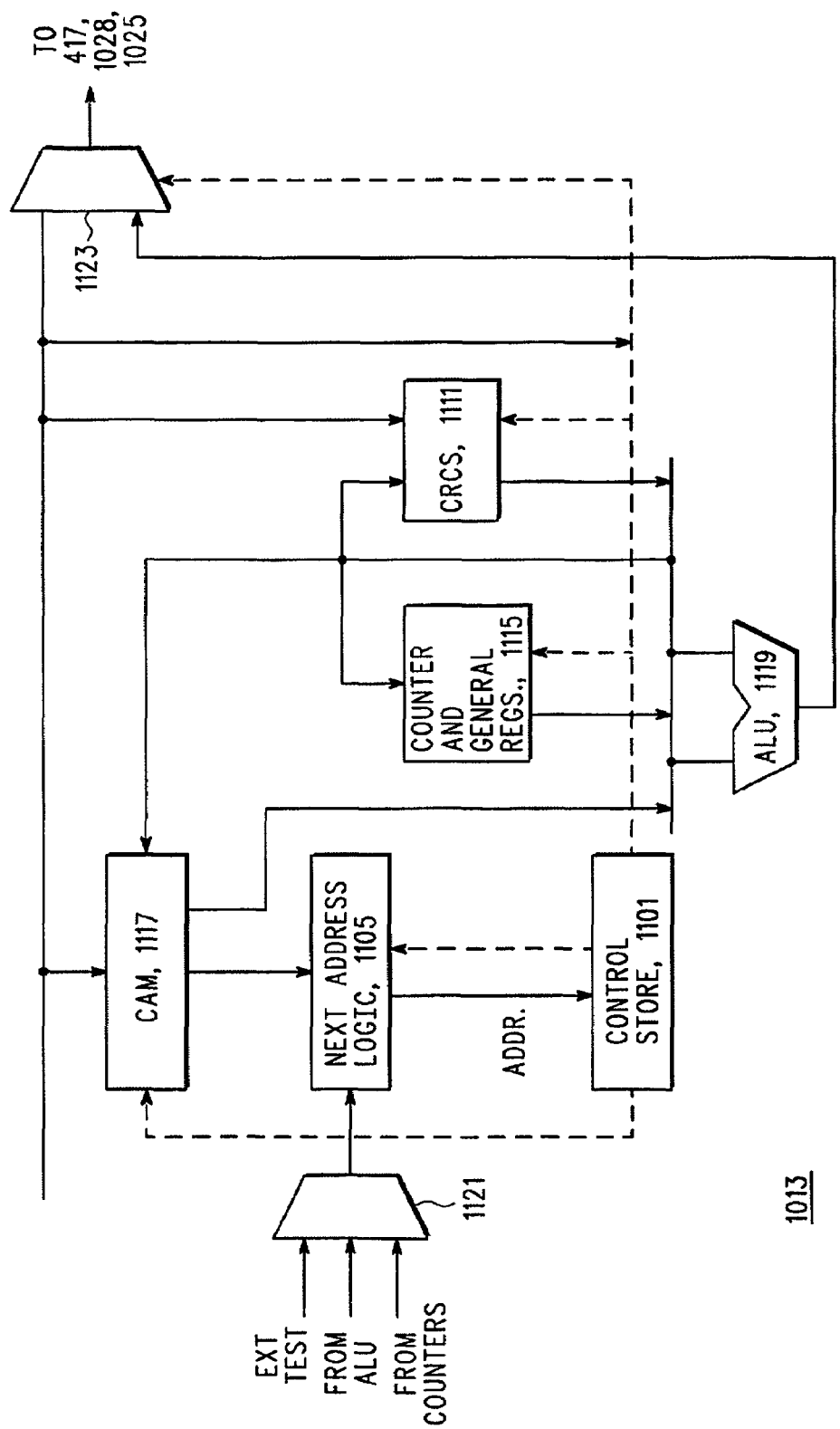
FIG. 11 is a block diagram of a receive byte processor.

Details of RxSDP 421: FIGS. 10 and 11

RxSDP 421 and TxSDP 427 provide each channel processor **307(*i*) with a programmable interface between serial input 204(*i*), serial output 206(*i*), and the other components of channel processor 307(*i*). A given serial input 204(*i*) can thus be programmed as required to deal properly with medium and transport packets belonging to given protocols and a given serial output 204(*j*) can be programmed to output medium and transport packets belonging to given protocols. Each SDP 421 or 427** has its own microprogram store and independent register sets.

FIG. 10 is a block diagram of RxSDP 421. The components are a sequence of processors and FIFOS that convert the serial input to parallel and process the input first at the medium packet level and then at the transport packet level or higher. Some of the processors are specialized for dealing with particular protocols. A bypass path may be programmed to permit data to bypass any of the processors and/or FIFOs. In overview, the components are the following:

configurable physical logic 443, which receives serial input from the physical layer and interprets it to produce a stream of 10-bit codes.

pin interface **204(*i*)**, which receives the 10-bit codes from the physical layer.

8b/10b decode 1001, which produces bytes from the 10-bit codes received from pin logic 443;

small FIFO 1003, which is an asynchronous FIFO (queue) with different programmable write and read clocks. The write clock runs at a frequency required for the input data stream and the read clock runs at the speed of CPRC 401. In a presently-preferred embodiment, FIFO 1003 is eight 9-bit words deep.

receive bit processor 1005, which does pattern matching and field extraction on the stream of bytes it receives from small FIFO 1003, with the extracted fields going via path 1005 to extract space 417.

receive SONET framer 1007, which processes SONET frames. It descrambles the data in the frame, removes the protocol data from the frame, checks parity, and writes the protocol data to extract space 417 via path 1008.

receive sync processor 1009, which processes ATM cells. It finds the cell boundaries, removes the protocol data, starts a TLE operation with the protocol data, descrambles the payload, and writes the protocol data to extract space 417 via path 1019.

large receive asynchronous FIFO 1011, which is an asynchronous FIFO. In a presently-preferred embodiment, FIFO 1011 is 64 10-bit words deep. FIFO 1011 is used mainly for staging an ATM cell while its VPI/VCI is being looked up by TLE 301 and for providing elasticity with high-speed receive packets.

receive byte processor 1013 operates under microcode control to do pattern matching and field extraction on nine-bit words of data.

Bypass path 1015 is implemented by means of the muxes 1002, 1006, 1014, and 1010. Mux 1010 also implements recirculation path 441. The bypass and recirculation paths are dynamically reconfigurable by setting bits in SDP mode 627. Data may be passed directly between CPRC 401 and bit processor 1005, sync processor 1009, or byte processor 1013 by means of registers in RxSDP control 613.

As previously explained, channel processors 307 may be aggregated to process very high-speed streams of data. When aggregated, the aggregated channel processors operate as a pipeline, with each of the aggregated channel processors processing a portion of the data stream in turn. Coordination between RxSDPs 421 of an aggregation is achieved by means of token buses 1027, 1017, and 1028. For example, in an aggregation, an enabled Rx bit processor 1005 will process the incoming data stream only when it has the token provided by token bus 1004. Several token buses are necessary because the components of RxSDP 421 used to process an input stream will vary with the kind of input stream.

Figure 47:
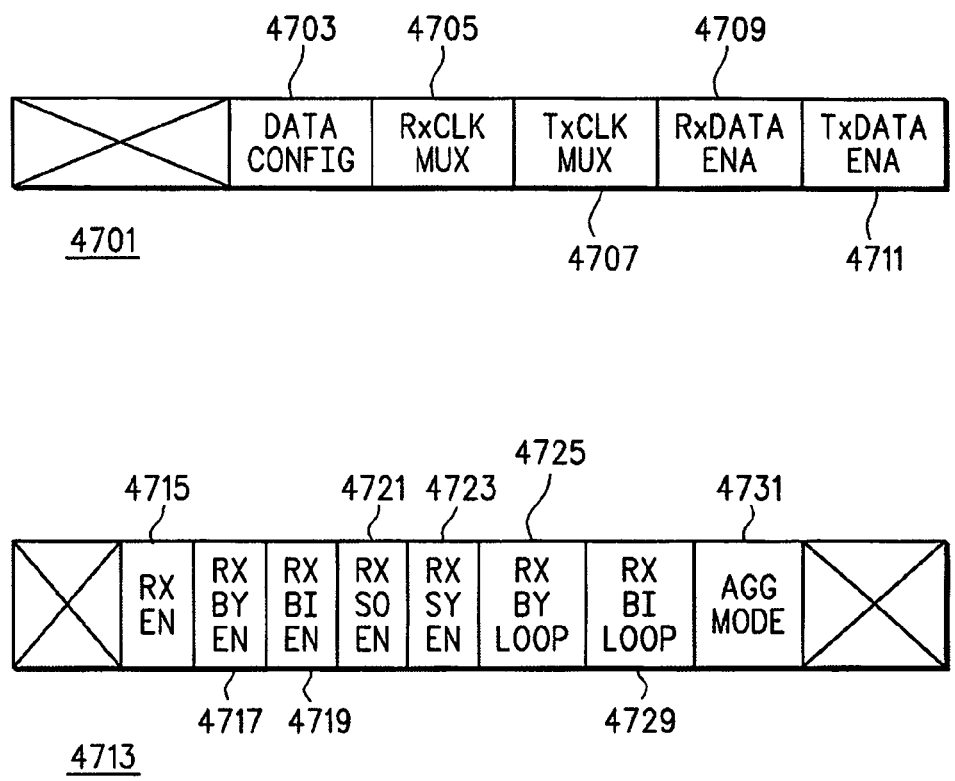
FIG. 47 shows the registers used to configure the pins and the receive and transmit processors.

Details of Configurable Pin Logic 443: FIGS. 46 and 47

Configurable pin logic 443 can be configured in two ways:
- to provide an input stream to or receive an output stream from one, two, or four of the SDPs 420 in a cluster; and
- to work with the different physical interfaces required for the media by means of which the input stream or output stream is being transmitted.

The first kind of configuration is one of the elements which permits aggregation of channel processors 307 in a cluster 309 for purposes of processing very high-speed input or output streams; the second kind of configuration permits DCP 203 to be used with different transmission media without the addition of devices external to DCP 203 to adapt signals received from the media for use by DCP 203. Both kinds of configuration are controlled by a registers in the channel processors' local memory. The registers may be set by the channel processor itself or by XP 313.

FIG. 46 is a table 4601 showing how a cluster 309 in a DCP 203 may be configured to receive and produce serial data streams conforming to the RMII, OC-3, DS1, DS3, GMII, TBI, and OC-12 standards. Column 4603 lists the I/O pins for each of the channel processors in the cluster; column 4605 indicates the general purpose of the pin; thus, in each channel processor, I/O pins 0 and 1 are for clock signals, while the remaining pins are for data. The remaining columns show how the pins are used for each of the media: column 4607 indicates how they are used in RMII; 4609 how they are used in OC-3; 4611 how they are used in DS3; 4615 how they are used in GMII when two of the channel processors in the cluster are used to receive data and two to transmit; 4617 how they are used in TBI when the channel processors are used in the same fashion; and 4619 how they are used in OC-12, where the channel processors in a cluster alternate between being transmitters and receivers.

The various media require different kinds of drivers and receivers for the I/O pins; thus, each I/O pin in configurable pin logic 443 has a tri-state driver, a TTL driver, and a PECL driver. With media such as OC-3, which used PECL logic, pairs of I/O pins are configured as differential pairs, as shown in column 4609.

FIG. 47 shows pin mode register 4701 and SDP mode register 4713. Each channel processor 307 has one of each of these registers. Register 4701 determines how that channel processor's I/O pins are configured. Data Cnfg bits 4703 are four bits that determine whether the I/O pins will be driven by a tri-state driver, a TTL driver, or a PECL driver. RxClk Mux 4705 and TxClk Mux 4707 respectively specify which pins are being used to carry receive and/or transmit clock signals. Rx data enable 4709 specifies which pins will be used to receive data. Tx data enable 4711, finally, specifies which pins will be used to transmit data.

SDP mode register 4713 contains bits that control which of the components of RxSDP 421 are enabled, what of the recirculation circuitry is enabled, and what kind of aggregation is being presently employed in the cluster to which channel processor 309 belongs. There is a similar register for the channel processor's TxSDP 427. RxEn bit 4715 indicates whether the channel processor's RxSDP 421 is enabled; bit 4717 indicates whether its byte processor 1013 is enabled; bit 4719 indicates whether its bit processor 1005 is enabled; bit 4721 indicates whether Rx Sonet framer 1007 is enabled; bit 4723 indicates whether Rx sync processor 1009 is enabled. The next two bits are for recirculation control, with bit 4725 indicating recirculation to byte processor 1013 and bit 4729 recirculation from extract space 417 to bit processor 1005. Aggregation mode field 4731 is a two-bit field that specifies whether there is no aggregation in the cluster, two-way aggregation (i.e., two channel processors receiving and two transmitting) or four-way aggregation (all four channel processors either receiving or transmitting).

Implementation of Processors in the SDPs: FIG. 11

FIG. 11 shows how the processors in the SDPs are implemented. The processor shown here in detail is RxByte processor 1013, but the processors in Rxbit processor 1005 and receive synch processor 1009 are similar. Sonet framer 1007 is a configurable state machine that is implemented using a processor like the one in FIG. 11.

As shown at MUX 1107, RxByte processor 1013 receives external inputs from large FIFO 1011. RxByte processor 1013 may provide external outputs via MUX 1123 to ring bus interface 415, extract space 417, or buffer 1025, which in turn provides protocol data units to DMEM 405. Components internal to RxByte processor 1013 include:

- control store 1101, which contains the microcode executed by processor 1013 and responds to the currently-addressed microinstruction by providing control signals (dotted arrows) controlling the other components of processor 1013. Control store 1101 may be loaded by XP 313.
- Next address logic 1105, which responds to control signals from control store 1105 and inputs from condition code mux 1121 and content-addressable memory (CAM 1117) by selecting the next microinstruction to be executed from control store 1101.
- Counters 1109 and general registers 1115. The counters keep track of the bit locations in the packet at which processing is currently taking place. There are four 8-bitcounters, 1109(0 . . . 3), which may be configured as 2 16-bit counters, and as shown by the input from the counters to next address logic 1105, the microcode may specify actions that depend on the counter values. The general registers 1115 are 6 8-bit registers for storing data used during processing.
- CAM (content-addressable memory) 1117: a CAM is a memory which is used in pattern matching. Each cell in the CAM contains a pattern, and when data is presented to the CAM which matches a pattern stored in a CAM cell, the CAM outputs the location of the cell in the CAM. The microcode may specify actions that depend on the values output by the CAM. CAM 1117 is loaded by CPRC 401 and XP 313. There are 64 9-bit words in the CAM and the CAM can be programmably divided into up to 16 "logical CAMs.
- CRC 1111 is specialized hardware for performing cyclic redundancy checks. Other specialized hardware may be included for descrambling packets.
- ALU 1119 is an eight-bit ALU incorporating a barrel rotator.

As may be seen from the foregoing, XP 313 sets up Rx byte processor 1013 for operation by loading CTL store 1101 and CAM 1117. CPRC 401 stops and starts byte processor 1013 with a reset signal.

Once byte processor 1013 is set going, it presents each byte it receives to CAM 1117. If a match indicating the beginning of a transport packet is found, control logic 1105 begins executing the microcode for handling the transport packet. Counters are set, and byte processor 1013 processes the packet as indicated by further matches found by CAM 117 and the counter values. Matches may be specified in the microcode either by (pattern, mask, length) or by (offset, pattern, mask, length), where offset is the offset in the packet, mask specifies "don't care" bits, and length specifies the number of bits in the match. The protocol data from the transport packet is extracted and directed to extract space 417 or to ring bus interface 415 via path 1019 and the protocol data unit is extracted and sent via path 425 to 16 byte buffer 1025, from whence it is DMA'd to a line in DMEM 405. Extractions are specified in the microcode by (offset, length, register address), where offset is again the offset in the packet, length is the length in bits of the field to be extracted, and register address is the address of a register in general registers 1115 in which the field is to be stored.

Details of Rx Bit Processor 1005

Continuing in more detail with the functions performed by the components of RxSDP 421, Rx bit processor 1005 is like Rx byte processor 1013 except that it has a linear feedback shift register instead of CRC 1111. The linear feedback shift register may be configured to lengths up to 32 bits and has polynomial and position relative to the data stream. The linear feedback register is used to generate hash values or other checksums. Rx bit processor 1105 deals with the stream of bytes received by RxSDP 421 at the lowest level. Thus, it may be programmed to detect HDLC frames and invalid sequences, to remove stuffed zeroes, to find the STS frame in an OC-3 data stream and to find and delete the preambles of incoming Ethernet frames.

Details of Receive SONET Framer 1007

Receive SONET framer 1007 deals with SONET frames. Framer 1007 may receive the frame either from Rx bit processor 1005 or directly from pin interface 204(*i*) via bypass 1015. Inputs to SONET framer 1007 include the receive clock frame sync signal recovered by the physical layer interface chip connected to pin interface 204(*i*) and the eight-bit data contained in the frame. A SONET frame contains transport overhead and a synchronous payload envelope (SPE) which contains the frame's payload. Included in the transport overhead is an STS pointer which points to the synchronous payload envelope. The synchronous payload envelope contains path overhead bytes.

Receive SONET framer 1007 descrambles the bytes in the SONET frame, checks parity, and writes the transport overhead to extract space via path 1008. Receive SONET framer 1007 further interprets the STS pointer to find the SPE. Having found it, it checks parity and writes the SPE's path overhead to extract space. The payload in the SPE is passed to further components of RxSDP 421 as required by the kind of payload. For example, if the payload is ATM cells, they are passed on to receive sync processor 1009. In the preferred embodiment, receive SONET framer 1007 does no demultiplexing of the SPE payload.

Details of Receive Sync Processor 1009

Receive Sync Processor 1009 is specialized to deal with ATM cells. An ATM cell contains 53 bytes. 5 bytes are a header which contains a virtual path indicator, a virtual channel indicator, a payload type indicator, a cell loss priority indicator, generic flow control information and a header error check byte. The remaining 48 bytes are payload. Receive Sync Processor 1009 determines that a stream of bytes is a stream of ATM cells by applying the header error check sequentially to five-byte sequences, taking the fifth byte in the sequence as the header error check byte for the preceeding four bytes in the sequence. If the header error check fails, receive sync processor 1009 continues trying it. If the header error check succeeds, receive sync processor 1009 has found an ATM cell. If it finds a programmable number of cells in a row, it is synchronized on a stream of ATM cells. It remains synchronized until a programmable number of consecutive header error checks fail, indicating that sync processor 1009 is no longer synchronized on a stream of ATM cells.

When receive sync processor 1009 is in synchronization on an ATM stream, it parses the ATM cell's header and outputs the contents of the header to extract space. Receive sync processor 1009 further processes the payload by descrambling it and by appending a status byte to the payload so that it can be discarded if the header check for the cell fails. Generally speaking, the payload output from receive sync processor 1009 goes to large FIFO 1011, which has enough depth to permit the TLE look up on the VPI-VCI before further processing of the payload is required.

Details of Receive Byte Processer 1013

Receive byte processor 1013 may be programmed to perform several functions:

it handles the HDLC escape sequence for PPP over SONET;

it does 32-bit CRC checking, including frame check sequences for Ethernet and AAL5;

when channel processor 307(*i*) has been aggregated with others to handle 1000BASE-X Gigabit Ethernet, receive byte processor 1013 does Ethernet delimiter recognition; using the recirculation path, receive byte processor 1013 may be aggregated with others to handle T1 and T3 data rates. The recirculation path also permits processing of multi-channel HDLC and encryption/decryption; and receive byte processor 1013 writes a status word to extract space when it detects an end-of-frame.

receive byte processor 1013 extracts the VPI/VCI from the header of an ATM cell and sends a message containing the virtual path indicator and the virtual channel indicator via ring bus 311 to TLE 301. TLE 301 responds to the message by returning a message to channel processor 307(*i*) indicating the output queue for ATM streams having that VPI-VCI combination.

Receive byte processor 1013 processes 9-bit words. Its operation has already been explained in detail.

Example of Cooperation of the Components

In the following example, it will be presumed that RxSDP 421's pin interface 204(*i*) is connected to an optical cable upon which payload data is being transmitted using the SONET protocol. The payload data in the SONET frame is ATM cells, and the payload in the ATM cells whose headers have a particular VPI/VCI pair is an IP packet. RxSDP 421 has been programmed to extract the ATM cells from the SONET frame and process the ATM cells.

The bytes from the SONET frame go first to Rx bit processor 1005, which sends them on to SONET framer 1007. Rx bit processor 1005 also detects the beginning of the frame and sends a signal indicating its arrival to receive SONET framer 1007 Receive SONET framer 1007 descrambles, does parity checking, and locates the payload data in the SONET frame. The payload of ATM cells goes to receive sync processor 1009, which detects the ATM cells, reads their headers, and sends the information in them to extract space 417. Next, the payload of ATM cells goes to Rx byte processor 1013, which sends the ATM cell's VPI/VCI pair to TLE 301 for translation and reads information from the headers of any packets contained in the payload of the ATM packets to extract space 417.

Figure 12:
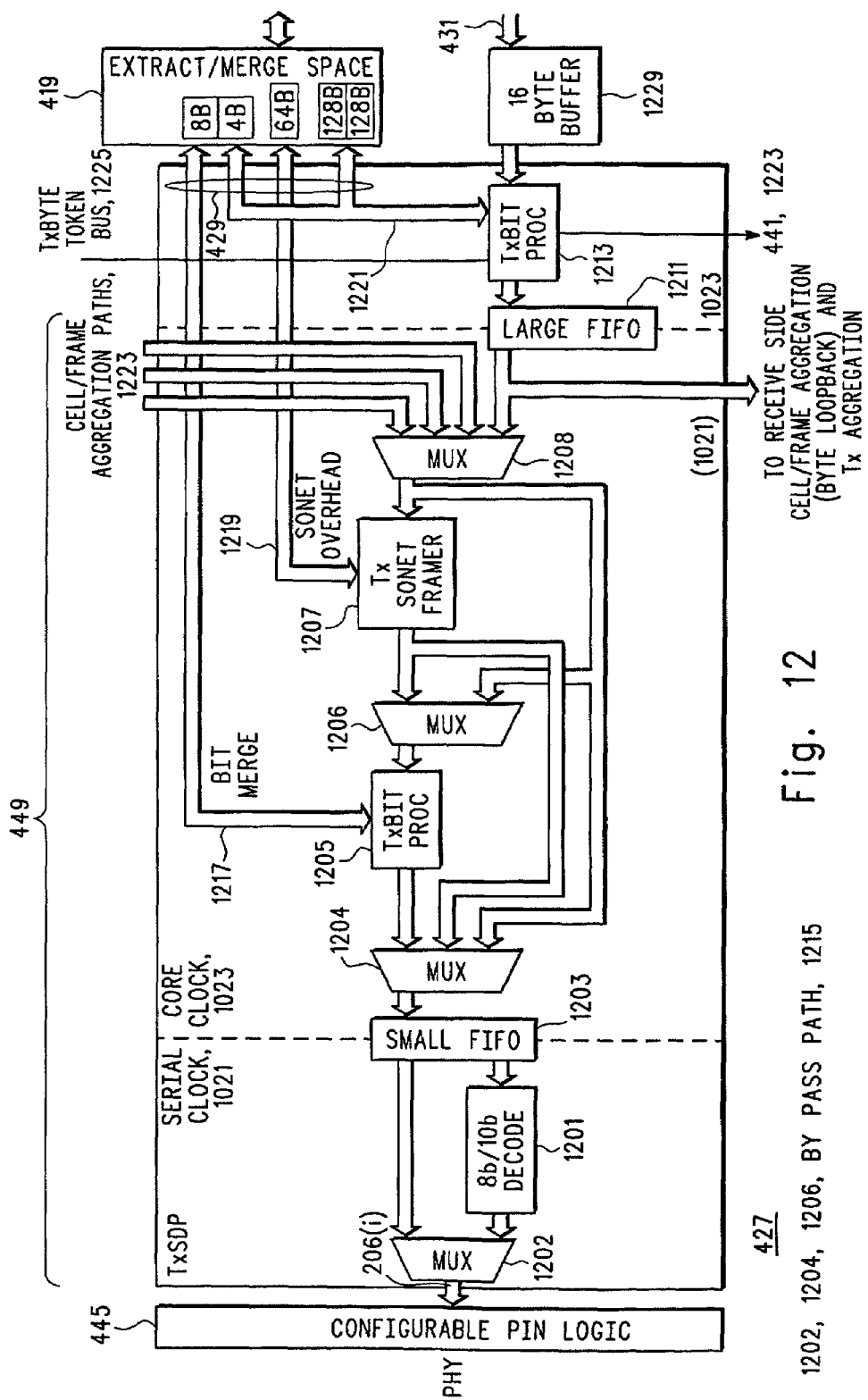
FIG. 12 is a detailed block diagram of a transmit processor 427.

Details of TxSDP 427: FIG. 12

TxSDP 427 does the reverse of RxSDP 421: namely, it receives a protocol data unit from SDRAM 229 and adds the protocol data necessary to output the protocol data unit in the form required by its destination and the physical interface to which pin interface 206(*i*) is connected. Again, operation is hierarchical, with the protocol data for the transport packets being added ahead of the protocol data for the medium packets. FIG. 12 shows the details of TxSDP 427. The protocol data unit comes via path 431 from DMEM 405 to 16 byte buffer 1229, from which it is read by TxByte processor 1213; the protocol data comes via path 429 from merge space 419 and goes to Tx SONET framer 1207 and Tx bit processor 1205 as well as to TxByte processor 1213. The recirculation path to RxSDP 421 is at 441; Muxes 1206, 1204, and 1202 implement bypass path 1215. Aggregation paths 1223 permit a given TxSDP 427 to add medium protocol data to streams of transport packets produced by other TxSDPs 427 that are aggregated with the given TxSDP 427. When a given TxSDP 427 is part of an aggregation, output of TxByte processor 1213 is controlled by the token on TxByte token bus 1225. The components of TxSDP 427 are analogous to the similarly-named components of RxSDP 427, except that their function is to add protocol data to a stream of protocol data units, rather than extracting it. One consequence of the difference in function is that there is no provision in TxSDP 427 for sending ring bus messages. TxStatus 639 and TxCB 637 have functions similar to the corresponding components of Rx data scope 643, except again for the difference in direction. Registers in TxSDP ctl 615 further permit CPRC 401 to communicate with TxSDP 427 and registers in SDP mode 627 configure the bypass path.

The components are the following, taken in the order in which output is processed:

- Tx byte processor 1213 is programmable to read a protocol data unit from DMEM 405 and implement field inserts, deletes, and replacements. Tx byte processor 1213 is also programmable to create ATM cells by prepending the ATM header to 48-byte chunks of the protocol data unit and optionally scrambling the cell content. When there are no protocol data units to transmit, Tx byte processor 1213 generates idle ATM cells.
- Large asynchronous FIFO 1211 is 64 words deep and 9 bits wide, and provides the elasticity necessary for the field inserts and deletes performed by processor 1213. FIFO 1211 is written at the core clock rate and may be read either at the core clock or the serial clock rate.
- SONET framer 1207 produces SONET frames in which the output of TxByte processor 1213 is the payload.
- Tx bit processor 1205 is an intelligent parallel-to-serial processor. Under program control, it implements field inserts, deletes, and replacements on the data it receives. The input data is 8 bits wide and the output data is 1, 2, or 4 bits at a time, depending on the physical interface. Processor 1205 contains a general purpose linear feedback shift register.
- Small FIFO 1203: data is written to this FIFO at core clock speed and read from it at serial clock speed. The FIFO is eight words deep and 9 bits wide.
- 8b/10b encoder 1201 does 8b/10b encoding of data.

Processors 1213, 1207, and 1205 are programmable and have the same general internal structure as Rx byte processor 1013, described above.

Cooperation of the components will be illustrated by an example which is the reverse of the one used for RxSDP 421: the input is a protocol data unit that is an IP packet; the output is a SONET frame which has as its payload ATM cells which in turn have as their payload the IP packet. The IP packet is stored ultimately in SRAM 229, from whence it is DMAed to DMEM 405; the protocol data needed to form the ATM cells and the SONET frame are in merge space 419. The IP packet is read from DMEM 405 in 48-byte chunks; Tx byte processor 1213 makes an ATM header for each 48-byte chunk, and the resulting ATM cells go to large FIFO 1211, from whence they are read by SONET framer 1207. SONET framer 1207 packages the ATM cells as the payload of the ATM frame and adds the necessary SONET protocol data. The SONET frame is then output to Tx bit processor 1205, which serializes it and outputs it to small FIFO 1203, from whence it goes to encode 1201 and from there to pin interface 206(*i*).

Using Channel Processors 307 with PDH Telephony

Long-distance telephone service providers have used digital trunks to carry long distance calls for many years. In these systems, the audio signals produced by the telephones that are connected by the call are digitized into 1-byte samples and digitized samples from many calls, together with the routing information for the samples, are multiplexed onto the trunk.

While the samples and their routing information may be seen as very simple packets, there is no hierarchy of packets in these systems and the relationship between receiving ports and transmission ports is fixed. Consequently, there is no need for table lookups, descriptor queues, or buffers for the packets in SDRAM 229. Instead, the receiving channel processor 307(*i*) takes advantage of the fact that it shares global address space 321 with the transmitting channel processor(j) and simply writes each sample to a queue in DMEM 405 of the transmitting channel processor 307(*j*) CPRC 401 in the transmitting channel processor 307(*j*) manages the queue.

Aggregation of Channel Processors 307: FIGS. 13, 14, 26–27

As previously mentioned, channel processors 307 are arranged in clusters 309 of four channel processors 307. The arrangement of the channel processors in clusters permits them to be aggregated so that they can receive or transmit at rates faster than would be possible for a single channel processor 307. In a preferred embodiment, aggregation is used to transmit and receive OC-12c and gigabit Ethernet protocols. With the OC-12c protocols, two of the four channel processors in the cluster may be used to receive data and the other two may be used to transmit data or two clusters may be used, one for receiving data and one for transmitting data. With the gigabit Ethernet protocols, two clusters are used, the four channel processors in one of the clusters being used to receive according to the protocol and the four channel processors in the other cluster being used to transmit according to the protocol.

Aggregating a group of channel processors to receive a protocol is termed herein receive aggregation; correspondingly, aggregating a group of channel processors to transmit a protocol is termed transmit aggregation. In receive aggregation, each of the channel processors receives all of the input from the protocol, but only processes part of it. In transmit aggregation, each of the channel processors receives part of the output for the protocol and outputs its part when required to the channel processor that actually provides the output to the transmission medium. The serial I/O pins of the channel processors in the cluster are wired in a fashion such that all of the channel processors in the cluster receive the same serial input. It is also possible to configure aggregated channel processors so that all of them are controlled by the same timer. Tokens implemented as semaphores in shared memory, finally, are used to coordinate operation of the channel processors in the cluster. Aggregation is done by setting configuration registers in the channel processors belonging to the cluster.

Figure 13:
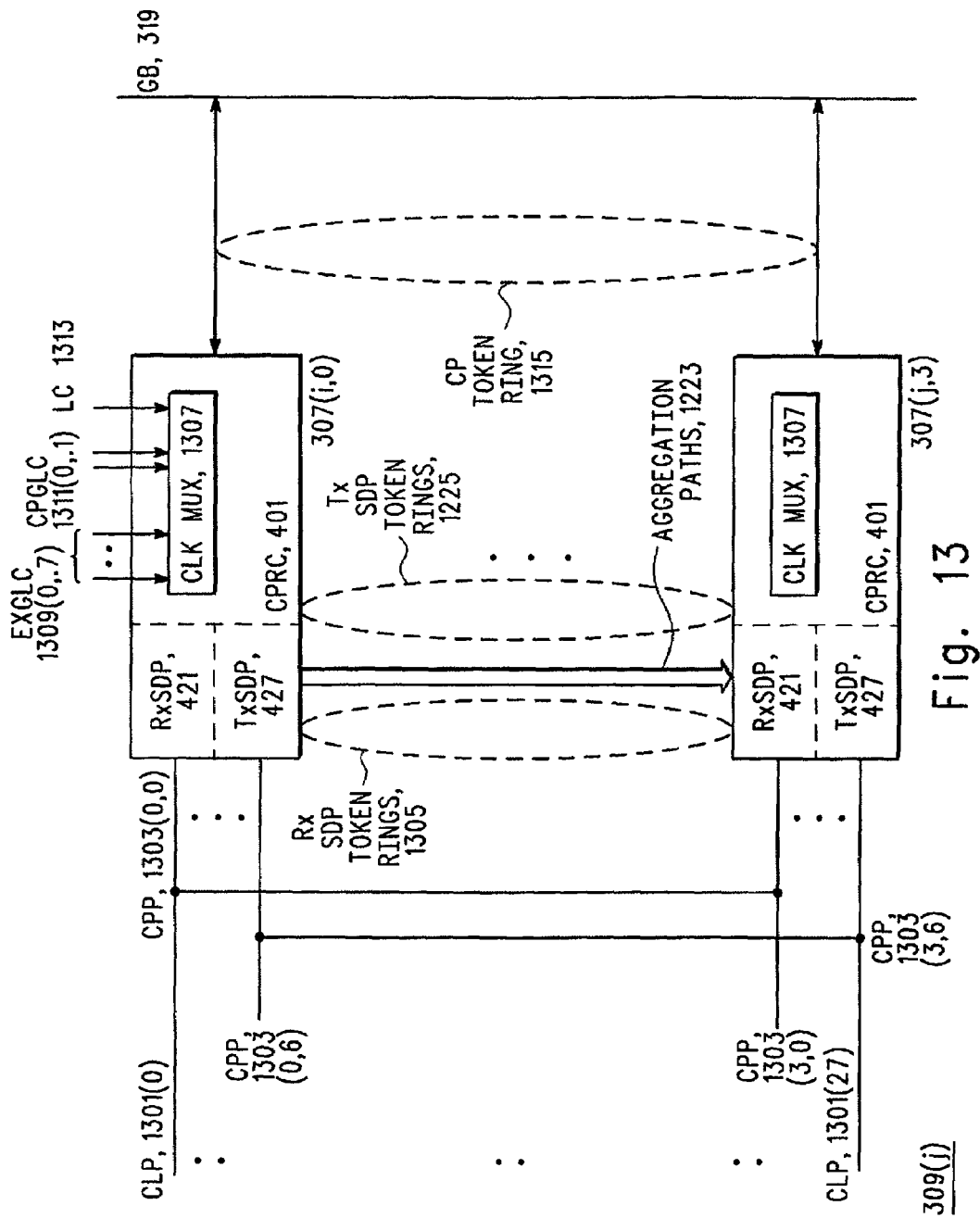
FIG. 13 is a block diagram of a cluster of channel processors.

FIG. 13 gives details of the arrangements that permit aggregation in a preferred embodiment. There is shown a cluster 309(*j*) of four channel processors 307(*j*, 0 . . . 3). Input to a cluster is aggregated as follows: each channel processor 307(*j,k*) has seven I/O pins CPP(0 . . . 6), giving 28 cluster I/O pins 1301. Cluster I/O pin 1301(0) is channel processor I/O pin 1303(0,0), CLP 1301(2) is CPP 1303(0,1), and so forth through CLP 1301(27), which is CPP 1303(3,6). The pins are interconnected such that input at any of CLP 1301(0), CLP 1301(7), CLP 1301(14), and CLP 1301(21) is received simultaneously at all of CPP 1303(0,0), 1303(1,0), 1303(2,0), and 1303(3,0). Output is aggregated by means of cell/frame aggregation paths 1223, shown in FIG. 12. As shown there, output 1441,1223 from each TxSDP 425(*j,i*) is connected to mux 1208 in each of the other TxSDPs 427 in the cluster, and a given TxSDP 425(*j,i*) can thus receive output from large FIFO 2122 in any of the cluster's other TxSDPs 427 and can process the output in the devices following large FIFO 1023. How a given RxSDP 421 or TxSDP 427 relates to its cluster is determined by setting bits in SDP mode 627.

Each channel processor 307 further has a clock mux 1307 which permits it to select one of 11 clock inputs. Eight of the clock inputs, external global clock inputs 1309(0 . . . 7), are for clocks external to digital channel processor IC 203; two of the clock inputs, CPGLC 1311, are global clock inputs which are recovered by one channel processor and provided to the other channel processors, and one of the inputs, local clock 1313, is for a clock local to digital channel processor IC 203.

Coordination of processing by a cluster of channel processors is achieved by three sets of token rings: TxSDP token ring 1225 coordinates output from TxByte processor 1213 in the TxSDPs 427 of the cluster. Only the TxSDP 427 with the token outputs to large FIFO 1211. As shown in FIG. 10, which devices in RxSDP 421 provide is determined by three token rings, ring 1027 for Rx bit processor 1005, ring 1017 for Rx sync processor 1017, and ring 1028 for Rx byte processor 1013. A device in RxSDP 421 which has a token ring and which is enabled will provide output only if it has the token. Which token rings are used depends on which of the devices in RxSDP 421 are enabled. The tokens in the rings for TxSDPs 427 and RxSDPs 421 are passed and tested by means of microcode executed by the TxSDPs and RxSDPs. Channel processor token ring 1315 controls write access to global bus 319 by channel processors in the aggregation. Only the channel processor which currently has ring 1315's token may have write access to global bus 319. Channel processor token ring 1315 is implemented by means of semaphores in the cluster memory 503 shared by the channel processors of the cluster.

Figure 14:
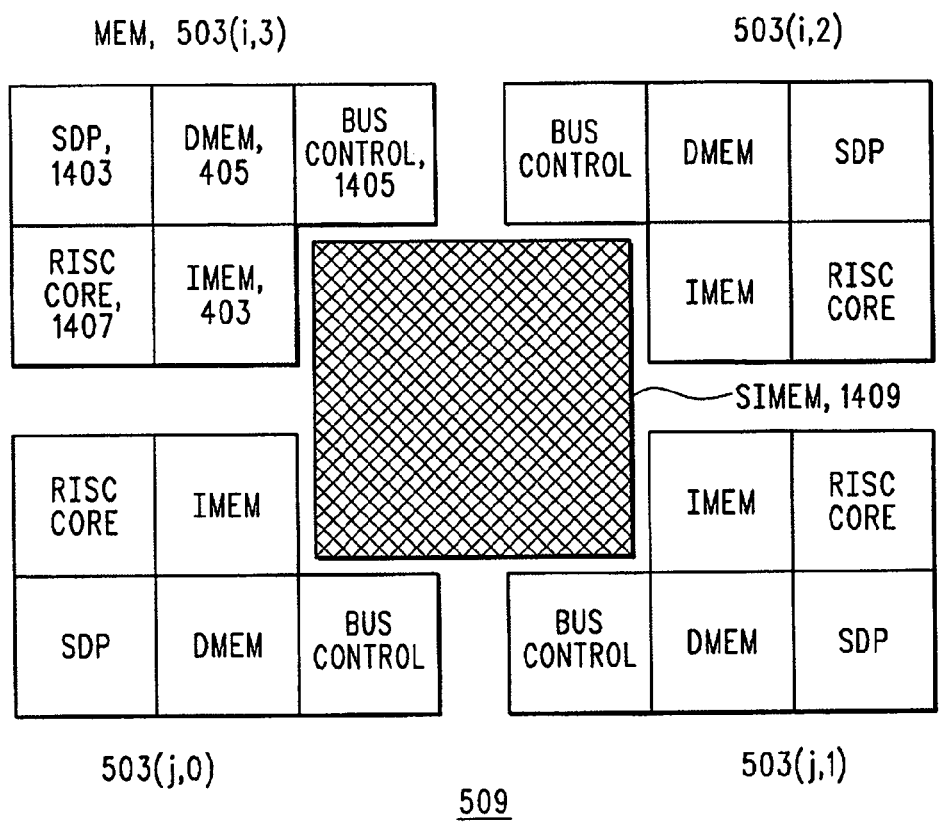
FIG. 14 is a block diagram of local and shared memory for a cluster of channel processors.

Aggregation is further supported by the arrangement of local and shared memory in a cluster shown in FIG. 14. The result of this arrangement is cluster memory 503. Cluster memory 503 includes channel processor local memory 503 for each of the channel processors (0 . . . 3) in cluster 309(*j*). Each channel processor memory 503(*j,i*) includes channel processor 307(*j,i*) memory 1403 for the serial data processors, DMEM 405, bus control memory 1405, memory 1407 for CPRC 401, and part of instruction memory 403. Each channel processor 307 in the cluster has access via cluster paths 439 to DMEM 405 in each of the other channel processors in the cluster. Access to DMEM 405 in another channel processor has a 1-cycle latency. The instruction memory may be configured when communications processor 203 is initialized so that the instruction memory is shared among all four channel processors as shared IMEM 1409, or may be divided among all four channel processors (IMEM 403). When the instruction memory is configured as shared IMEM 1409, each of the four channel processors in the cluster is given access to the shared IMEM 1409, one per cycle, in a fixed round-robin order. Shared IMEM 403 permits the programmer of a channel processor or a cluster thereof to trade off larger programs for channel processors against increased flexibility of the individual channel processors.

Figure 26:
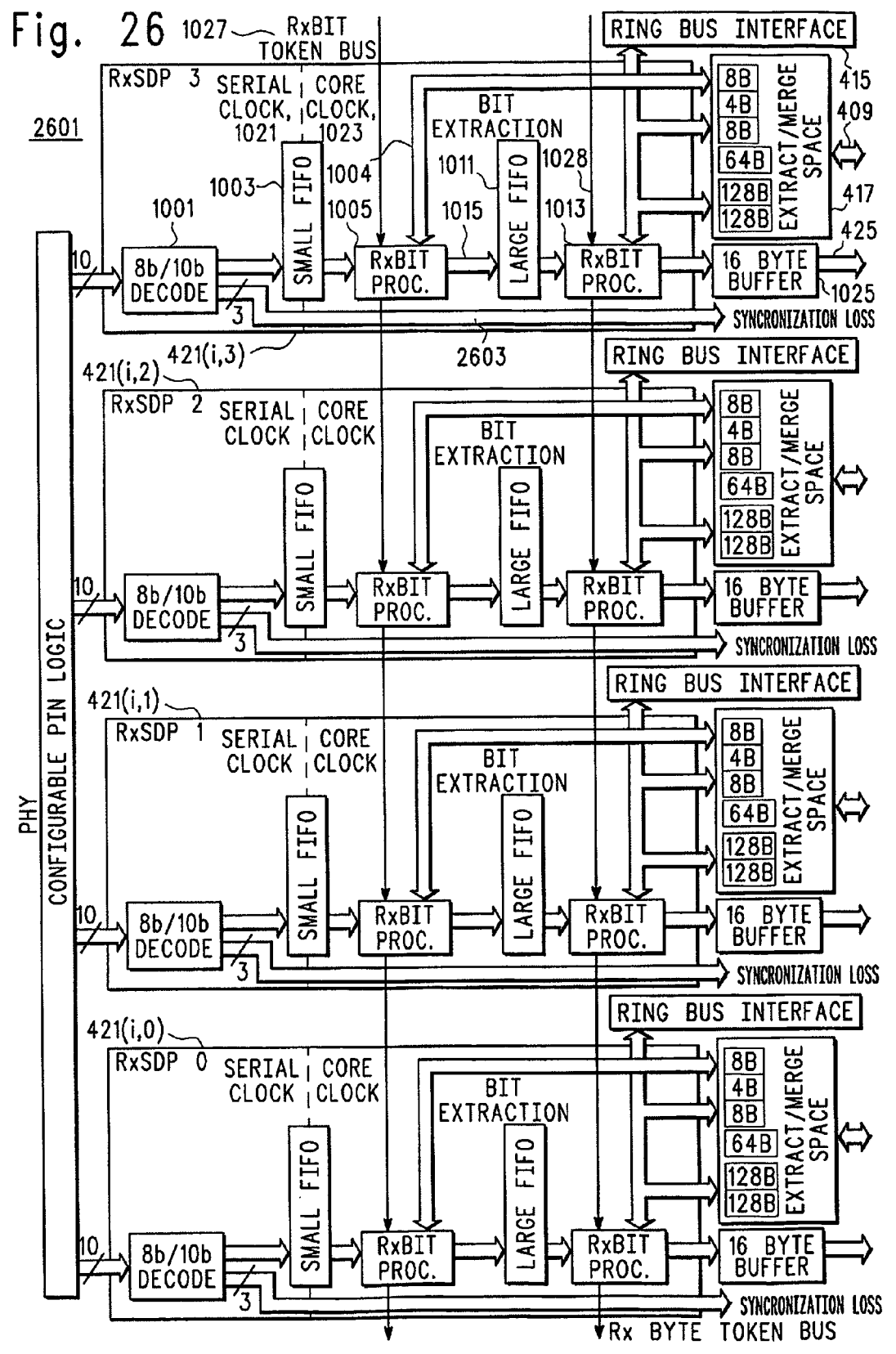
Figure 27:
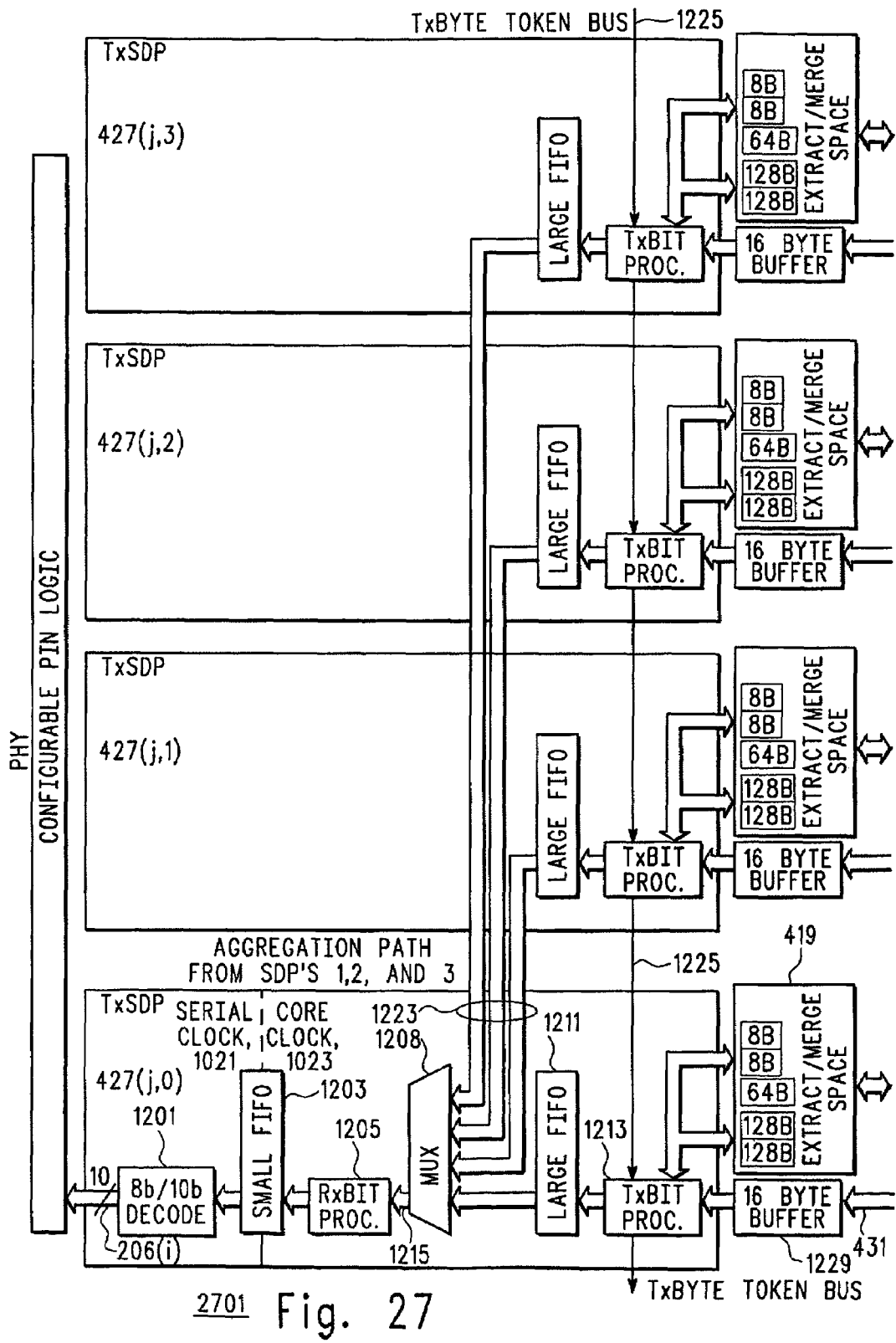
FIG. 27 is an example of aggregation of TxSDPs 427 in a cluster.

Example of Operation of Aggregated Channel Processors: FIGS. 26 and 27

When the aggregated channel processors are handling gigabit Ethernet, the receiver is a cluster 309(*i*) of four channel processors and the transmitter is another cluster 309(*j*) of four channel processors. FIG. 26 shows how the RxSDPs 421 (*i*, 0 . . . 3) are configured and FIG. 27 shows how the TxSDPs 427 (*j*, 0 . . . 3) are configured. Both clusters 309(*i*) and 309(*j*) are configured so that the receive clock of one of the channel processors in the transmitter is the master receive clock for both clusters. All of the channel processors in the transmit cluster select the signal in external global clocks 1309 for the gigabit Ethernet clock. Synchronization among the CPRCs 401 in the CPs 307 of the cluster is achieved by means of semaphores in cluster memory 503.

Aggregation of RxSDPs: FIG. 26

As shown in FIG. 26, each of the RxSDPs is configured so that processors other than decoder 1001, Rxbit processor 1005, and Rxbyte processor 1013 are bypassed. Decoder 1001 provides a 3-bit synchronization loss output 2603 to CPRC 401. Reception of input by Rxbit processor 1005 is controlled by token bus 1027, and output by Rxbyte processor 1013 is controlled by token bus and 1028. Thus, Rx bit processor outputs the results of its processing of the contents of small FIFO 1003 to large FIFO 1011 only when it has the token and similarly, Rx byte processor 1013 outputs the results of its processing of the contents of large FIFO 1011 only when it has the token.

In the preferred embodiment, each channel processor receives one frame of gigabit Ethernet data while it has the token, and when it has received the frame, it passes the token to the next channel processor in the cluster and processes the frame it has just received. As already described, one result of the processing of the data is a descriptor for the data. The channel processor writes an enqueue command via global bus 319 to its mailbox 511 in queue management engine 305, and queue management engine 305 responds to the command by enqueueing the descriptor. Tokens implemented as semaphores in shared memory, finally, are used to regulate access by the members of the receive cluster to global bus such that a given channel processor in the receive cluster may write to global bus 319 only when it has the token.

Aggregation of TxSDPs: FIG. 27

FIG. 27 shows how TxSDPs 427(*j*, 0 . . . 3) in the outputting cluster are set up. As can be seen there, the only parts of TxSDPs (j, 1 . . . 3) that are enabled are Tx byte processor 1213, large FIFO 1223, and aggregation paths 1223. The remainder of the processing of the output stream is done by TxSDP(j,0), in which Tx bit processor 1205 and encoder 1201 are enabled as well as Tx byte processor 1213. When a given TxSDP 427 (j,k) has the token on token bus 1225, its Tx byte processor 1213 outputs data via large FIFO and aggregation path 1223 to TxSDP 427(j,0), which then selects the proper input at mux 1228 and processes the input in the enabled processors following mux 1208.

In configuration 2701, each channel processor 307 in the cluster in turn outputs a frame of gigabit Ethernet data. As already described, a channel processor 307 begins a transmission by issuing a dequeue command to QME 305 to obtain a descriptor for the protocol data unit for the frame which is to be transmitted. CP token ring 1315 is used to ensure that the channel processors in the transmit cluster obtain the descriptors in the correct order. A channel processor in the transmit cluster may access global bus 319 to provide a dequeue command to queue management engine 305 only if the channel processor has the token in CP token ring 1315. Once a channel processor has the descriptor for the data to be output, it may begin processing the data in its Tx byte processor 1213. The data can be output from Tx byte processor 1213 only when tx byte processor 1213 has the token provided by token ring 1305. Output from Tx byte processor 1213 goes via aggregation path 1223 to TxSDP (j,0), where it is output. Again, the arrangement permits a given channel processor in the cluster to process the frame it is to output while the other channel processors in the transmit cluster are outputting their frames.

The cluster for OC-12c works substantially as described above, except that two channel processors in a cluster of four are configured for receiving and two are configured for transmission. The token rings are used as explained above, except that when OC-12c is being used to transmit ATM cells, token ring 11017 controls receive sync processor 1009 in the receive channel processors.

Figure 15:
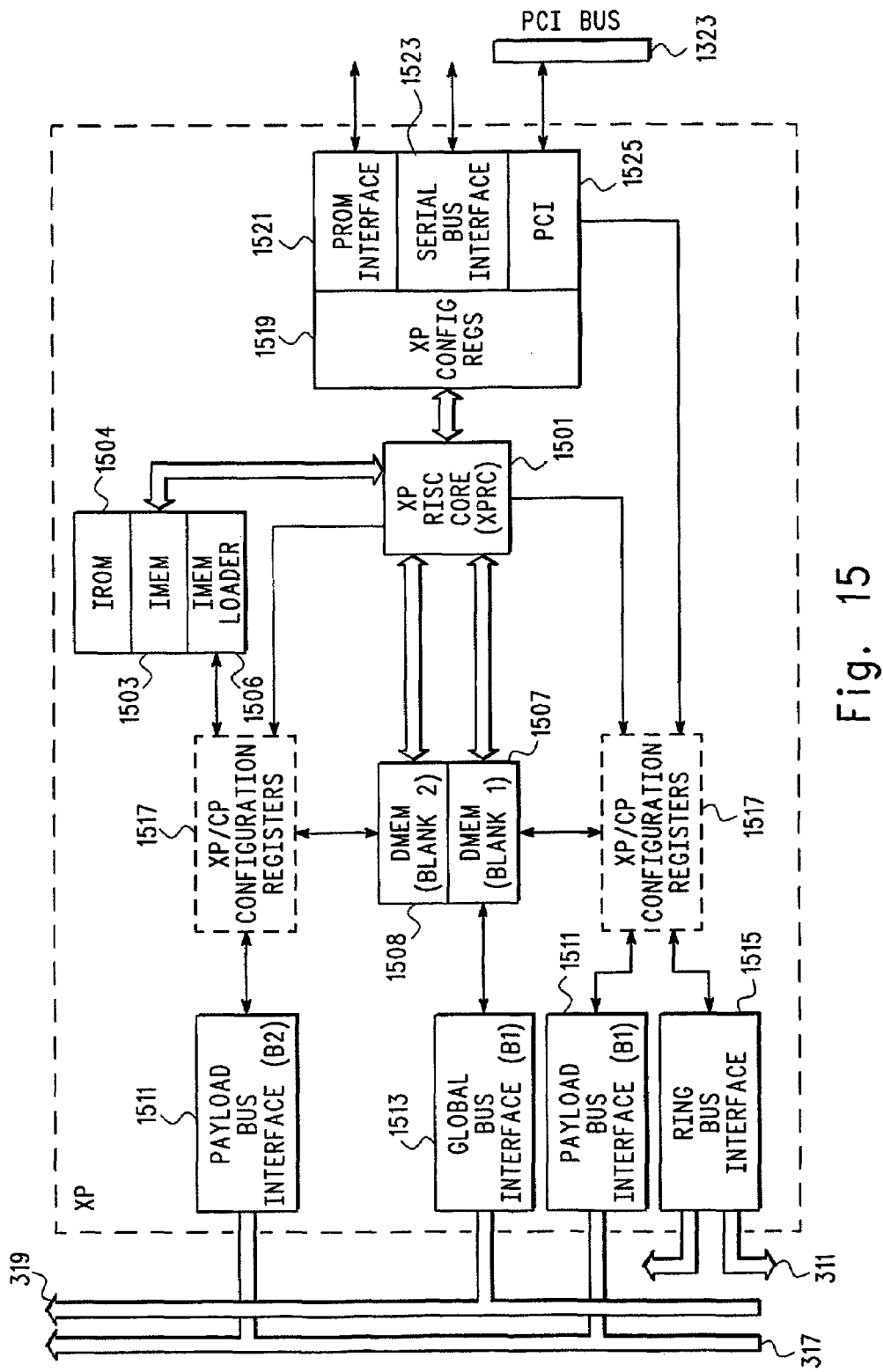
FIG. 15 is a block diagram of execute processor 313.

Details of Executive Processor (XP) 313: FIG. 15

XP 313 is a general purpose CPU that implements the MIPS IV instruction set. It performs the following functions in digital communications processor 203:

resetting and initializing DCP 203;
loading programs into channel processors 307 and fabric processor 303 and setting parameters for their operation;
setting up and maintaining translation tables 209 used by table look up engine 301 and setting registers in table look up engine 301;
processing exceptions;
running DCP 203's real-time operating system; and
interfacing with host 227 when one is present.

Interfacing with host 227 includes providing host 227 with a variable-sized window into global address space 321 and may also include processing packets that XP 313 receives from or transmits to host 227.

FIG. 15 is a block diagram of XP 313. XP 313 has many of the same components as a channel processor 307. Like the channel processors, it is coupled to ring bus 311, payload bus 313, and global bus 319. The basic processing element is XP RISC core processor 1501, which is like CPRC 401. There is an interface 1515 to ring bus 311, two banks of local data memory 1507 and 1508, an interface 1511 to payload bus 317, and an interface 1513 to global bus 319. Both DMEM 1507 and DMEM 1508 are accessible via payload bus interface 1511, and are indeed separate nodes on payload bus 315. Only DMEM 1507 is accessible via global bus interface 1513. Interfaces in XP 313 that are not present in a channel processor include general purpose I/O interface 1517, PROM interface 1525, and PCI interface 1523. Instruction memory 1503 has three components: loadable instruction memory 1503, instruction read only memory 1504, and instruction memory loader 1506, which contains the program which XPRC 1501 executes to load IMEM 1503 from DRAM 229. The code executed by XP RISC core 1501 and data used in execution of the code are stored in SDRAM 229 and are moved via DMA from SDRAM 229 to DMEM 1507, DMEM 1508, and IMEM 1503 as needed by XP RISC core 1501. Like channel processors 307, XP 313 has access to global address space 321. XP/CP configuration registers 1517 are part of global address space 321 in XP 313.

Details of the Functions Performed by Executive Processor 313

Executive processor 313 responds to a chip reset signal received in digital communications processor 203 by sending a reset signal to each channel processor 307. Thereupon, XP 313 begins executing initialization code. The initialization code may have been previously loaded via PCI interface 1523 and global bus 317 into SDRAM 229 or it may be contained in an optional external PROM that is coupled to PROM interface 1521. The initialization code loads IMEM 403 for each channel processor, as well as shared IMEM 1409 for a cluster, loads the programs executed by RxSDP 421 and TxSDP 427, and loads configuration information into registers in global address space 321.

Once digital communications processor 203 is initialized, XP 313 executes a real-time operating system for digital communications processor 203, supports network monitoring protocols, and deals with exceptions signaled by the channel processors. XP 313 further uses its access to global address space 321 to manage the channel processors, fabric processor 303, queue management engine 305, and buffer management engine 315. It uses the interface to ring bus 311 to manage table look up engine 301. One management function is inserting and deleting translation table entries 211 in translation tables 209; another is managing tables of statistics. The ability to manage translation tables 209 and buffer management engine 315 gives XP 313 the power to configure the relationship between input and output ports in DCP 203.

Where there is a host 227, XP 313 gives the host visibility into DCP 203's global address space and can read the tables managed by TLE 301 for it. XP 313 can further serve as a packet transceiver for packets received from or destined for host 226. For example, host 227 may be an Internet Protocol node, and may therefore receive or transmit internet packets. As a packet transceiver, XP 313 operates in substantially the same fashion as a channel processor, except that its I/O interface is a PCI bus.

Fabric Processor 303: FIGS. 16-20

Figure 19:
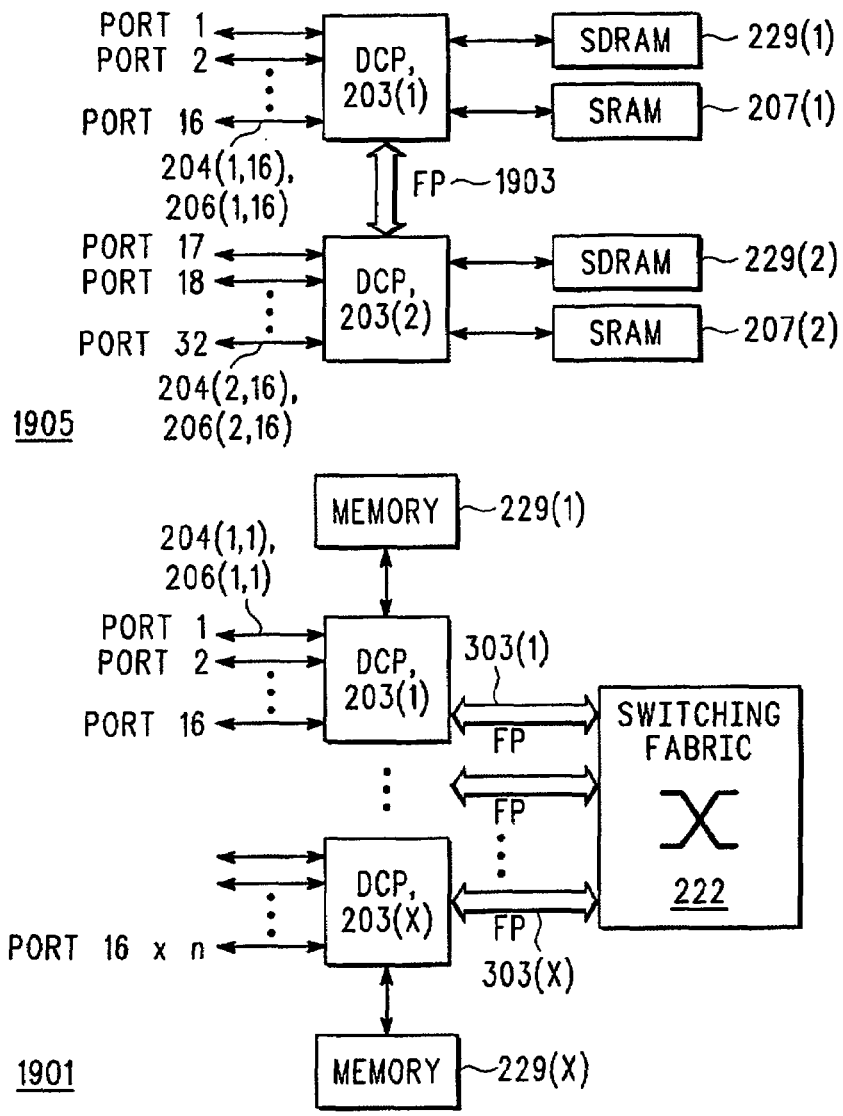
FIG. 19 shows a switch made by connecting multiple DCPs to a switching fabric.

As shown in FIG. 3, fabric processor (FP) 303 manages the interface between a digital communications processor 203 and a switching fabric 222. Switching fabric 222 is used to communicate between a number of switching devices such as communications processor 203. FIG. 19 shows at 1901 how a number of DCPs 203(1 . . . x) may be coupled, each by its FP 303(i), to switching fabric 222. Packets which are received at a serial input 204(i,j) belonging to a DCP 203(i) may be routed via FP 303(i) and switching fabric 222 to another DCP (k), where they are received in FP 303(k) and output at a serial output 206(k,l).

Data moves through fabric 222 as fabric frames. The exact form of a fabric frame will vary with the switching fabric, but fabric frames generally have the parts shown in FIG. 18:

fabric header 1803 contains information that fabric 222 uses for routing and flow control within fabric 222;

frame header 1805 contains information that the source device which inputs fabric frame 1801 into fabric 222 provides for the destination device which receives frame 1801 from fabric 222; and payload 1807 is the payload which was received in the source device from the network and is to be output by the destination device to the network.

As will be explained in more detail below, fabric processor 303 may be programmed to deal with different kinds of fabric frames. In a preferred environment, fabric processor 303 can be programmed to deal with frames that have a fixed length (FL 1809). The fixed length may range between 32 bytes and 128 bytes.

It will be apparent from the foregoing discussion that a fabric processor 303 has essentially the same functions as a channel processor 307, except that it receives inputs from and provides outputs to switching fabric 222 instead of serial ports. That difference has important consequences. First, switching fabric 222 receives parallel inputs and provides parallel outputs, instead of serial inputs and outputs. The width of the input or output depends on the switching fabric; in a preferred embodiment, fabric processor 303 may be programmed to output data in widths of 8, 16, or 32 bits per clock cycle.

Figure 16:
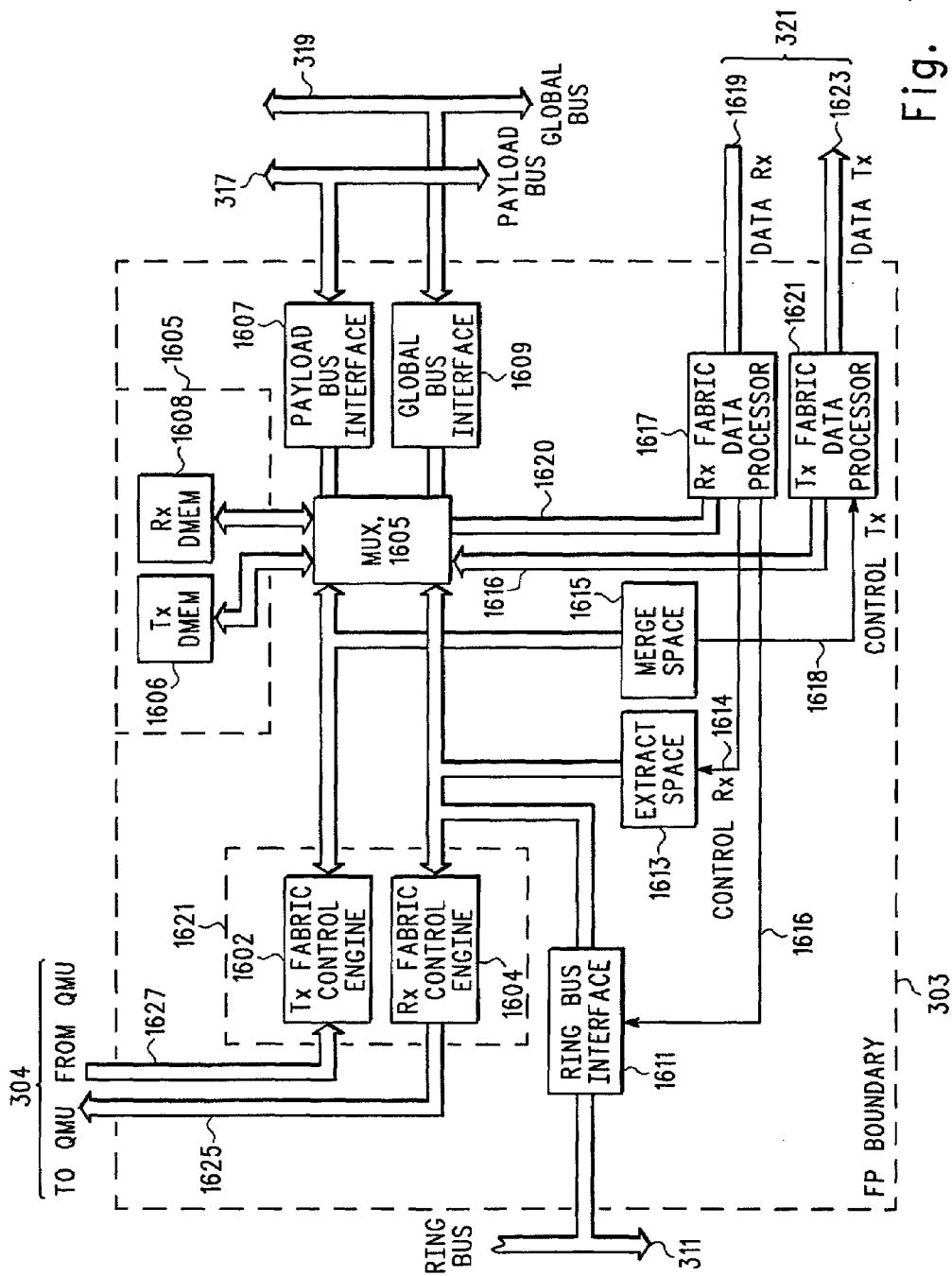
FIG. 16 is a block diagram of fabric processor 303.

Second, fabric processor 303 must handle data at a higher rate than do channel processors 307. One reason for this is that the input and output are parallel instead of serial; another is that switch fabric 222 is shared with other devices, and the speeds at which a fabric processor 303 can receive data from switch fabric 222 and provide it to switch fabric 222 affects the speed and throughput of all of those devices as well. In order to achieve the necessary speed of operation, fabric processor 303 is implemented as a pair of finite state machines. The finite state machines in a preferred embodiment work with fabric frames 1801 that have the following properties:

- the frame has a predetermined length;
- the data is preceded by a fixed-length fabric header 1803;
- the switching fabric implements multicasting (simultaneously routing a packet to more than one destination) by means of a destination bit mask in the fabric header;
- congestion information can be extracted from the fabric header by means of a simple state machine; and
- the relationship of the first fabric frame 1801 in a sequence of related fabric frames 1801 is deterministic Details of Fabric Processor 303: FIG. 16

FIG. 16 is a block diagram of fabric processor 303; its general similarity to FIG. 4, showing a channel processor, will immediately be apparent. Like a channel processor 307, fabric processor 303 is coupled to payload bus 317, global bus 319, and ring bus 311; it can thus provide protocol data units to and receive protocol data units from SDRAM 229, can access global address space 321, and can provide messages to and receive messages from table lookup engine 301. There are three main differences:

Rx fabric processor 1617 and Tx fabric processor 1621 are connected by 32-bit buses 1619 and 1623 to fabric 222;

fabric control engine 1601 is not a fully-programmable RISC processor, but is instead two parameterizable state machines: Rx fabric control engine 1604, which processes frames 1801 received in fabric processor 303 and Tx fabric control engine 1602, which process frames 1801 to be output from fabric processor 303; and; and fabric control engine 1601 has direct connections 1625 and 1627 to queue management engine 305, thereby achieving access to queue management engine 305 which has less temporal variation than the access available via global bus 319.

Operation of fabric processor 303 is in general similar to that of a channel processor 307. Depending on switching fabric 222, fabric frames 1801 are received in Rx fabric data processor 1617 in 8, 16, or 32-bit chunks. Rx fabric data processor 1617 separates headers 1803 and 1805 from payload 1807. Some of the information in the headers goes to extract space 1613, where it is available for use by Rx fabric control engine 1604; Rx fabric data processor 1617 uses other of the information to make a message for TLE 301; this is sent via ring bus interface 1611 and ring bus 311 to TLE 301. Protocol data units are DMA'ed via MUX 1605, DMEM 1603, and payload bus 317 to a buffer 231(i) in SDRAM 229. Rx fabric control engine 1604 uses buffer tag 233 for buffer 231(i), the header information in extract space 1513, and information received from TLE 301 in response to the ring bus message sent by Rx fabric data processor 1617 to make a descriptor 217 for the protocol data unit; using private connection 1625 to queue management engine 305, fabric control engine 1601 performs an enqueue operation for the descriptor.

Transmission processing is done by Tx fabric control engine 1602. Tx engine 1602 reads descriptors from the queue(s) 215 which queue management engine 305 maintains for descriptors 217 specifying destinations that are reachable by switching fabric 222. Fabric processor 303 reads descriptors from the head of the queue. For each descriptor, it uses information in the descriptor to set up merge space 1615 with the information required to make the headers 1803 and 1805 for the fabric frames 1801 for that data specified by the descriptor's buffer tag 233 and uses the descriptor's buffer tag 233 to initiate a DMA from buffer memory 229 via payload bus 317, DMEM 1603, and MUX 1605 to Tx fabric data processor 1621, which then uses the information in merge space 1615 to make headers 1803 and 1805 and the DMA'ed protocol data unit to make the payload. As Tx fabric data processor 1621 makes fabric frame 1801, it outputs it in 8, 16, or 32-bit chunks via bus 1623 to switch fabric 222.

Figure 17:
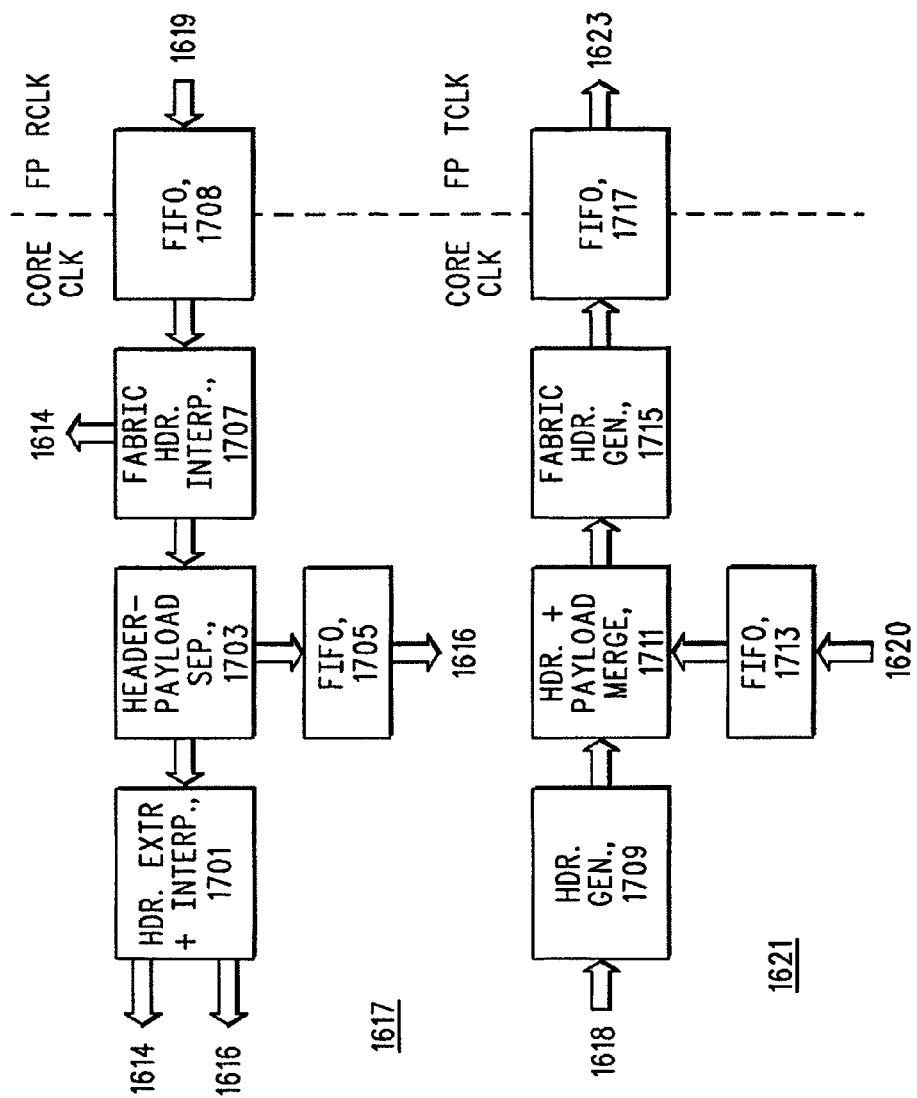
FIG. 17 is a detailed block diagram of the Rx and Tx fabric data processors.
Figure 18:
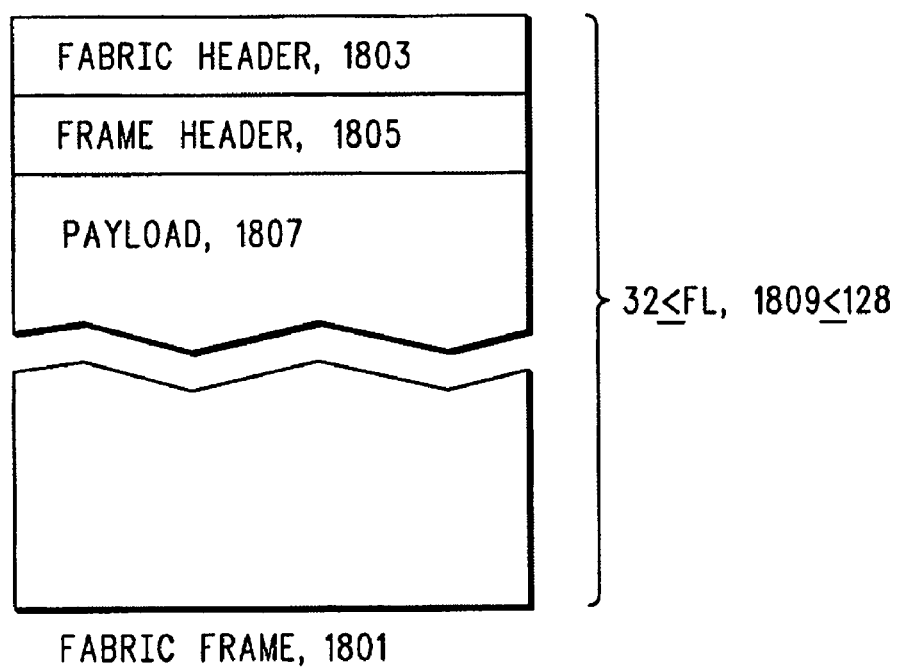
FIG. 18 shows a switch made by connecting two DCPs together.

Details of Rx Fabric Data Processor 1617 and Tx Fabric Data Processor 1621: FIG. 17

FIG. 17 is a detailed block diagram of Rx fabric data processor 1717 and Tx fabric data processor 1621. Beginning with Rx fabric data processor 1717, Rx fabric data processor 1717 includes an input FIFO 1708 which is coupled to input data bus 1619, a fabric header interpreter 1707, a header-payload separator 1703, a payload FIFO 1705, and a header extractor and interpreter 1701. Payload FIFO 1705 is coupled via bus 1616 to MUX 1605 and header extractor and interpreter 1701 is coupled by path 1614 to extract space 1613 and path 1616 to ring bus interface 1611. Components 1701, 1703, and 1707 are implemented using programmable microsequencers of the same type used in RxSDP 421 and TxSDP 427.

Operation of Rx fabric data processor 1617 is in general similar to that of RxSDP 421, except that no serial-to-parallel data conversion is done. Bytes of a fabric frame 1801 received from switch fabric 222 go first to FIFO 1708, which permits fabric processor 303 and fabric 222 to run at different clock rates. Switch fabric 222 writes to the tail of FIFO 1708, while fabric header interpreter 1707 reads from the head of FIFO 1708. Fabric header interpreter 1707 reads fabric header 1803 and outputs selected portions of fabric header 1803 to extract space 1613. The next stage of processing is header-payload separator 1703, which separates frame header 1808 from payload 1807 and sends the payload to FIFO 1705, from whence it is DMA'ed to buffer memory 229. FIFO 1705 is large enough to hold the payload until DMA access to DMEM 1603 is possible. Frame header 1808 then goes to header extractor and interpreter 1701, which interprets the header and outputs information from the header to extract space 1613 and/or ring bus interface 1611.

Tx fabric data processor 1621 has three programmable components and two FIFOs. As with the Rx fabric data processor, the programmable components are implemented using microsequencers. The programmable components include header generator 1709, which generates frame header 1805 using information that fabric control engine 1601 has placed in merge space 1615, header and payload merge 1711, which merges header 1805 with payload 1807 DMA'ed via path 1620 from buffer memory 229, and fabric header generator 1715, which generates fabric header 1803 and adds it to frame 1801 before frame 1801 is output to switch fabric 222. FIFO 1717 permits fabric processor 303 and switch fabric 222 to run at different speeds, and FIFO 1713 provides the flexibility needed to deal with delays in access to DMEM 1603.

Figure 20:
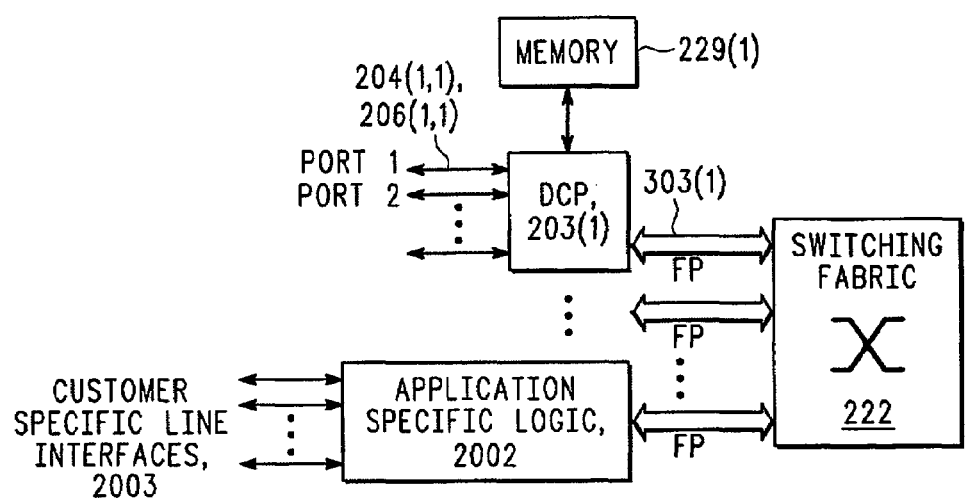
FIG. 20 shows how a switch may be made by connecting a DCP and another type of digital switching logic to a switching fabric.

Configurations of Switching Systems Using DCP 203: FIGS. 19 and 20

Fabric processor 303 permits a DCP 203 to easily interact with any switching component that is capable of sending and receiving frames 1801 which conform to the restrictions set out above. FIGS. 19 and 20 show three of the many possible configurations. Configuration 1901, in which a number of DCPs share a switching fabric 222 has already been discussed in detail; in configuration 1905, there is no separate switching fabric; instead, a switch is made by connecting two DCPs 203 to each other via their fabric processors 303. Such a system could be expanded by connecting the fabric processors of several DCPs 203 to a bus and providing a token ring or some other mechanism for regulating access by transmitting DCPs 203 to the bus.

In configuration 2001, there are connected to switching fabric 222 not only a number of DCPs 203, but also non-DCP logic 2002 for line interfaces 2003 that are not handled by DCPs 203. Such a configuration 2001 might be used to integrate pre-existing devices into a switching system employing DCPs 203.

Details of Table Look Up Engine 301 and Translation Table Memory 207: FIGS. 21–24

As has been previously pointed out, table look up engine 301 performs table look up operations on the translation tables 209 in translation table memory 207 in response to messages received on ring bus 311 from channel processors 307, fabric processor 303, and executive processor 313 and returns ring bus messages with the results of the operations to the devices from which it received the messages.

Figure 21:
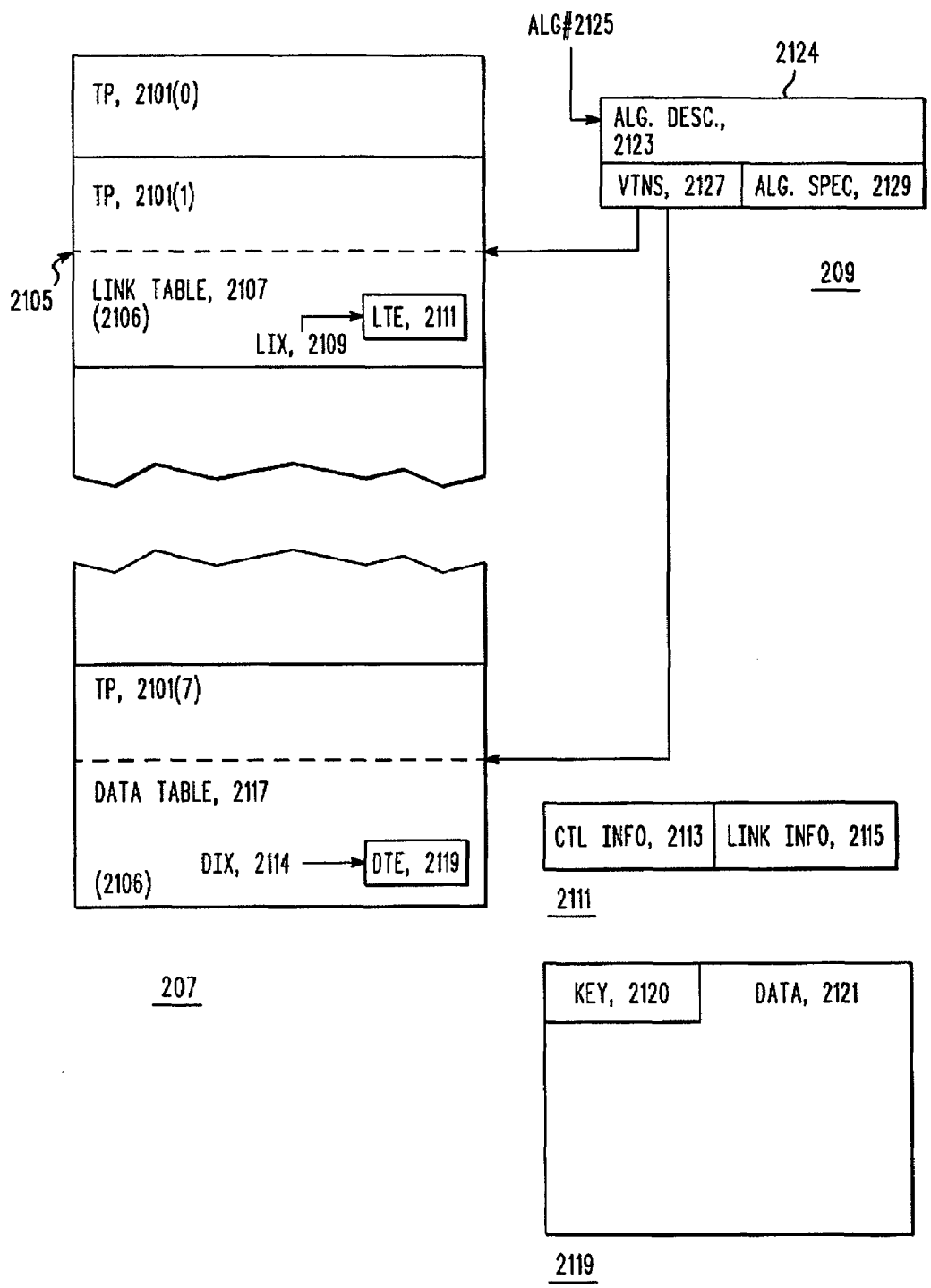
FIG. 21 shows details of table memory 207 in a preferred embodiment.

FIG. 21 is a detail of a presently-preferred embodiment of translation table memory 207. Translation table memory 207 is implemented using 64-bit wide pipelined bursting static RAM modules. Memory 207 is subdivided into eight table pools 2101(0 . . . 7). The table pools may be of different sizes and may be subdivided into table entries of different sizes, though all of the table entries in a given table pool must be the same size. Two such table entries are shown in FIG. 21: link table entry 2111 and data table entry 2119. A table pool 2101 is further subdivided into component tables 2106 made up of contiguous table entries. Two of these are shown in FIG. 21: link table 2107 in table pool 2101(1) and data table 2117 in table pool 2101(7). Each table entry has an index in the component table 2106 to which it belongs; thus, LTE 2111 has a link index 2109 and DTE 2119 has a data index 2114. An entry in a component table 2106 is located by multiplying its index by the size of the entries in the table pool and adding the result to the location of the beginning of its component table 2106.

There are two general types of component tables 2106: link tables and data tables. Both kinds of component tables 2106 are used with keys that are associated with the data in the data tables. For example, a translation table 209 may translate the VPI/VCI pair in an ATM packet's header into the number of the queue 215 in queue memory 213 which is to receive the descriptor for the ATM packet. The VPI/VCI pair is the key, and the data table entry 2119 located by the key contains the number of the queue. A search algorithm determines how the key is used in the translation table. A link table contains indexes of other index table entries or data table entries; it is used with the key that is being translated to locate data table entry 2119.

As would be expected from the fact that a link table entry is used to locate other entries, link table entry 2111 contains control information 2113 and link information 2115. Control information 2113 is used with the key being translated to determine which of the indices in link information 2115 are to be followed. The precise nature of the control information 2113 and link information 2115 is determined by the search algorithm for the translation table 2109 to which link table 2107 belongs. Data table entry 2119 contains key 2120 and data 2121. When the key being translated matches key 2120, then data 2121 in entry 2119 contains the translation of the key, for example, the queue number for the VPI/VCI pair.

A translation table 209 is specified in a preferred embodiment by a search algorithm number 2125. The search algorithm number identifies a data structure 2124 which contains virtual table numbers 2127 specifying the translation table's component tables 2106 and an algorithm specifier 2129 specifying the kind of search algorithm to be used with translation table 209. The virtual table number identifies a component table 2106 by means of a number which TLE 301 resolves into a table pointer 2105 for the component table. The use of virtual table numbers makes it possible to keep more component tables 2106 in table memory 207 than are currently being used by the channel processors and the fabric processor and to swap one component table 2106 for another simply by changing the table pointer 2105 that is represented by the virtual table number. For example, executive processor 313 can build a new component table while the channel processors and the fabric processor are using a given component table and can then replace the given table with the new table simply by sending a ring bus message with a writereg command 2415 that changes table pointer 2105 in the register in TLE 301 that relates the virtual table number to table pointer 2105.

A given translation table 209 may be made up of up to four component tables 2106. One of the component tables must be a data table 2117; the others are link tables 2107. Translation table 209 shown in FIG. 21 has two component tables: link table 2107 and data table 2117. The component tables are identified by their virtual table numbers in translation table descriptor 2124.

A translation done by means of a hashing algorithm can serve as an example of how a translation table 209 may be used to translate a key into data. Hashing algorithms are well known. What they do is map a long string of bits onto a shorter string of bits. In this case, the long string of bits is a key and the shorter string of bits is an index for a table entry. Hashing algorithms may be used with translation tables 209 that contain only data table components 2117. When the data table 2117 is set up, the key that data table entry 2119 contains data for is hashed and the data table entry for the key is created at the index (i) produced by the hash algorithm if that is possible, and otherwise at the first available index following the index i. A key that hashes to index i will be termed in the following key(i). When key(i) is provided to the hashing algorithm, the hashing algorithm returns data index 2114(*i*). DTE 2119 corresponding to key is either at index 2114(*i*), in which case, the search is over, or there has been a hash collision, that is, more than one key hashes to the same index (i). In such a case, data table 2117 may be set up so that DTES whose keys hash to the same index (i) have indexes following 2114(*i*), so the search algorithm begins at index 2114(*i*) and compares key with key 2120 in the following data table entries 2119 until it finds one in which key 2120 matches key or until it reaches the end of data table 2117 without finding a match, in which case it reports the lack of a match. If more speed is desired, a link table may be set up with LTEs for indexes 2114 for which collisions occur and the index may be applied to the link table after the collision has occurred. The link table would then give the index of the entry corresponding to the index in the DTE.

Table look up engine 301 performs search and maintenance operations on search tables 209 in response to ring bus messages. Table look up engine 301 does the searching using various search algorithms, including hashing algorithms, binary trie algorithms, and Patricia trie algorithms. Table maintenance is done using searching and the indexes of table entries. In general, messages specifying table maintenance operations come from executive processor 313.

Figure 28:
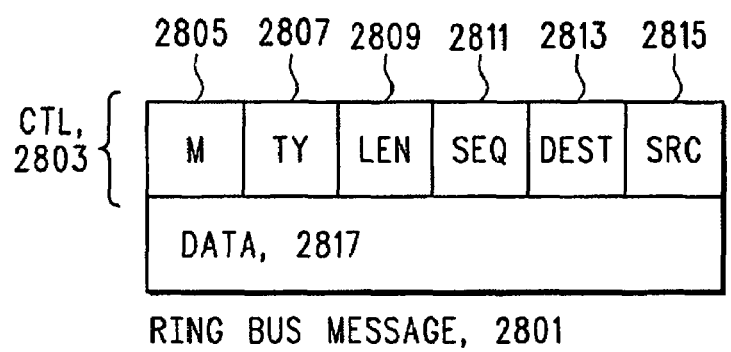
FIG. 28 shows a ring bus message.

Ring Bus Messages: FIG. 28

All interaction between TLE 301 and the other components of DCP 203 is by means of messages on ring bus 311; XP 313 uses ring bus messages to set up and maintain translation tables 209, the packet processors use ring bus messages to send items to be translated to TLE 301, and TLE 301 uses ring bus messages to return the results of the translations. FIG. 28 shows a ring bus message in a preferred embodiment. Message 2801 has two main components, data 2817 and control 2803. Data can be 64 bits of any kind of data. When a ring bus message is directed to TLE 301, data 2817 contains a TLE command TLE 301 executes the command and returns the results in data 2817 of a ring bus message delivered to the source of the TLE command. Control 2803 has the following fields:

M field 2805 is set by hardware and indicates that the message is longer than 64 bits and is therefore contained in a sequence of messages in contiguous slots;

TY field 2807 indicates the type of the message; there are four types:

unoccupied: the ring bus slot contains no message;

the message is an indication;

the message is a confirmation;

the message is a request;

the message is a response.

LEN field 2809 indicates the length of the message in data 2817;

SEQ field 2811 is a sequence number that can be set by the sender so that the order of response messages can be determined;

DEST field 2813 indicates the device on ring bus 311 which is the destination of the message; and SRC field 2815 indicates the device that is the source.

The indication and confirmation message types are simply used to determine whether the ring bus interfaces of the devices connected to the ring bus are working; if a device receives an indication message from another device, it returns a confirmation message to that device. A device on the ring bus sends a request message to another device when it wants the other device to perform an operation for the sending device; when the other device has performed the operation, it uses a result message to send the result back to the sending device.

Thus, with a table look up, the channel processor wishing to perform the table look up sends a request message of the request type in which the channel processor specifies itself as the source and TLE 301 as the destination. Data 2817 contains the TLE command for the operation and SEQ 2811 may be set to a value which will permit the channel processor to identify the response message. TLE 301 responds to the request message by executing the message's TLE command and sending the results of the execution to the channel processor in a response message. The results are in data 2817, the TLE specifies itself as the source and the channel processor as the destination, and SEQ 2811 has the value it had in the request message.

FIG. 24 is a list of the commands for table look up operations to which table look up engine 301 responds when it receives the commands via ring bus 311. Each command has a row in the table; the first column specifies the command's contents, the second its ID number, the third the data it returns, and the fourth the effect of the command. Table look ups are done using FindR command 2409; the remainder of the commands are used to set up and maintain translation tables 209, initialize table look up engine 301, and test whether the TLE is functioning.

The commands can be further subdivided by how they locate entries in tables and the operations they perform on the located entries. Key commands 2423 use keys to locate entries:

Find command 2405 takes a key and an algorithm number as arguments, uses the translation table 209 and search algorithm specified by the algorithm number to search for data table entry 2119 for the key and returns data entry 2119's contents or an error if no entry for the key is found;

FindW command 2407 takes the key, the algorithm number, data to be written, and offset and length specifiers as arguments; it uses the key and algorithm to find data entry 2119 for the key and writes the length of the data specified by the length to the entry beginning at the location in the entry specified by the offset;

FindR command 2409 takes the same arguments as FindW, but reads the length of data beginning at the offset from the entry 2119 for the key and returns it.

Index commands 2421 and 2425 use virtual table numbers and indexes to locate entries in component tables 2106. The commands belonging to group 2421 read data from and write data to the entry specified in the command; the commands belonging to group 2425 modify the data in the entry specified in the command:

Write command 2401 has as arguments a virtual table number specifying a component table 2106, an index specifying an entry in the component table, the data to be written, a mask specifying the part of the data to be written, the offset at which the write is to begin, and the length of the data to be written; it writes the data as specified in the command Read command 2403 has the same arguments except for the mask; it reads the data at the specified location in the specified entry of the specified table and returns the data;

XOR command 2411 does an XOR operation or a CRC calculation using the data in the command on the data at the specified location in the specified entry of the specified table; in the case of the CRC calculation, it returns the CRC.

Add command 2423 adds the data in the command to the data at the specified location in the specified entry of the specified table.

The register commands 2427 read (2417) and write (2415) registers in TLE 301; the registers are specified by register addresses. These commands are used to initialize TLE 301 with the information needed to locate translation tables, component tables 2106, and the code for the search algorithms and to simply write context information to and read it from TLE 301.

Echo command 2419 simply returns the data in the command to the sender; it is used to check whether ring bus 311 and the ring bus interfaces of the attached devices are working properly. Nop command 2420 is a command that does nothing when executed.

TLE 301 executes the following basic loop:

1. Read a command from the ring bus;

2. Execute the command; and

3. Return the result via the ring bus.

Where the command is an operation on a table, the step of executing the command includes the steps of:

a) Determining the index of the table entry; and b) performing the indicated operation on the data at the specified location in the table entry.

With the commands that involve keys, the step of determining the index of the table entry includes the steps of:

i. translating the key into a first index value;

ii. fetching the key stored at the translation table entry specified by the index value;

iii. if the key and the fetched key match, go to step v;

iv. if they don't, compute a new index according to the search algorithm; go to step ii; and v. perform the operation on the data stored at the table entry specified by the index value.

Figure 22:
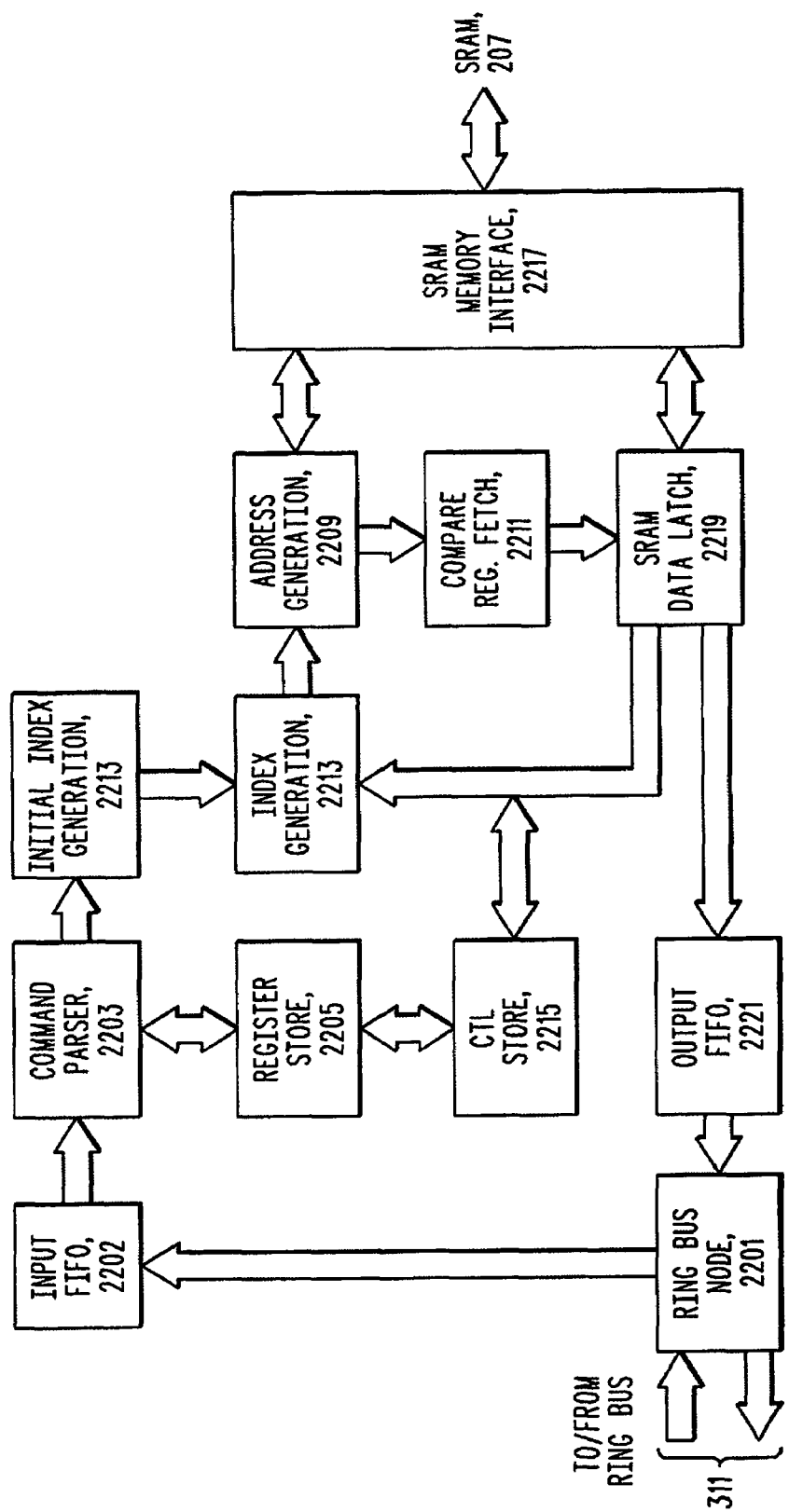
FIG. 22 shows the internal architecture of TLE 301.

FIG. 22 shows the internal architecture of table lookup engine 301. A ring bus message that is addressed to table look up engine 301 is received in ring bus node 2201; the command in the message is processed by command processor 2203 and the other components of table look up engine 301. The information needed to do the processing is stored in register store 2205 and programs for the algorithms are stored in control store 2215.

Figure 23:
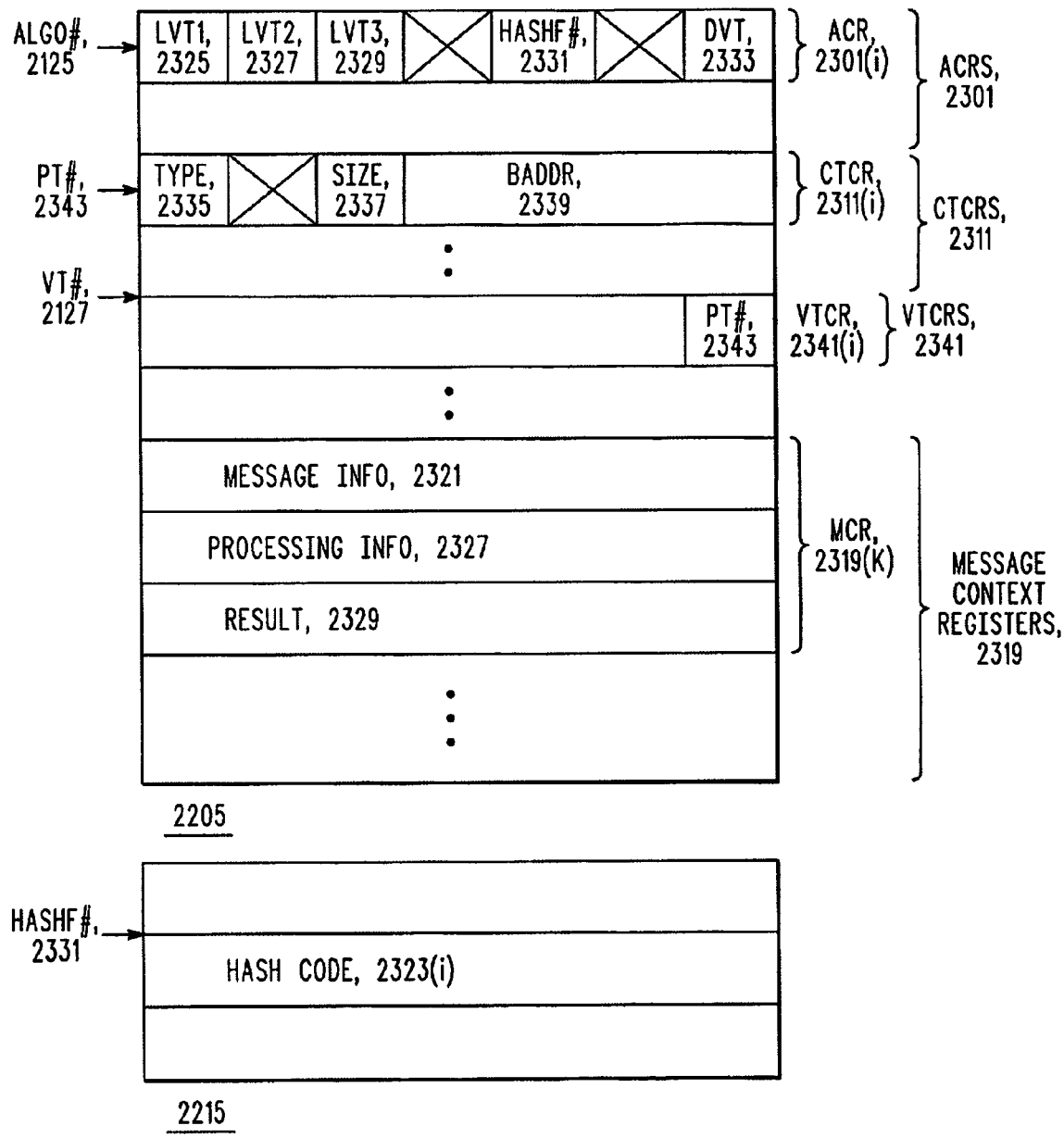
FIG. 23 shows details of register store 2205 and control store 2215.

FIG. 23 shows details of register store 2205 and control store 2215. For purposes of the present discussion, four classes of registers in register store 2205 are of interest: algorithm configuration registers 2301, table configuration registers 2311, virtual table configuration registers 2341, and message context registers 2319. Algorithm configuration registers 2301 relate the algorithm numbers used in the commands to the tables 209 and hash code 2323 in control store 2215. There is an algorithm configuration register (ACR) 2301 for each table 207 currently being used by TLE 301 and the index of the ACR 2301($i$) is its algorithm number 3125. A single ACR 2301($i$) is shown in FIG. 23. A given ACR 2301 contains virtual table numbers for the component tables making up table 207. LVT1 2325 is the virtual table number for the first index table; LVT2 2327 is the virtual table number for the second index table; LVT3 2329 is the virtual table number for the third index table; DVT 2333, finally, is the virtual table number for the data table. HASHF# 2331 is the number of the hash function used in searching the virtual table.

Component table configuration registers 2311 describe the component tables 2106 in SRAM 207. There is a CTCR 2311($i$) for each component table 2106, and the index of the table's CTCR 2311 is the table's physical table number 2343. Each CTCR 2335 indicates the type 2335 of its table, the size 2337 of the table's entries, and the offset 2339 of the beginning of the table in SRAM 207. VTCRs 2341, finally, describe the virtual tables that are currently in use. There is a VTCR 2341 for each virtual table number 2127, and the VTCR 2341($i$) for a given virtual table number contains physical table number 2323 for the component table which is currently specified by VTCR 2341($i$)'s VT# 2127. To switch the component table represented by a given VT# 2127, all that need be done is change PT# 2323 in the VTCR 2341 corresponding to VT# 2127.

Message context registers 2319 contain data that is relevant to a ring bus message currently being processed by table look up engine 301. There are four such message context registers; thus, TLE 301 can process four ring bus messages simultaneously; waiting messages may be stored in input FIFO 2202 or on ring bus 311 itself. Only one message context register, message context register 2319($k$), is shown in FIG. 23. Each message context register 2319 has three kinds of data in it: message information 2321, from the ring bus message, processing information 2327, which is produced and used during processing of the ring bus message in table look up engine 301, and result 2329, which contains the current result of the processing. When processing is finished, the result will be returned in a ring bus message to the source of the message being processed. Message information 2321 includes the kind of command, the information sent with the command, the processor that is the source of the ring bus message, and a sequence number for the message. Processing information 2327 includes a program counter in algorithm code 2323, the contents of the last link table entry 2111 to be retrieved by the search, and the address in SRAM 207 of the next link table entry 2111 to be fetched. Result 2329 contains the information which results from the execution of the command. In the case of a FindR command, the result will contain the data that the command specifies be read from data table entry 2119 associated with the key or a null value if no data table entry 2119 was found for the key.

Returning to FIG. 22, components 2203, 2207, 2213, 2209, 2211, and 2219 are implemented by means of processing elements that have access to control store 2215 and register store 2205. Component 2209 is able to perform read operations via SRAM memory controller 2217 on table memory 207 and component 2219 is able to perform read and write operations via SRAM memory controller 2217 on table memory 207. When a message intended for TLE 301 appears on ring bus 311, ring bus node 2201 places the message at the tail of input FIFO 2202; command processor 2203 reads the head of FIFO 2202. Command processor 2203 stores information from the message in a set of message context registers 2319(*i*). The set of message context registers 2319(*i*) is then used by the other components as they execute the message's command.

The functions of the components are the following:

initial index generator 2207 generates an initial index for a component table entry from a key in a set of context registers 2319(*k*);

address generation component 2209 generates the address of the component table entry from the index and fetches a key from the component table entry;

compare and register fetch component 2211 fetches the key stored in set of context registers 2319(*k*);

SRAM data latch 2219 compares the fetched key and stored key and decides on the basis of the comparison whether the data table entry 2119 for the stored key has been found. If it has been, it fetches the data table entry and sends a ring bus message with the contents of the data table entry to output FIFO 2221; otherwise, it fetches the link table entry and places it in context registers 22319(*k*) and processing continues at index generation 2213;

index generation component 2213 uses the stored key and the fetched link table entry to generate the index of the next table entry 2111(1), and places the index in context registers 2319(*k*); address generation component 2219 then uses it to generate the address of the next table entry.

Taking a ring bus message containing a findR command 2409 as an example and assuming that alg# in the command specifies a hashing algorithm, once command processor 2203 has set up message info 2321 in context registers 2319(*k*) for the message, initial index generation 2207 executes the hashing algorithm with key from the command to obtain the value 1. Address generation 2209 uses 1 to compute the address of data table entry 2119(1) and SRAM data latch 2219 fetches entry 2119(1). If its key field 2120 contains key, the search is done and SRAM data latch 2219 makes a ring bus response message containing the data in data field 2121. Otherwise, index generation 2213 increments DIX 2114, address generation 2209 generates the address of the next DTE 2119, it is fetched, and the test made as above. Execution continues in this fashion until a DTE 2119 is found whose key field 2120 matches key or the end of the data table is reached.

Other Uses of Table Look Up Engine 301

As is apparent from the presence of the XOR 2411 and add 2413 commands, TLE 301 can do more than maintain tables and look up information in them. Because each of the packet processors has rapid access with a fixed maximum latency to TLE 301, TLE 301 and translation table memory 207 can be used generally to store and process context information related to the stream of incoming packets being processed by a packet processor, and thus to overcome the limitations imposed by the relatively small amount of DMEM 405 available to a packet processor. The information needed to do address translation is one example of such context information. Another is the information needed to check the correctness of a packet that is being carried as another packet's payload.

Correctness checking in packets is done by means of a cyclic redundancy code (CRC) at the end of the packet. The CRC is computed from the packet's contents when the packet is created, and when the packet arrives at its destination, the CRC is recomputed and compared with the CRC that is included in the packet. If they are the same, the probability is very high that the packet has arrived uncorrupted; if they are different, the probability is equally high that the packet has been corrupted. In the latter case, the packet is discarded and a message sent to the sender requesting that the packet be resent. An SDP 420 must be able to compute the CRC for a packet, both to check the CRC in an incoming packet and to provide the CRC for an outgoing packet. Many algorithms are known for computing CRCs on the fly, as a packet is received or output.

As is apparent from the foregoing, computing the CRC in SDP 420 requires that CRC information concerning a packet be maintained for the entire time that the packet is passing through SDP 420. The matter is made even more complex in situations where the packets whose CRCs are being computed are higher-level packets that are payload in transport packets and transport packets carrying payload belonging to different higher-level packets are interleaved in the packet streams being received in and/or transmitted from SDP 420. In such a situation a separate CRC computation must be made for each of the higher-level packets.

In DCP IC 203, the problem of computing the CRCs is solved by using the TLE to process and store intermediate results. As each portion of a higher-level packet whose CRC is being computed passes through the SDP, CPRC 401 gathers the information needed to compute the intermediate CRC for that portion of the higher level packet and sends a ring bus message to TLE 301 with the information and a command that specifies how the information is to be applied to the prior intermediate CRC for the higher-level packet. When the last portion of the higher-level portion passes through, the last ring bus message with the information is sent and TLE 301 executes the command to complete the CRC computation. CPRC 401 then sends a read command 2403 which reads the result, and compares the result returned in the ring bus message which TLE 301 sends with the result at the end of the packet to determine whether the packet has been corrupted.

Another area where TLE 301 can be used to store packet stream context is traffic statistics. These statistics can be accumulated in TLE 301 in response to ring bus messages from the packet processors and can then be read by executive processor 313 and either used by executive processor 313 or a host processor 227 to configure DCP 203 as required for the current state of traffic over the network to which DCP 203 belongs.

Details of Queue Management Engine 305

Queue management engine 305 enqueues descriptors 217 in queues 215 as specified by the packet processors and dequeues descriptors from queues, again as specified by the packet processors. When a packet processor is operating singly, it typically enqueues descriptors in more than one queue but dequeues them from only a single queue. When packet processors are aggregated, all of the aggregated packet processors generally read from a single queue. QME 305 further provides status information concerning individual enqueue and dequeue operations and concerning the queues themselves to the packet processors. QME 305 neither reads the descriptors that it enqueues nor determines which queue a given packet processor will dequeue from next. The queues may be stored completely within DCP 203, may be stored there and/or within an external queue memory 213, or may be stored in and managed by an external queueing and scheduling unit. In the latter case, QME 305 employs a command interface to pass enqueue and dequeue commands from the packet processors on to the external queueing and scheduling unit and pass the results of the commands and status information back to the packet processors. The manner in which the queues are arranged in this case is of course completely up to the external queueing and scheduling unit.

It should be pointed out here that the contents of a descriptor are completely determined by the packet processor that provides the descriptor to QME 305 for enqueuing and that the manner in which the contents of the descriptor are interpreted is completely determined by the packet processor that dequeues the descriptor. QME 305 is thus a general system for the ordered passing of messages between packet processors that belong to the switching system that DCP 203 is a component of and for passing of information between the packet processors and the external queueing and scheduling unit.

Figure 29:
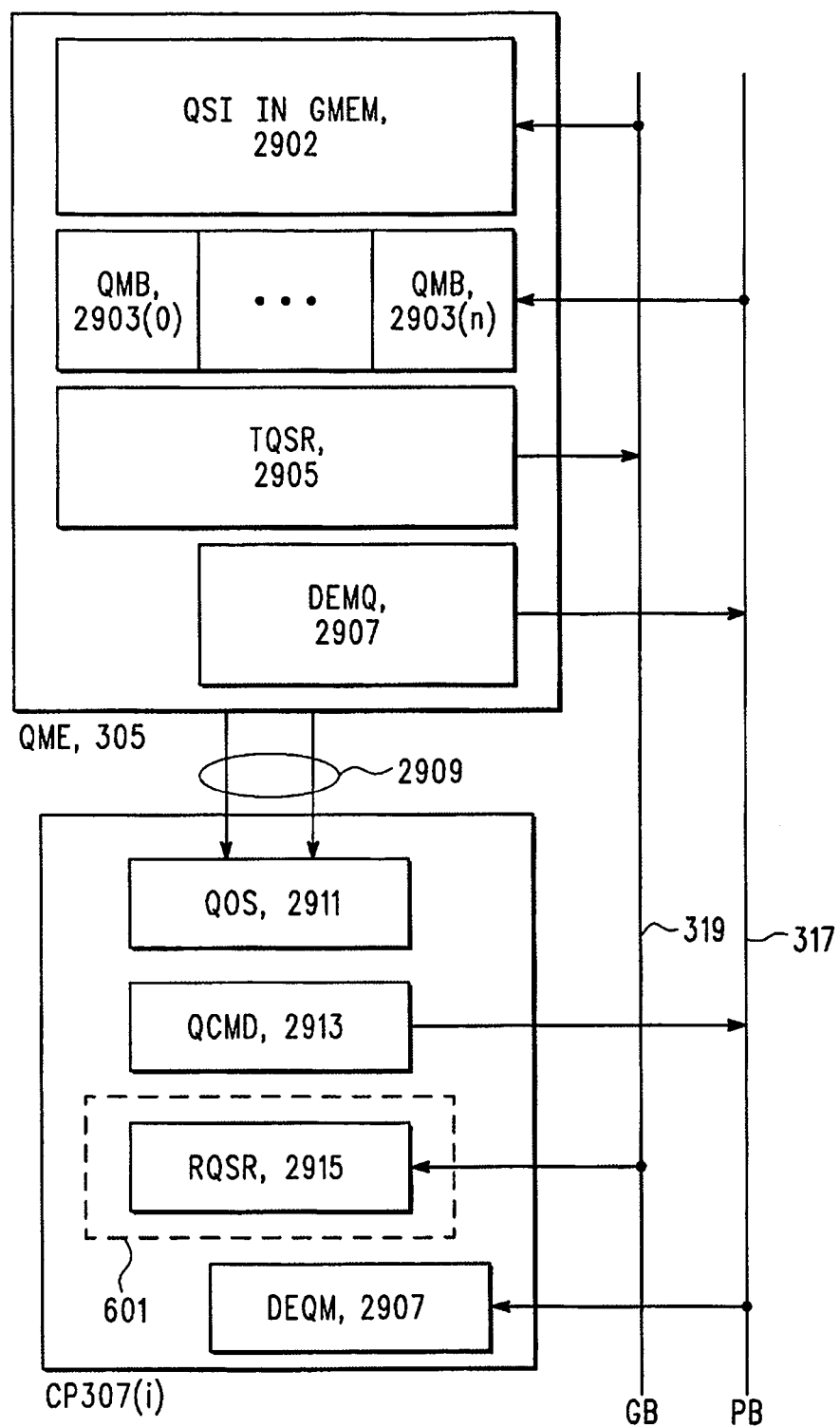
FIG. 29 shows the channel processor interface to QME 305.

QME Interfaces for Packet Processors: FIG. 29

FIG. 29 shows the QME interfaces 2901 for a channel processor 307(*i*), but the other packet processor have the same interfaces, except that fabric processor 303 has its own private connections to QME 305. Beginning with the portions of the interface that are in QME 305, QME 305's local memory is of course part of global address space 321 and consequently accessible by CP 307(*i*). Contained in QME 305's local memory is queue status information 2902. As will be explained in more detail later, queue status information 2902 permits channel processor 307(*i*) to determine which queues in QME 305 it may dequeue descriptors from as well as the condition of those queues. CPRC 401 in channel processor 307(*i*) can thus access QSI 2901 to determine which of its queues it should next dequeue a descriptor from. There is a queue mailbox 2903 in QME 305 for each of the packet processors. To enqueue or dequeue a descriptor from a queue, CP 307(*i*) sends a queue command 2913 via payload bus 317 to CP 307(*i*)'s QMB 203. In response to a dequeue command, QME 305 returns a dequeue message 2907 to CP 307(*i*) via payload bus 317. Dequeue message 2907 contains the dequeued descriptor and information about the protocol data unit represented by the descriptor and the condition of the queue the descriptor was dequeued from. QME 305 further uses spare cycles in global bus 319 to transmit queue status reports (BQSR) 2915 to the individual packet processors concerning the queues served by the packet processor. These reports indicate which queues served by the packet processor have become empty and which have ceased being empty. They appear as received queue status reports (RQSR) 2915 in queue status registers 601 in the local address space of the packet processor. There is finally a queue operation status register in CP 307(*i*) which contains two bits that indicate the status of execution of the last queue command that QME 305 received from CP 307(*i*). The four possible statuses are:

done successfully and/or idling
done unsuccessfully
busy, waiting to begin execution of the command
busy, command being executed by the QME.

Assuming that CP 307(*i*) is both receiving and transmitting packets, it would typically employ the interface as follows: having obtained the information needed to make and enqueue the descriptor for a received packet, CP 307(*i*) sets up a write control block 610 to send an enqueue command to CP 307(*i*)'s QMB 2903(*i*), checks QOS 2911 to make sure that the mailbox is not busy, and starts the DMA that sends the enqueue command. While thus enqueueing descriptors, it periodically checks RQSR 2915 to determine whether any of the queues that it is transmitting packets from has become non-empty. If one of them has, CP 307(*i*) sends a dequeue command in the manner just described for the enqueue command. QME 305 responds to the dequeue command with DEQM 2907, and CP 307(*i*) can use the descriptor contained in DEQM 2907 to transmit the packet it represents. It can use the other information contained in DEQM 2907 to schedule transmission of the packet represented by the descriptor or to update its own copy of the state of the queue. It should be noted here that CP 307(*i*) can do everything that has just been described without accessing QME 305's portion of global address space 321 and thus burdening global bus 319. Of course, should CP 307(*i*) require more information about the state of the queues it writes to or reads from, it can access QSI 2902.

Figure 30:
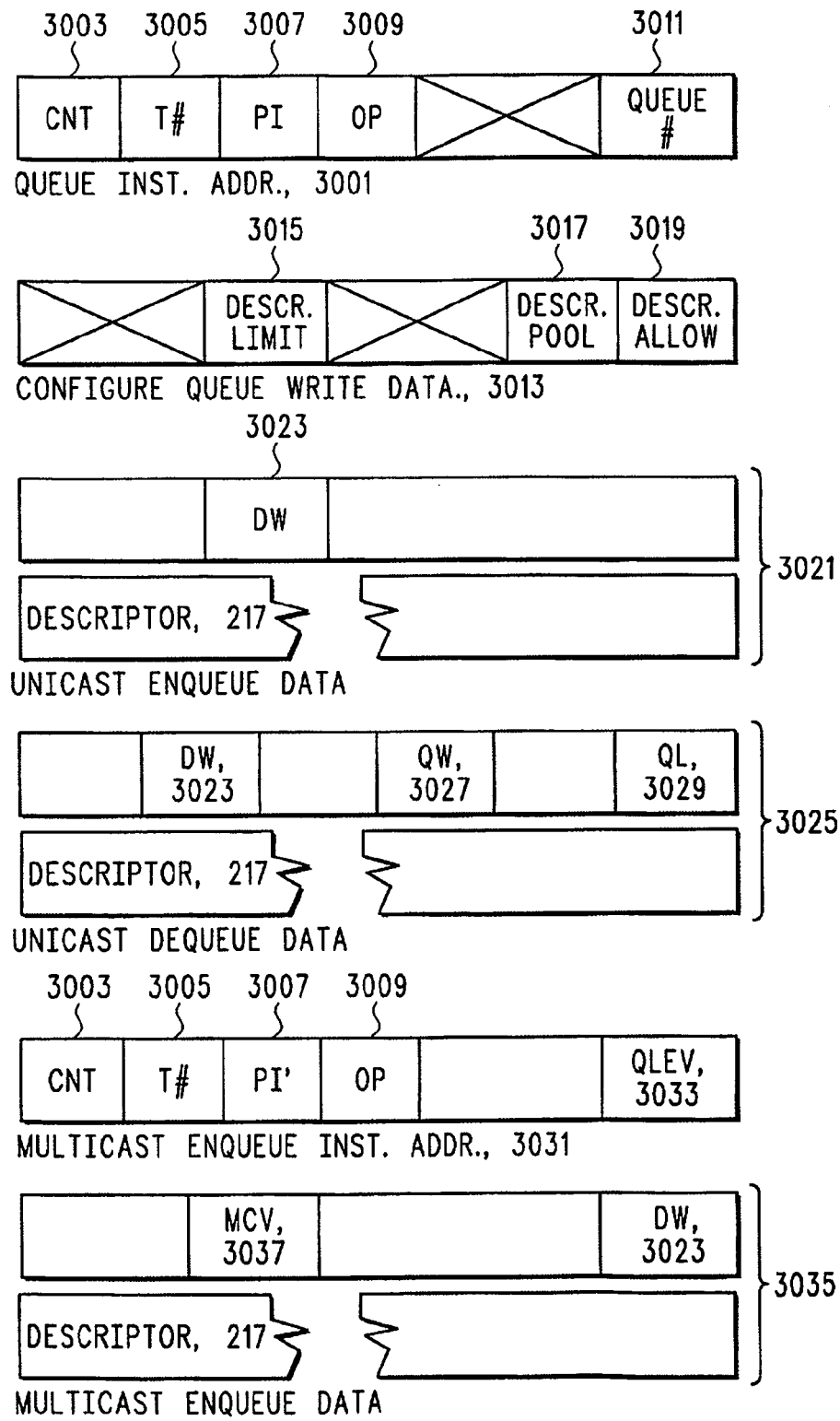
FIG. 30 shows the queue commands employed in a preferred embodiment.

Details of Queue Commands 2913: FIG. 30

In a preferred embodiment, a packet processor may command QME 305 to perform four operations:
queue configuration;
enqueuing a descriptor on a queue;
dequeueing a descriptor from a queue; and
enqueueing a descriptor on a number of queues.

The commands for these operations are transmitted to QME 305 via payload bus 317; a transaction on payload bus 317 has two parts: an address and data. With the queue commands involving single queues, the address is used to specify the operation and the queue, as shown at 3001. Count field (CNT) 3003, transaction number (T#) 3005, and pool identifier (PI) 3007 are common to all payload bus addresses; CNT 3003 specifies the number of 16-bit quantities being read or written in the transaction; T# 3005 distinguishes among transaction by the same source to a given destination; PI 3007 specifies the destination, either a buffer pool in BME 315 or reserved pool numbers for buffer tag operations performed by BME 315 and for queue operations performed by QME 305. In addresses whose PI 3007 specifies QME 305, the address further contains an operation specifier 3009, which specifies one of the above operations, and for operations involving a single queue, queue number 3011.

The contents of the data portion of the command varies with the command. For the configure queue command, the data 3013 specifies the maximum number of descriptors 217 that the queue specified at 3011 of the address may contain at 3015, the descriptor pool in QME 305 from which the descriptors are to be taken at 3017, and descriptor allowance 3019, which specifies the number of descriptors 217 that may be committed to, but not actually in use in the queue. The configure queue command permits the packet processor that reads a given queue to dynamically change the amount of resources allocated to the queue as conditions change. For example, if there is a burst of traffic for the output port which is being served by the channel processor 307 that is transmitting from the queue, that channel processor 307 can use the configure queue command to increase the maximum number of descriptors and/or the descriptor allowance for the queue, and when the burst is past, the channel processor 307 can decrease the maximum number of descriptors and/or the descriptor allowance.

For the unicast enqueue command, there are two words of data 3021. The first contains descriptor weight 3023, which specifies the amount of data in DRAM 229 represented by the descriptor being enqueued. The second contains descriptor 217 to be enqueued in the queue specified at 3011. For the dequeue command, there are also two words of data 3025. The first word contains descriptor weight 3023 for the descriptor being dequeued, queue weight 3027, which is the total of the queue weights for the descriptors still in the queue, and queue length 3029, which is the number of descriptors remaining in the queue. The second word contains the descriptor 217 which has been dequeued from the queue specified at 3011. The packet processor receiving the dequeued descriptor may use the information in the first word to determine which of the queues it is transmitting from it will next issue a dequeue command for or to issue a configure queue command to change the amount of resources available to a queue.

The multicast enqueue command whose address portion is shown at 3031 and whose data portion is shown at 3035 enqueues a descriptor for transmission by more than one packet processor. The only difference between address portion 3031 and address portion 3001 is that it contains queue level (QLEV) field 3033 instead of queue number field 3011. Queue level field 3033 specifies a minimum service or priority level for the queues that are to receive the descriptor. The data portion 3035 of the command contains a multicast vector (MCV) 3037 in its first word that indicates which of the packet processors is to output the queue. Also contained in the first word is the descriptor weight 3023 for the descriptor 217, which is in the second word. As the data in the command indicates, the multicast enqueue command specifies packet processors and service levels instead of specific queues, and QME 305 enqueues the descriptor 207 in queues served by the specified packet processors that have at least the minimum service levels. The descriptor is not actually copied onto all of the queues, as will be explained in detail in the following. The receiving packet processor that sends a multicast enqueue command to QME 305 also sends a command to BME 315 that sets a counter for the BT 233 specified in the multicast enqueue command's descriptor; each time a transmitting packet processor receives a descriptor that has been enqueued for multicast (indicated in the descriptor) and transmits the PDU specified by the descriptor's BT 233, it sends a command to BME 315 that decrements the counter for the BT 233 by 1.

Figure 31:
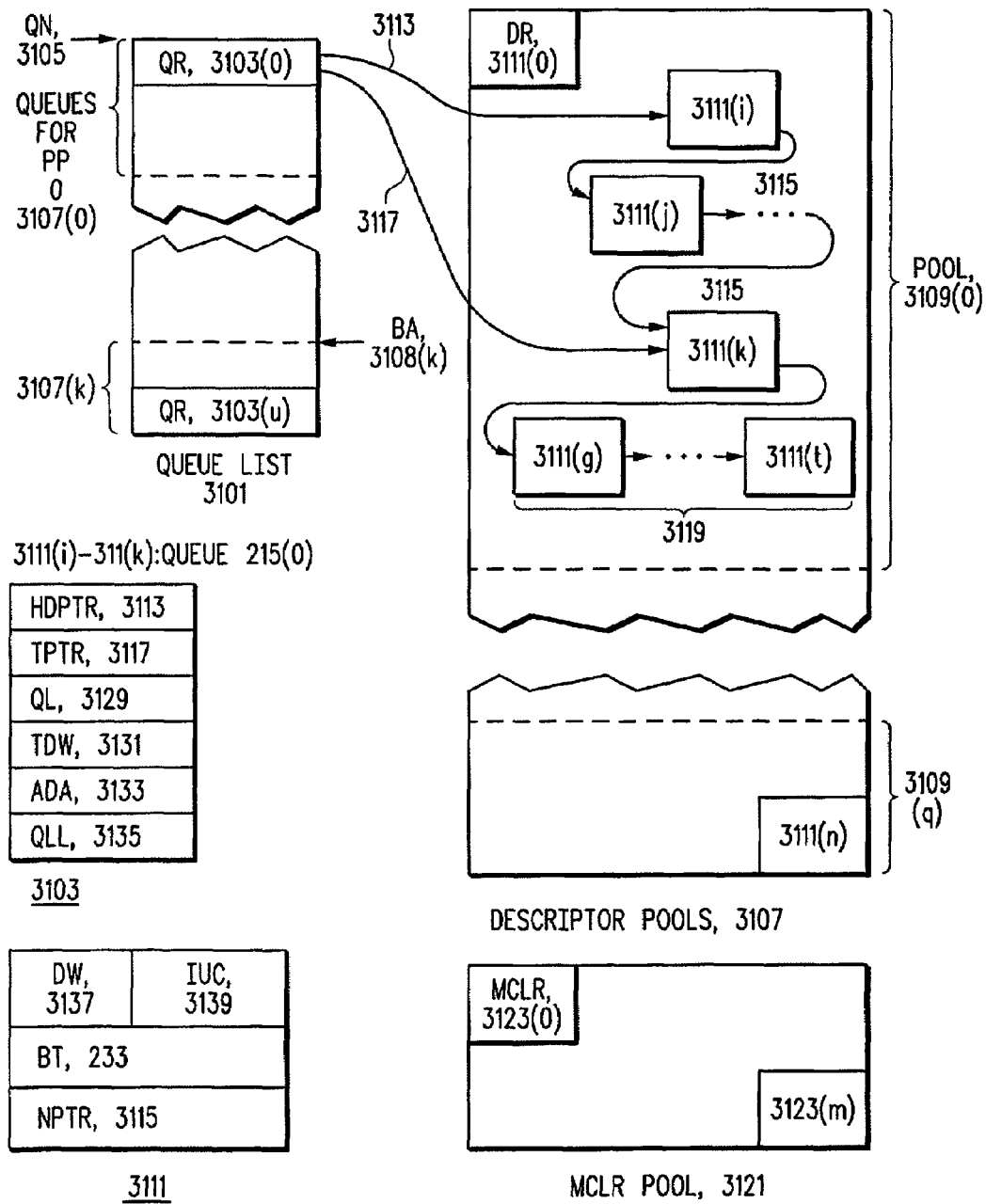
FIG. 31 shows the queue data structures in a preferred embodiment.
Figure 32:
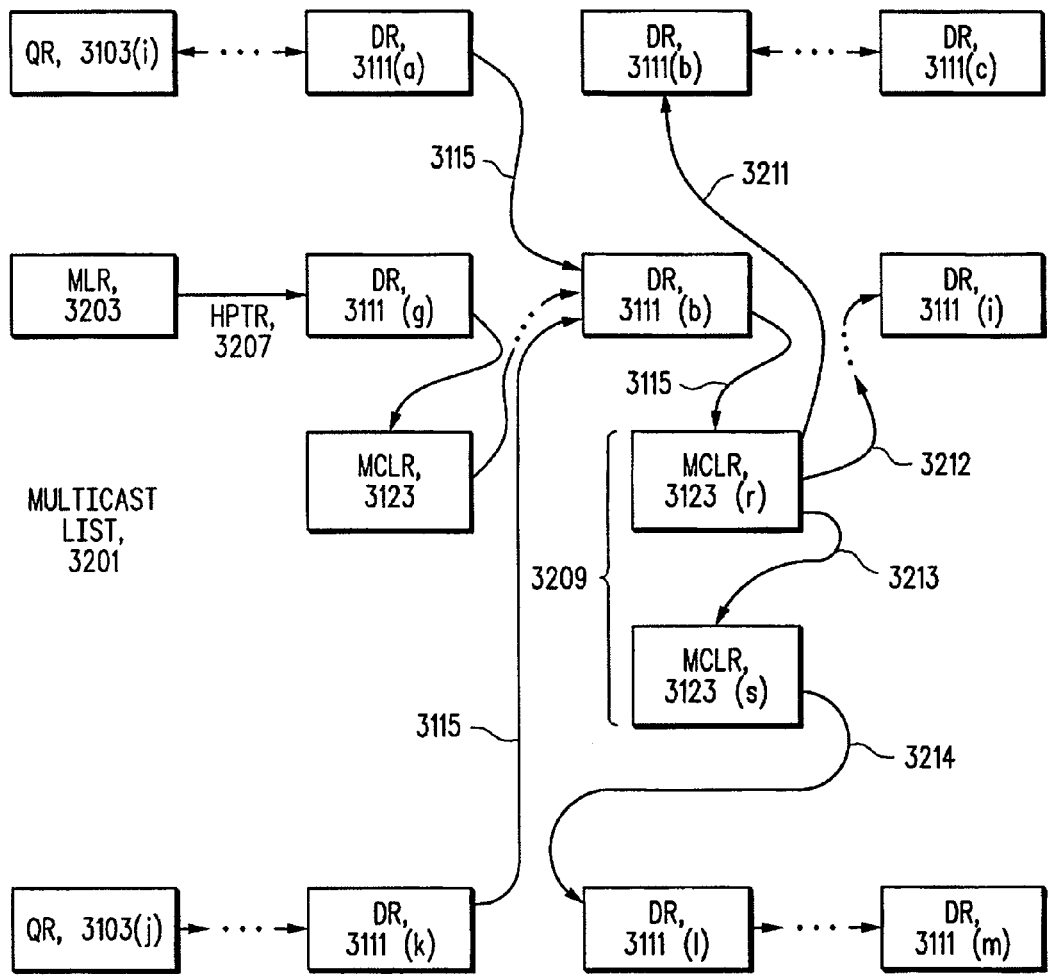
FIG. 32 shows multicast data structures in a preferred embodiment.

Details of Queue Data Structures: FIGS. 31 and 32

FIGS. 31 and 32 show details of the data structures that implement queues 215 in buffer management engine 305 in a preferred embodiment. Depending on the number and size of the queues required for the particular situation in which DCP 203 is being employed, the data structures may all be in memory internal to DCP 203, the queue control data structures may be in memory internal to DCP 203 and the queues themselves may be in queue memory 213, or all of the queue data structures may be in queue memory 213.

The queues 215 are linked lists of descriptor records 3111. All of the descriptor records 3111 are of the same size, but that size may be set by parameter upon system initialization. The descriptor records are stored in a number of descriptor pools 3109(0 ... q), with the size and number of pools being determined by the amount of storage available to QME 305. Descriptor records 3111 belonging to a given queue must all be from a single descriptor pool 3109(i). Each descriptor record 3111 contains at least the following fields:

in-use count (IUC) 3139, which indicates the number of queues the descriptor is currently enqueued on; and next pointer (NPTR) 3115, which points to the next buffer record in the queue.

Where the descriptor is being used to pass information about a buffer 231 from a receiving packet processor to a transmitting packet processor, descriptor record 3111 will also contain the following:

descriptor weight (DW) 3137, which indicates the size of the buffer represented by the descriptor's buffer tag 233; and buffer tag (BT) 233, the buffer tag for the buffer in SDRAM 229 represented by the descriptor; and Otherwise, the contents of the descriptor 217 and therefore of descriptor record 3111 are determined by the packet processor that is the source of the descriptor. For example, if the source packet processor is processing packets in a stream where the ultimate destinations of the packets are a number of Ethernet nodes and the destination packet processor is a transmitting packet processor that outputs the packets to a LAN to which the Ethernet nodes belong, descriptor 217 will include the Ethernet address for the packet that is to be made from the contents of the buffer specified by buffer tag 233. Also shown in FIG. 31 is a pool 3121 of multicast list records (MCLR) 3123. As will be explained in detail later, these records are used in multicasting.

Each queue 215 is represented by a queue record 3103 in queue list 3101. Queue list 3101 is in buffer management engine 305's portion of global address space 321 and may consequently be read by the packet processors. The queue number 3105 of the queue is the index of its queue record 3103 in list 3101. Queue list 3101 is divided into sections 3107, one for each packet processor that transmits packets. All of the queues for a given packet processor are represented by a contiguous set of queue records in the packet processor's section 3107 of list 3101. The configuration information in QME 305's portion of global address space 321 includes the base address 3108 of each packet processor's section of queue list 3101 and the number of queues being read by the packet processor; consequently, a packet processor can determine which queues are being served by which packet processors, and given a queue number, the queue record 3103 may be found. Queue list 3101 is further used by QME 305 to determine which queues a given packet processor receives broadcast queue status reports 2915 about.

Each queue record 3103 contains the following fields:

head pointer (HDPTR) 3113, which points to the descriptor record 3111 which is currently at the head of the record's queue;

tail pointer (TPTR) 23113, which points to the descriptor record 3111 which is currently at the tail of the record's queue;

queue length (QL) 3129, which is the number of descriptor records 3111 currently in the record's queue;

total descriptor weight (TDW) 3131, which is the sum of the values in the DW fields 3137 of all of the descriptor records in the record's queue;

allocated descriptor allowance (ADA) 3133, which is the number of descriptors over and above those actually in the queue which may be allocated to the queue; and queue length limit (QLL) 3135, which specifies the maximum permissible length for the queue.

It will be noted that ADA 3133 and QLL 3135, together with the pool 3809 which is to be the source of the queue's descriptors, are set by the configure queue command.

A single queue 215(0) is shown in FIG. 31. Queue 215(0) contains descriptor records 3111 (i ... k), with descriptor record 3111(i) being at the head of the queue and therefore pointed to by HDPTR 3113 in QR 3103(0) and descriptor record 3111(k) being at the tail and pointed to by TPTR 3117 in QR 3103(0). Following descriptor record 3111(k) is a linked list 3119 of allocated descriptor records 3111($q \ldots t$). These descriptor records have been allocated to queue 215(0) but are not part of it, since they follow queue 215(0)'s tail. ADA field 3133 determines the maximum number of descriptor records which may be in linked list 3119.

When a queue 215($i$) is initialized by means of a configure queue command, QME 305 sets up a linked list 3119 of allocated descriptor records 3111 and sets queue record 3103($i$) up so that head pointer 3113 and tail pointer 3117 point to the first descriptor record 3111 in linked list 3119 and QL field 3129 is set to 0. As QME 305 performs the operation, it sets QOS register 2911 to indicate its status.

When an enqueue command is received in a packet processor's queue mail box 2903, QME 305 takes the descriptor 217 in the command, writes it into the first descriptor record 3111 in list 3119 belonging to the queue specified in the command, increments QL 319 and updates TPTR 3117 to point to the descriptor record 3111 that the descriptor record 3111 was written to. If there are no descriptor records 3111 in linked list 3119, QME 305 adds the number specified in ADA 3133 to the list. Again, QME 305 uses QOS register 2911 to indicate the operation's status. If the queue 215's queue length was 0 before the descriptor 217 was enqueued, QME 305 sends a broadcast announcement 2905 to the queue's packet processor indicating that the queue is now non-empty.

When a dequeue command is received, QME 305 uses head pointer 3113 to locate the descriptor record 3111 that is at the head of the queue, reads descriptor 217 from it, updates head pointer 3113 to point to the next descriptor record 3111 in the queue, and if there are fewer descriptor records 3111 in list 3119 than is permitted by ADA field 3113, adds the former head descriptor record 3111 to list 3119. QOS register 2911 again indicates the status of the operation. Descriptor 217 is returned in the command's return data. If the dequeued descriptor is the last one in the queue, QME 305 sends a BQSR 2905 indicating that the queue is now empty.

Multicast Enqueueing and Dequeueing: FIGS. 32 and 33

As indicated above in the discussion of the queue commands, the multicast enqueue command permits a packet processor to enqueue a descriptor for consumption by more than one of the transmitting packet processors. FIG. 32 shows how multicast enqueueing is implemented in a preferred embodiment. In addition to the queues on queue list 3101, queue management engine 305 maintains a single multicast list 3201. QME 305 places a descriptor 215 which is received in a multicast enqueue command in a descriptor record 3111 in multicast list 3201 and the descriptor remains in multicast list 3201 until all of the packet processors which are to transmit the protocol data unit indicated by the descriptor have done so.

Continuing with the details of multicast list 3201, it is represented by a multicast list record 3203 which points to the first DR 3111($g$) in list 3201. Any DR 3111 in list 3201 which represents a descriptor 215 for which packet processors still have to transmit the descriptor 215's protocol data unit will have one or more multicast list records 3123 associated with it. The multicast list records 3123 associated with DR 3111 store a list 3209 of pointers; the pointers include a pointer to the next DR 3111 in multicast list 3201 and pointers to DRs 311 in the unicast queues.

In FIG. 32, the pointers for DR 3111($h$) are shown in detail. The descriptor 215 in DR 3111($h$) was enqueued with a multicast enqueue command whose result was that descriptor 215 was enqueued on unicast queues 215($i$) and 215($j$). Thus, NXTPTR 3115 in DR 3111($a$) in queue 215($i$) points to DR 3111($h$) in multicast list 3201, as does NXTPTR 3115 in DR 3111($k$) in queue 2150). DR 3111($h$)'s NXTPTR 3115 points to MCLR 3123($r$), the first MCLR associated with DR 3111($h$). MCLR 3123($r$) has three pointers; one, pointer 3211, points to the next DR 3111 in multicast list 3201; another, 3212, points to DR 3111($b$), the DR following DR 3111($h$) in queue 215($i$), The third, 3213, pointer points to MCLR 3123($s$), which has a fourth pointer 3214, which points to DR 3111 (1), the DR following DR 3111($h$) in queue 215($j$).

The details of MCLR 3123 are shown in FIG. 33. Each MCLR 3123 has two queue pointers 3301, each of which specifies a queue number (3203) and a next pointer (NPTR) 3205 to the next DR 3111($h$) in the queue specified by queue number 3203 and a next MCLR pointer (NXTMCLR) 3213, which points to the next MCLR associated with the DR 3111. In the first MCLR associated with a given DR 3111 in multicast list 3201, the first QPTR 3301 points to the next DR 3111 in the multicast list.

As may be seen from the foregoing, DR 3111($h$) can be made a DR in any number of unicast queues 215 simply by having the preceding DR 3111 in each queue 215 point to DR 3111($h$) and including a pointer to the following DR 3111 in each queue in the MCLRs 3123 associated with DR 3111($h$). The multicast enqueue operation is thus a matter of adding a DR 3111 for the descriptor 217 being enqueued to list 3201, determining which unicast queues 215 the descriptor 217 is to be enqueued in, adding MCLRs 3123 as needed for the unicast queues 215, setting up the pointers in the preceding DRs 3111 in the unicast queues as shown in FIG. 32, setting the tail pointers in the unicast queues 215 to point to the DR 3111 in the multicast list, and setting in use count 3139 to indicate the total number of unicast queues the descriptor 217 has been enqueued in. When a unicast queue enqueues the DR 3111 following the DR 3111 in the multicast queue, it sets NPTR 3205 in its QPTR 3301 in the MCLRs 3123 to point to the newly-added DR 3111. How QME 305 determines which unicast queues the descriptor is to be enqueued in will be explained in detail below.

The dequeue operation with a DR 3111 on multicast list 3201 works as follows: as long as the in use count is greater than 1, the dequeue operation works as described for a DR 3111 that is not on multicast list 3201, except that each dequeue operation decrements the in use count by 1 and NPTR 3115 in the new tail DR 3111 is set from NPTR 3205 in QPTR 3301 for the unicast queue. When the in use count in the DR 3111 is 1, the dequeue operation additionally sets the DR 3111's use count to 0 and its NPTR 3115 to point to the next DR 3111 in the multicast list and returns its MCLRs 3123 to a free list.

Selecting Unicast Queues in Multicast Enqueuing

It will be recalled that the multicast enqueue command does not specify the queues that the descriptor is to be enqueued in, but rather transmitting packet processors (MCV field 3037) and a queue or service level (QLEV 3033). The meaning of a given queue or service level is determined completely by the manner in which the packet processor which is reading the queues has been programmed. In executing the multicast enqueue command, QME 305 must translate this information into a unicast queue number. This is done by means of queue number mapping table (QNMT) 3303, shown in FIG. 33.

To give a simple example of how a transmitting packet processor might use the queue or service level, if the service level simply reflects priorities among queues, with the higher number being the higher priority, then the transmitting packet processor will not service a queue with a given priority as long as there is a non-empty queue with a higher priority.

Queue number mapping table 3303 has a portion 3307 for each packet processor. The portions are ordered by the packet processor's number. Each portion 3307 has an entry (QNMTE) 3305 for each service level. In a preferred embodiment, there are eight service levels. An example portion 3307 for packet processor 0 is shown in FIG. 33, where it is assumed that packet processor 0 is using a simple priority system where the higher service level indicates higher priority and that packet processor 0 has queues for service levels 0, 3, and 4. Each entry 3305 for a service level for which packet processor 0 has no queues has a NULL value; each entry 3305 for a service level for which packet processor 0 has queues contains QROFF, the offset of the block of queue records 3103 for queues of that service level in queue list 3101, and the number of the packet processor's queues which have the entry's service level.

QNMTEs 3305 are addressed by the packet processor number and the queueing level number, as shown at 3309. Thus, if address 3309 specifies packet processor number 0 and queueing level 3, the entry 3305 located by the address is 3305(0,3). Using QROFF specified in entry 3305(0,3), QME 305 can find the first queue record 3103 for that packet processor and queueing level; it may choose to use that queue, or it may choose a queue specified by another of the queue records 3103 for queues having that queuing level. If address 3309 specifies a QNMTE 3305 with a null value, indicating that the packet processor has no queues for that queueing level, QME 305 moves up portion 3307 until it finds a QNMTE 3305 for a higher queueing level and chooses a queue at that level as just described.

Figure 34:
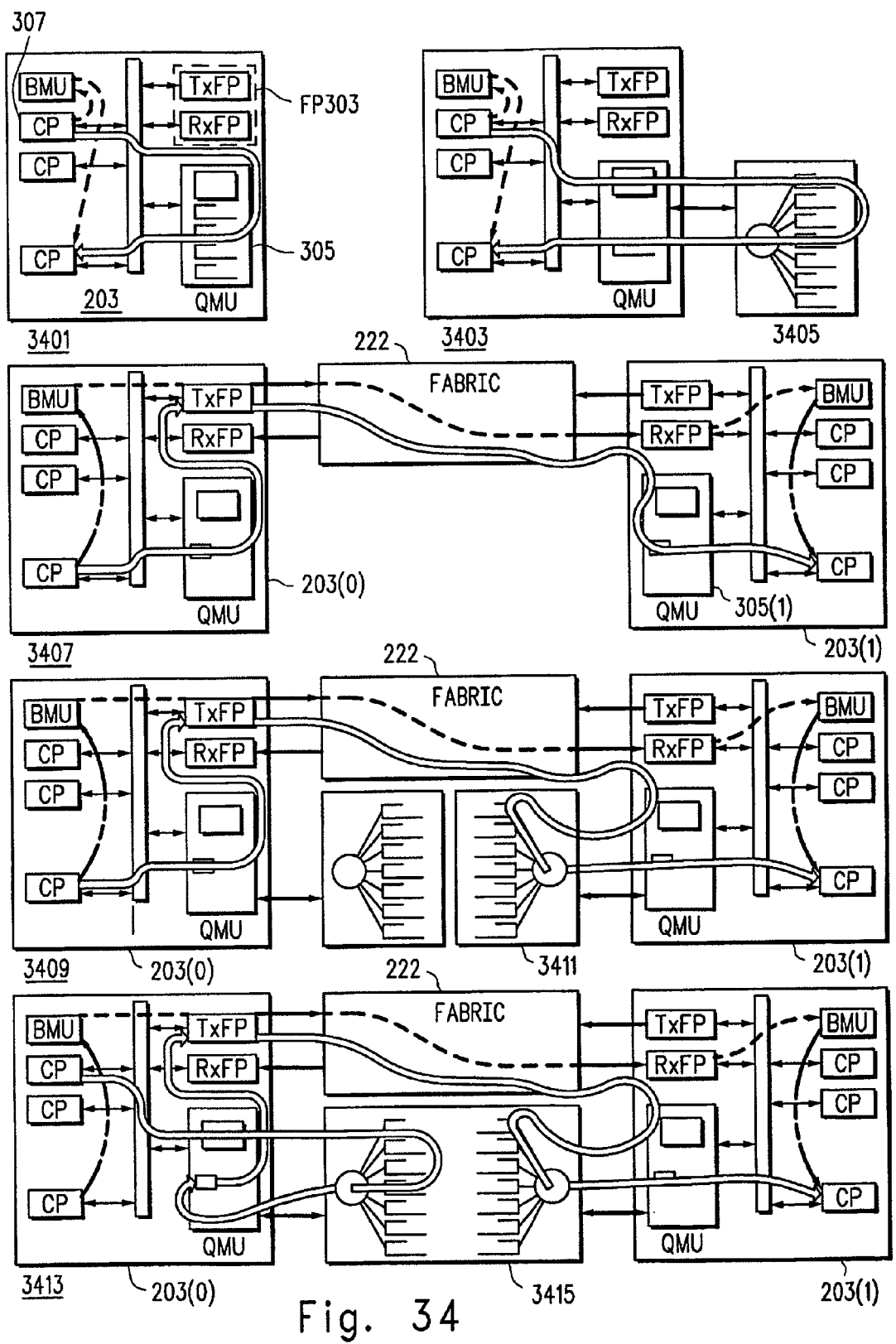
FIG. 34 shows various configurations for managing queues.

Queue Management with QME 305: FIG. 34

As earlier mentioned, the queues 215 managed by QME 305 may be completely contained within QME 305's memory in DCP IC 203, may be contained in an expansion queue memory 213, or may be managed by an external queueing and scheduling unit in response to commands from QME 305. FIG. 34 gives examples of configurations with and without the external scheduling unit. In these figures, flow of descriptors 217 is shown by solid wide light gray arrows; flow of protocol data units is shown by dashed dark gray arrows.

At 3401 is shown a stand-alone DCP 203 in which the queues are contained in storage managed directly by QMU 305; at 3403 is shown a stand-alone DCP to which has been added an external queueing and scheduling unit 3405; in such configurations, the external queueing and scheduling unit deals with matters such as the number of queues for a given packet processor, the levels of those queues, and multicasting. QME 305 with an external queueing and scheduling unit, QME 305 has only its memory in DCP 203; in that memory there is a single queue for descriptors 217 that are to be sent to external unit 3405 and queues for each of the transmitting packet processor that receives descriptors 217 that are sent from external unit 3405 to QME 305 for transmission by the transmitting packet processor. The function of these queues is to provide a buffer between the packet processor and the external queueing and scheduling unit.

At 3407 there is shown a configuration in which two DCPs 203(0 and 1) are connected by a switching fabric 222 and the queue management for both DCPs 203 is done by QME 305(1) in DCP 203(1). QME 305(0) simply places enqueue commands for descriptors 217 that are to be enqueued on a queue read by fabric processor 303(0), which sends the commands via fabric 222 to fabric processor 303(1). Fabric processor 303(1) passes the command on to QME 305(1). QME 305(1) then enqueues the descriptors on queues 215 as indicated in the command. The queue 215 may be a queue which is read by a transmitting packet processor in either DCP 203(0) or DCP 203(1). Queue status information for queues read by packet processors in DCP 203(0) is passed from QME 305(1) via fabric processor 303(1), fabric 222, and fabric processor 303(0) to QME 305(0), which then sets the recipient's QOS register 2911 or sends a broadcast queue status report 2915 to the recipient as required by the circumstances. With the dequeue command, the command is passed to QME 305(1) as just described, and the descriptor that is dequeued in response to the command is passed back to QME 305(0) as described for status information and from QME 305(0) to the transmitting packet processor.

When a protocol data unit that was received by a packet processor in one of the DCPs 203 is to be transmitted from a transmitting packet processor in another of the DCPsBME 315 in the DCP to which the transmitting packet processor belongs responds to the transmitting packet processor's request for the protocol data unit by forwarding the buffer tag via the fabric processors to the buffer management engine for the receiving packet processor, which responds to the buffer tag by providing the protocol data unit via the fabric processors to the buffer management engine for the transmitting packet processor, which then provides it to the transmitting packet processor.

At 3409 there is shown an arrangement like that of 3407, except that the queues are in an external queueing and scheduling unit 3411 managed by QME 305(1). Queue commands, status information, and descriptors are passed between DCP 203(0) and DCP 203(1) as just described, except that QME 305(1) then passes the commands to and receives the status and descriptors from external queuing and scheduling unit 3411. At 3413, there is shown an arrangement with an external queueing and scheduling unit 3415 that directly serves both QME 305(0) and QME 305(1). Operation is as described above except that either QME 305 may deal with external unit 3415 either for itself or as a proxy for the other QME 305.

Figure 35:
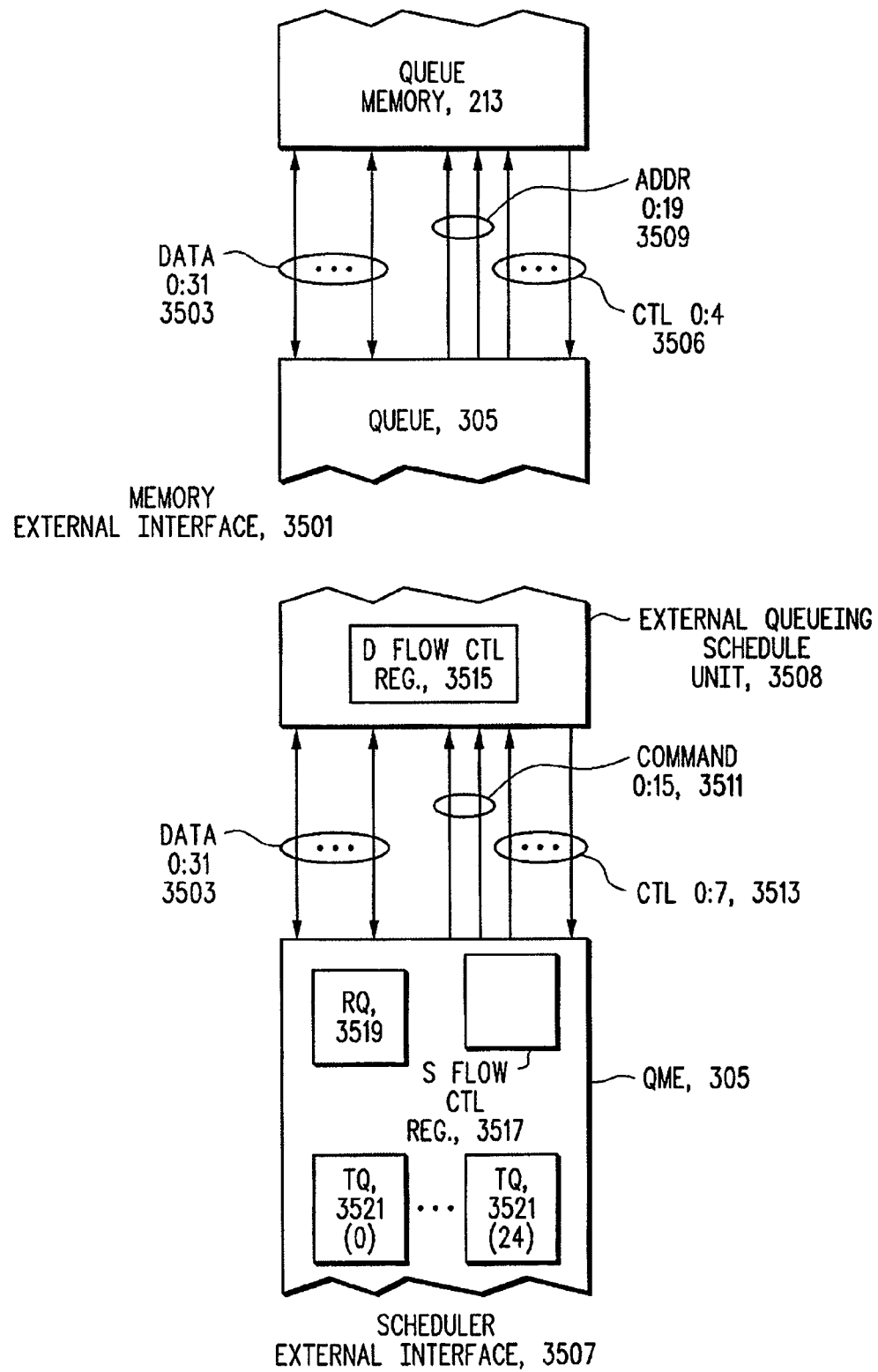
FIG. 35 shows QME 305's expansion interface.

QME 305's External Interfaces: FIG. 35

In a preferred embodiment, QME 305 has a 55-pin external interface which may be used either with an external SyncSRAM memory bank or with a queueing and scheduling unit as described above. FIG. 35 shows how the external interface is used in each of these cases. At 3501 is shown the memory external interface. There are 32 bidirectional data lines 3503, 20 unidirectional address lines 3505, and 4 or 5 control lines 3506. Writes to the memory bank 213 and reads from it are done in the usual way.

At 3507 is shown how the 55-pin external interface is used with a queueing and scheduling unit 3508. There are again 32 bi-directional data lines 3509, 16 bi-directional command lines 3511, and 8 control lines 3513. As far as the interface is concerned, QME 305 is the master and scheduler 3508 is the slave. Either scheduler 3508 or QME 305 may transmit a message to the other, but the direction in which a message will be transmitted will be determined by QME 305. Transfer of messages is flow controlled, i.e., scheduler 3508 and QME 305 each indicates to the other whether and what messages it can accept and the sender may not send unless the receiver can accept the message. QME 305 is also the source of the clock signals for the interface.

There are four possible sizes of messages:
- 12 bytes, of which 4 are command and 8 data, transmitted in 2 clock cycles;
- 24 bytes, of which 8 are command and 16 are data, transmitted in 4 clock cycles;
- 36 bytes, of which 12 are command and 24 are data, transmitted in 6 clock cycles; and
- 48 bytes, of which 16 are command and 24 are data, transmitted in 8 clock cycles.

The size of the messages is determined when DCP 203 is initialized. The content of the messages is of course determined by the interaction between QME 305 and scheduler 3508, but for the most part they will contain descriptors 217 which are to be enqueued on the queues managed by scheduler 3508 or which have been dequeued from the queues managed by scheduler 3508.

Flow control is made somewhat complex by the fact that QME 305 serves as a proxy for all of the transmitting packet processors, and each of these packet processors may or may not be able to accept a descriptor from scheduler 3508 at a given moment. In a preferred embodiment, there may be up to 25 queues for the packet processors: one for executive processor 313, one for each of the 16 channel processors 307, and 8 for fabric processor 303. Fabric processor 303 has 8 queues because it is responsible for all communication via switching fabric 222, and as seen above, such communication may involve system control information as well as protocol data units. Moreover, devices requiring different kinds of frames may be connected by a single fabric processor.

When used with an external scheduler 3508, QME 305 has a single receiver queue (RQ) 3519, in which it places all of the descriptors 217 that it receives from the receiving packet processors until they can be output to scheduler 3508 for enqueueing and a transmit queue (TQ) 3521 for each of the transmitting packet processors. When a TQ 3521 for a transmitting packet processor is full, QME 305 cannot receive any more descriptors 217 for that queue of the transmitting packet processor.

Since there is only a single output queue, flow control for messages directed to scheduler 3506 is simple: when the scheduler can accept a message, it activates a signal in control 3513 and scheduler flow control register 3517 indicates the state of the signal, so QME 305 need only wait to transmit the next message until control register 3517 so indicates. Flow control for messages directed to QME 305 is done by means of DCP flow control register 3515 in scheduler 3508, which contains 25 flow control bits, one for each of the possible transmitting packet processors. Scheduler 3508 may send a message whose ultimate destination is a given transmitting packet processor only if the flow control bit for the transmitting packet processor in DCP flow control register 3515 so indicates. A portion of every message sent by QME 305 to scheduler 3508 may be used to set or clear flow control bits in register 3515, and QME 305 sends a message which sets the bit for a transmitting packet processor when the transmitter's transmit queue 3521 is full and sends a message which resets the bit when transmit queue 3521 again has room for descriptors.

While QME 305's external interface will generally be used to communicate with queue management devices, it need not be. Since the contents of a descriptor are determined completely by the packet processor which produces it, the external interface may be used by packet processors to write data to a device accessible via the external interface and/or read data from such a device. One way this capability could be used is to program a packet processor as a "packet sniffer", that is, a device which simply collects information about the packets in a packet stream. RxSDP 421 can be programmed to extract the desired information for each packet from the packet stream and provided it to CPRC 401, which can then pack the information into a descriptor and enqueue the descriptor for delivery by QME 305 to an external device which can store and analyze the information.

Figure 37:
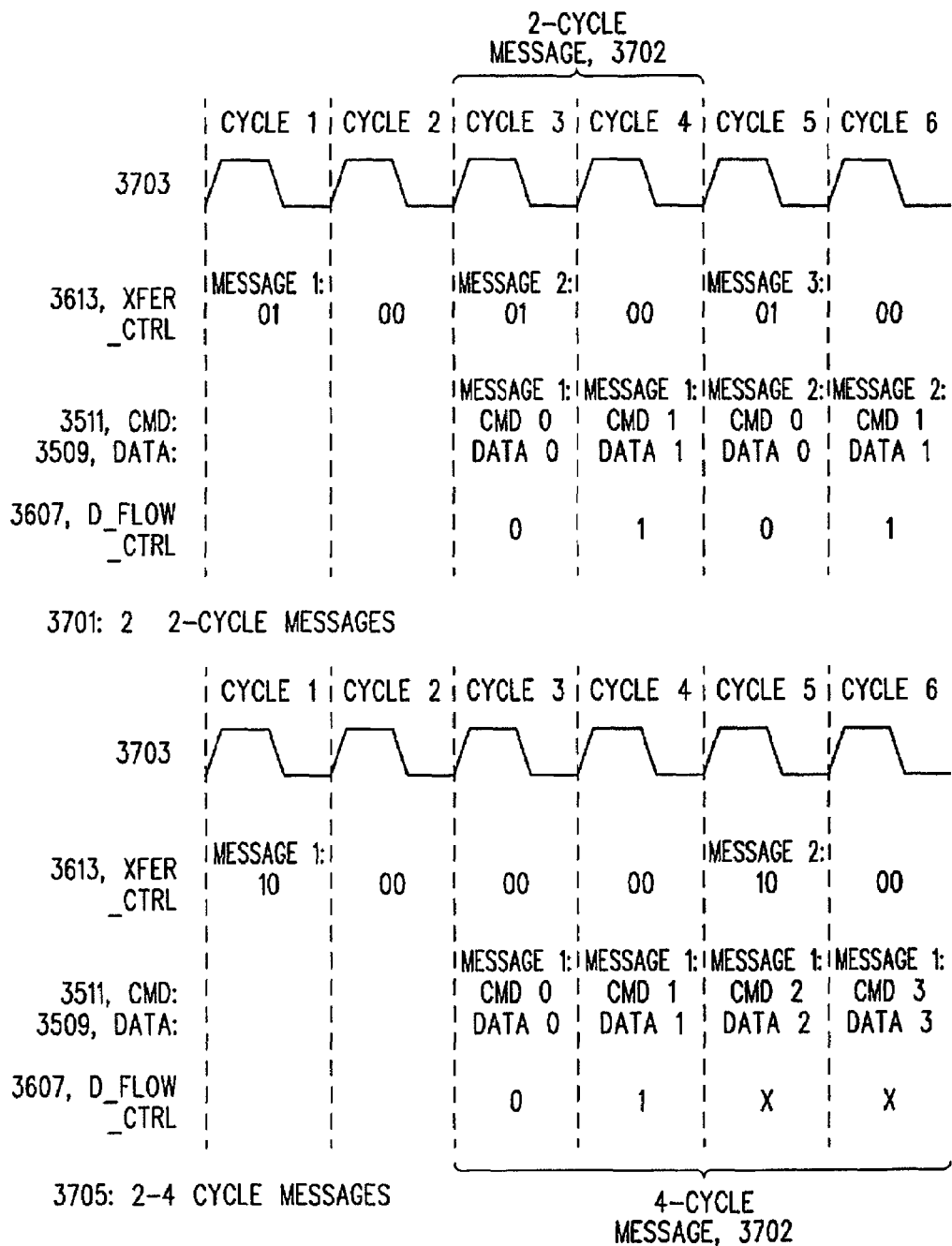
FIG. 37 shows timing for messages on the scheduler interface.

Details of Scheduler External Interface: FIGS. 36 and 37

FIG. 36 shows how the individual pins of the external interface are used with a scheduler 3508. In FIG. 8, the column labeled pins 3601 shows the number of pins making up a group and the arrows in the column labeled direction 3603 show the direction of flow of information. DCP->SCHED indicates flow from QME 305 to scheduler 3508 and DCP<-SCHED indicates flow in the opposite direction. Beginning with the eight control pins 3513,

- clock pin 3605 provides a clock signal from QME 305 to scheduler 508;
- D_flow_ctrl 3607 provides three bits of flow control information each cycle from QME 305 to scheduler 3508; scheduler 3508 uses the six bits of D_flow_ctrl 3607 received on the first two cycles of a message to set or clear a bit in D flow control register 3515;
- S_flow_ctrl 3609 is one bit of flow control information from scheduler 3508 to QME 305; QME 305 uses the value on pin 3609 to set S flow control register 3517;
- Xfer_rqst 3611 is a signal that scheduler 3508 activates when it wishes to send a message to QME 305; and
- Xfer_ctrl 3613 is two bits that QME 305 sends to scheduler 3508 to indicate how the data and control signals on the pins are to be interpreted in the following clock cycles; details are given below.

Command pins 3511 are bidirectional; they include 16 command bits and 1 parity bit. Data pins 3509 are also bidirectional; they include 32 data bits and 1 parity bit.

Operation of interface 3507 is controlled by Xfer_crtl 3613. The meanings of the four values of the two lines are as follows:
- 00: not a clock cycle which will be followed by a message;
- 01: a clock cycle which will be followed two cycles later by the first cycle of a message from QME 305 to scheduler 3508; during the first two cycles required for transmission of the message, D-flow_ctrl 3607 will transfer flow control information to scheduler 3508;
- 10: a clock cycle which will be followed two cycles later by the first cycle of a message from scheduler 3508 to QME 305; during the first two cycles required for transmission of the message, D_flow_ctrl 3607 will transfer flow control information to scheduler 3508;
- 11: a clock cycle which will be followed two cycles later by two clock cycles in which flow control information will be transferred to scheduler 3508 via D_flow_ctrl 3607.

As can be seen from the foregoing, 6 bits of flow control information may potentially be transferred from QME 305 to scheduler 3508 with every message and in every 2 clock cycles when no messages are being transferred. The values of the 6 bits include a value specifying a noop operation and values to which scheduler 3508 responds by setting or resetting individual flow control bits for each of the 25 queues for transmitting packet processors in D flow control register 3515.

As previously discussed, a message may be 2, 4, 6, or 8 cycles long, with each cycle transferring 16 bits of command data and 32 bits of descriptor data. The semantics of the command data depend on the manner in which scheduler 3508 and QME 305 have been programmed, except that with a message from scheduler 3508 to QME 305, the command data in the first cycle must take the form shown at 3514: the first six bits must have the pattern 3615 and the last six bits must contain the number of the queue to which the message is destined. This number of course determines which transmit queue 3521 the message will be placed in.

FIG. 37 shows examples of operation of interface 3507 with 2- and 4-cycle messages. The 2-cycle messages are shown at 3701. At 3703 there are shown the clock cycles for the interface; at 3613 are shown the values on Xfer_Ctrl 3613 during the clock cycle; at 3511 is shown what is on command data pins 3511; at 3509 is shown what is on descriptor data pins 3509; at 3607 is shown what is on D_flow_Ctrl pins 3607. Thus, in cycle 1, Xfer_Ctrl 3613 is set to 01, indicating that the cycle after next (cycle 3) will be the first cycle of a 2-cycle message 3702 directed from QME 305 to scheduler 3509 In cycle 2, Xfer_Ctrl 3613 is set to 00, indicating that the cycle after next will not be the first cycle of a message. In cycle 3, command 3511 and data 3509 contain the first cycle's worth of command data and descriptor data for the message, and D_flow_Ctrl 3607 contains the first cycle's worth of flow control data for scheduler 3508. Xfer_Ctrl 3613 is again set to 01, indicating that the first cycle of another message from QME 305 to scheduler 3508 will begin in cycle 5.

In cycle 4, the second half of message 3702 is sent, with command 3511 and data 3509 containing the second cycle's worth of command data and descriptor data and D_flow_Ctrl 3613 containing the second cycle's worth of flow control data. Xfer_ctrl 3613 is again set to 00. In cycles 5 and 6, the second message is transmitted and in cycle 5, Xfer_Ctrl 3613 indicates that a third message will follow, beginning in cycle 7.

Transmission of two four-cycle messages 3707 from scheduler 3508 to QME 305 is shown at 3705; in cycle 1, Xfer_Ctrl 3613 is set to 10, indicating that the first message to begin in cycle 3 will be directed to QME 305; in cycles 2–4, Xfer_Ctrl 3613 is set to 00, since the message is 4 cycles long. In cycles 3–6, the four cycles' worth of command data 3511 and descriptor data 3509 for the first message are transmitted; D_flow_Ctrl 3613 is transmitted only on the first two cycles of the message, that is, cycles 3 and 4. Xfer_Ctrl 3613 is set to 10 again in cycle 5, and the first cycle of the second message will begin in cycle 7.

Transmission of flow control information to scheduler 3508 works in the same fashion as transmission of a two-cycle message, except that Xfer_Ctrl 3613 has the value 11 two cycles before the start of the flow control sequence. On cycle 3, the first 3 bits of the flow control information are transmitted on D_flow_Ctrl 3607 and on cycle 4, the second 3 bits are transmitted. Scheduler 3508 and QME 305 ignore the values on command data 3511 and descriptor data 3509.

Detailed Description of Buffer Management Engine 315 and Buffer Memory 229

The primary function of buffer management engine 315 is to manage the buffers 231 in buffer memory 229 in which protocol data units are stored from the time they are received in DCP 203 to the time they are transmitted from DCP 203. The following description will first describe the interface to buffer memory 229 which buffer management engine 315 presents to the packet processors and will then describe implementation details of the interface and the other functions performed by BME 315.

Figure 38:
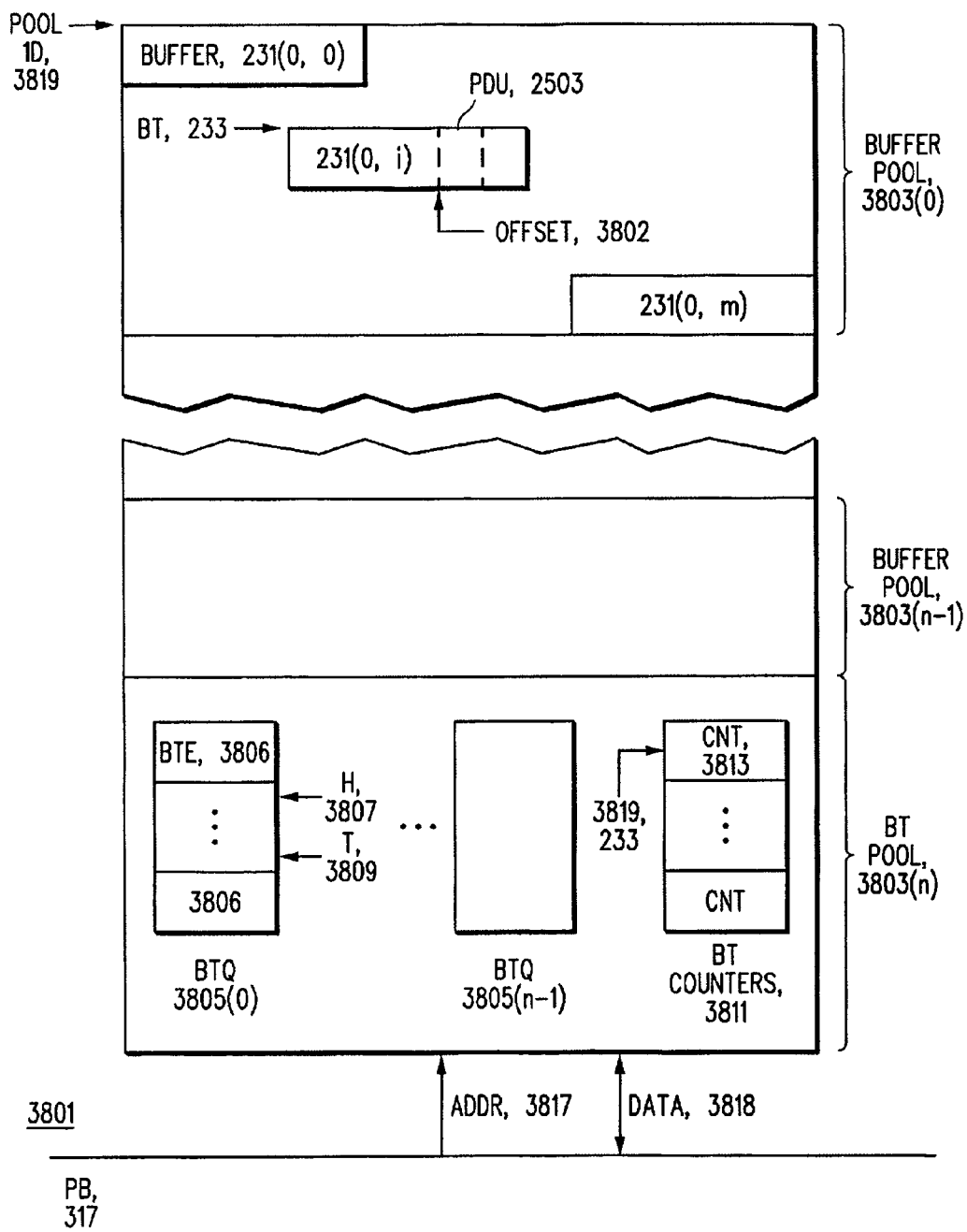
FIG. 38 is a logical overview of buffer management.

Logical Overview of BME 315: FIG. 38

FIG. 38 shows the interface to buffer memory 229 that is created by buffer management engine 315. Buffer memory 229 in a preferred embodiment may be divided into up to 32 buffer pools 3803. Where n is the number of pools, n−1 of these pools contain buffers 231, which in turn contain protocol data units 2503. The number and size of the n−1 pools and the number and size of the buffers 231 are determined when DCP 203 is initialized; a pool may have up to 64K buffers and all of the buffers 231 are of the same size, which in a preferred embodiment ranges from 64 bytes to 64 Kbytes. Each pool 2803 is identified by a pool ID 3819 and each buffer in the pool is identified by a buffer tag 233; within a buffer 233, locations are specified by offsets 3802; here, the offset specifies the beginning of PDU 3804. In a preferred embodiment, the offset specifies the beginning of a 16-byte chunk of data.

The $n^{th}$ buffer pool 2803 contains the buffer tags 233 for the buffers. There is a buffer tag queue 3805 for each of the n−1 buffer pools 2803. A buffer tag queue 3805(i) for a buffer pool 2803(i) contains buffer tag entries 3806 for each of the buffers 231 in buffer pool 283(i), and buffer tag entry 3806(i,j) for buffer 231 (i,j) contains buffer 231(i,j)'s buffer tag 233. Each queue 2805 has a pointer 3807 to the head of the queue and a pointer 3809 to the tail of the queue. The queues are set up when DCP 203 is initialized. When a receiving packet processor in DCP 203 needs buffer tags for buffers in a pool 2803(i), it receives them from the head of queue 3805(i); when a transmitting packet processor frees buffer tags, they are returned to the tail of queue 3805(i).

Of course, if a multicast command has placed descriptors with a given buffer tag 233(i,j) on more than one queue 215 in queue management engine 305, buffer tag 233(i,j) cannot be returned to the tail of queue 3805(i) until the last copy of buffer tag 233(i,j) has been returned. This problem is dealt with in a preferred embodiment by means of buffer tag counters 3811. There is an entry 3813 in buffer tag counters 3811 for each buffer tag which is in more than one queue 215 in QME 305, and the entry contains the count of queues that the buffer tag is presently in. The entry is addressable by pool ID and buffer tag.

When a receiving processor makes a multicast enqueue command for a descriptor, it sends a message to BME 315 indicating the number of queues the descriptor is in; the descriptor received by the transmitting packet processor includes the value of INC from DR 3111 for the transmission; when INC is greater than 0, the packet processor sends a counter decrement to BME 315 indicating that the counter for the BTAG in BT counters 3811 should be decremented; when the counter is decremented to 0, the buffer tag 233 is returned to the tail of its buffer tag queue 3805.

BME 315 receives commands for writing to buffers 231, reading from buffers 231, obtaining buffer tags, returning buffer tags, and setting and decrementing entries in BT counters from the packet processors via payload bus 317. The commands for reading from and writing to buffers have the form shown in at 3901 in FIG. 39. The fields have the following meanings:

CNT field 3903 indicates the number of valid, consecutive, 16 byte quantities in the transfer;

T# 3905 is used to distinguish among bus transactions by a given packet processor;

Pool ID 3907 identifies the buffer pool 3803(0 . . . n−1);

Offset 3909 specifies offset 3802 in the buffer identified by BTAG 3911; and BTAG 3911 identifies the buffer 231 being read or written.

Pool ID 3907, Offset5 3909, and BTAG 3911 together make up buffer address 3913. As will be explained in more detail in the following discussion of the payload bus, whether a command is a read or write command is determined from the payload bus cycle on which the command appears. Pool ID value 0 specifies BT pool 3803(*n*) and pool ID value 0x1F specifies commands for QME 305. With the read commands, QME 315 returns the specified amount of data from the specified buffer together with transaction # 3905 to the requesting packet processor. The requestor can thus use the transaction number to keep track of what request the returned data corresponds to.

A packet processor can perform the following BTAG read operations on the BTAGS 233 in BTAG pool 3803(*n*):
Allocate BTAGs 233; and
Read a BTAG 233's CNT entry 2813 in BT counters 211;
The BTAG write operations are:
Initialize BTAGs 233;
Deallocate a BTAG 233;
Set a counter for a BTAG 233 in counters 3811;
Decrement a counter for a BTAG 233

The form of these commands is shown at 3915. BT POOL ID 3907 indicates BTAG pool 3803(*n*), where a BTAG is specified, the BTAG is in BTAG field 3911, where a count is specified, it is in CNT 3903, and OFFSET 3909 contains a command value 3917 that specifies one of the BTAG commands and a pool ID 3919 specifying the buffer pool the BTAGs affected by the BTAG command belong to. Where the command requires a response, transaction number 3905 is returned with the response.

The fields are employed in the BTAG read commands as follows: in the allocation command, CNT 3903 indicates the number of BTAGs the packet processor issuing the command is requesting. Depending on the value, the requestor will receive 8, 16, 24, or 32 BTAGs 233 from the pool specified in pool ID 3919; BTAG field 3911 is of course ignored. BME 315 returns the BTAGs 233 to the requestor by means of a write to the requestor on the payload bus.

In the counter read command, CNT 3903 is set to 0, BTAG 3911 contains the BTAG 233 whose count value in BT counters is to be read, and pool ID 3919 contains the pool identifier 3819 for the pool 3803 that BTAG 233 belongs to. BME 315 returns the count value by means of a write to the requestor on the payload bus.

Continuing with the BTAG write commands, the initialization command is used to set the values of BTAGs 233 in BTEs 3806. In the command, CNT specifies the number of BTEs 3806 being initialized; possible numbers are 8, 16, 24, and 32. Pool ID 3919 specifies the pool 3803 the BTAGs 233 being initialized belong to and thus also the buffer tag queue 3805 that they are being written to.

The deallocation command returns a single BTAG 233 to BME 315 for reuse. In the command, pool ID 3919 specifies the buffer pool 3803 the BTAG 233 being returned belongs to and BTAG 3911 contains the BTAG 233.

In the counter commands, pool ID 3919 specifies the buffer pool ID for the BTAG 233 whose counter is being set or decremented and BTAG 3911 specifies the BTAG 233 itself; in the set counter command, CNT 3903 contains the value to which the counter is to be set. QME 315 responds to the set counter command by making a CNT entry 3813 in BT counters for the BTAG 233 and setting it to the value specified in the command. The set counter command is issued by the receiving packet processor when the receiving packet processor sends a multicast enqueue command to QME 305 with a descriptor for the PDU represented by BTAG 233. The decrement counter command is issued by each transmitting packet processor that transmits a protocol data unit that is being multicast when it has transmitted the PDU. When the counter being decremented reaches 0, the BTAG 233 that CNT 3813 belongs to is returned to the tail of BTQ 3805 for the BTAG 233's buffer pool and the entry for the BTAG in counters 3811 is invalidated.

Figure 40:
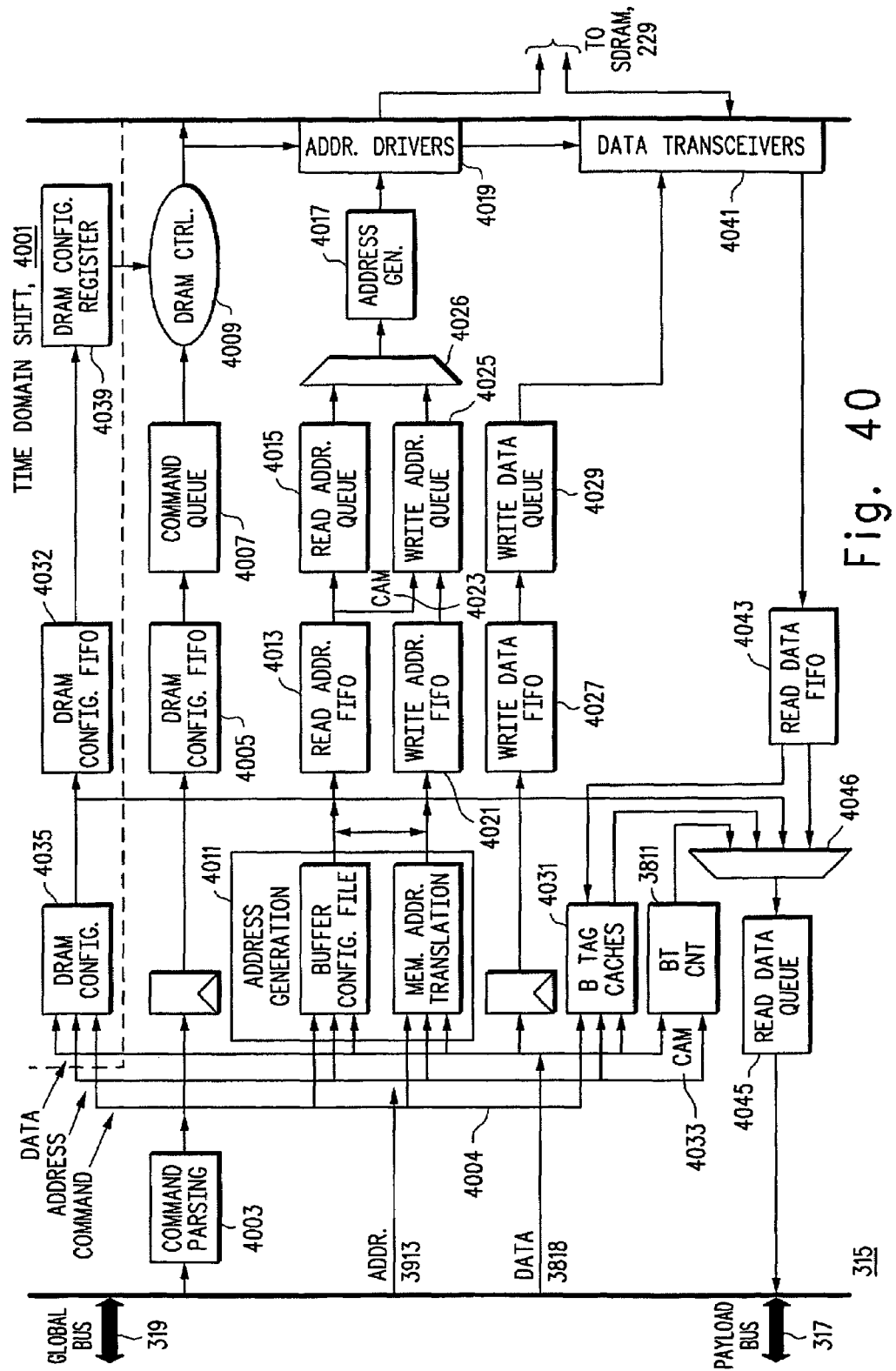
FIG. 40 shows details of the hardware of BME 305.
Figure 41:
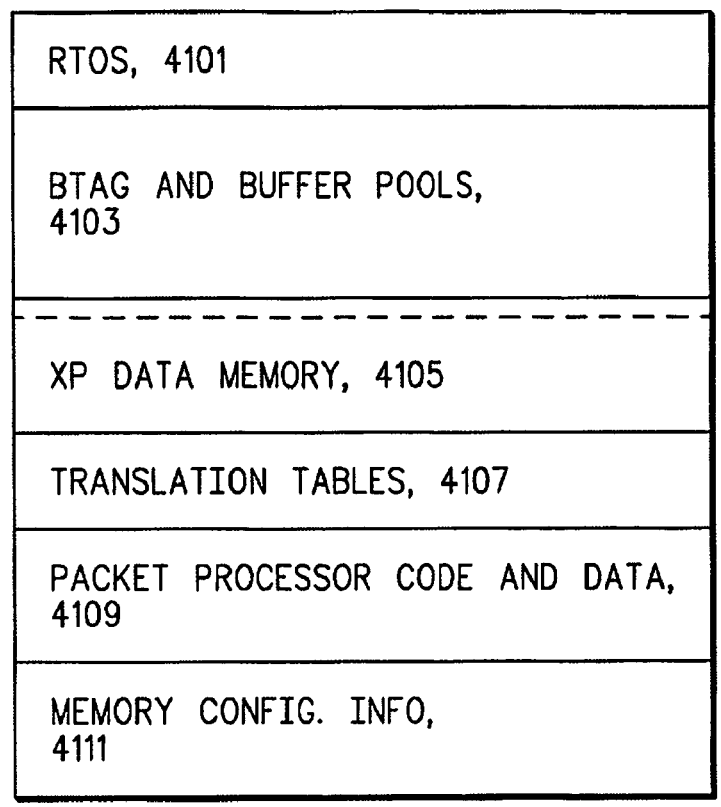
FIG. 41 shows details of the contents of SDRAM 229.

Details of the Implementation of BME 315: FIGS. 40 and 41

In addition to serving as the interface for writing to and reading from buffers 231 and for allocating and returning buffer tags 233, BME 315 serves as the general interface to SDRAM 229. FIG. 41 shows the contents of SDRAM 229. Besides BTAG and buffer pools 3803(0 . . . n) at 4103, SDRAM 229 contains:

memory configuration information 4111, which regulates the configuration of SDRAM 229;

packet processor code and data 4109, which contains code and data that XP 313 loads into the packet processors when DCP 203 is initialized; with the channel processors, the code and data includes the code and data used to initialize the serial data processors.

Translation tables 4107 contains the translation tables that XP 313 loads into translation table memory 207 on initialization of DCP 203;

RTOS 4101 is the code for the real-time operating system executed by XP 313; XP data memory 4105 contains the data used by XP 313 in executing RTOS 4101.

XP 313 fetches instructions from RTOS 4101 and XP data memory 4105 into IMEM 1503 and DMEM 1507 and 1508 as needed.

FIG. 40 is a block diagram of the hardware of BME 315 in a presently-preferred embodiment. BME 315 is coupled both to global bus 319 and payload bus 317. BME 315 receives and responds to BTAG and buffer commands via payload bus 317; it receives memory read requests from XP 313 on global bus 319 and responds to the read requests via payload bus 317. Initialization of the packet processors is done in the same fashion.

Each request for a transaction which BME 315 receives via these buses includes a command 4004 and an address 3913, and write commands also include data 3818. How the address is interpreted depends of course on the kind of command. Commands are parsed in command parser 4003. Commands to configure SDRAM 229 are treated differently from other commands; as shown at 4001, they go to DRAM configuration logic 4035, which passes the data to a configuration FIFO 4037, from whence the data is loaded into DRAM configuration registers 4030.

How other commands are handled depend on whether they are read or write commands or other commands. The other commands go to command FIFO; the addresses for read commands go to read address FIFO 4013; the addresses for write commands go to write address FIFO 4021, and the data goes to write data FIFO 4017; data being read in response to a command is output to READ DATA FIFO 4043; these FIFOs serve to provide the elasticity needed in the interface between DCP 293 and SDRAM 227. In the case of the addresses, address generation block 4011 translates the addresses used in the buffer and BTAG commands into the proper form for SDRAM 229; in order to do this, address generation block 4011 includes a buffer configuration file which specifies how the buffers 231 in SDRAM 229 are currently configured. As currently implemented, an address in SDRAM 2029 corresponding to a given buffer address 3913 is computed as follows:

SDRAM address=pool base address(pool ID)+
((Btag & Btag mask(pool ID))>>
Btag shift(poolID))CAT
((offset & offset mask(pool ID)))

From the FIFOS, the command, the read address, and the read address go to queues 4067, 4015, and 4025 respectively. The command at the head of queue 4067 is read by DRAM CTRL 4009, which interprets it as required by the current settings of DRAM configuration registers 4039 and provides the necessary control signals to mux 4025 and the address drivers 4019 and data transceivers 4041 for SDRAM 229.

The address at the head of read address queue 415 is read by address generator 4027, which provides the address to drivers 4019 and indicates a read operation. The address at the head of write address queue 4025 is read also read by address drivers 4019, which provides the address and a write command to address drivers 419. At the same time, the data at the head of write data queue 4029 is output to data transceivers 4041, so that it can be input to SDRAM 229. Address generator 4017 gives priority to read address queue 4015, since provision of PDUs to a transmitting packet processor is more time-critical than storing the PDUs in SDRAM 229.

To avoid the situation in which a read operation reads data that is waiting to be written in write data queue 4029 and consequently gets stale data, BME 315 includes a CAM 4023. When an address is written to the tail of write address queue 4025, an entry for the address is made in CAM 4023; when an address is written to the tail of read address queue 4015, it is also output to CAM 4023; if there is a match, the queue of addresses in write address queue 4025 is emptied before the next address in read address queue 4015 is read by address generator 4017.

BTAG caches 4031 contain BTAGS 233 from the head end of each of the BTAG queues 3805; the rest of the queue 3805 is in SDRAM 229. When a request for BTAGs 233 arrives from a packet processor, it is satisfied from BTAG caches 4031 if possible; otherwise, it is satisfied from the portion of the queue 3805 in SDRAM 229 and the BTAG cache for the queue is reloaded from the portion in queue 3805.

BTCNT 3811 implements BT counters 3811. The buffer tag count commands set, read, and decrement values in BTCNT 3811; each time a decrement BTAG command is received, the value of CNT in the BTAG's CNT entry is decremented as described above.

PDUs which are read from SDRAM 229 are output to read data FIFO 4043; the output from FIFO 4043, together with outputs from DRAM configuration 4035, BTAG caches 4031, and BT CNT 3811 all go to MUX 4046, which selects output to read data queue 4045, which in turn outputs to payload bus 317.

Figure 42:
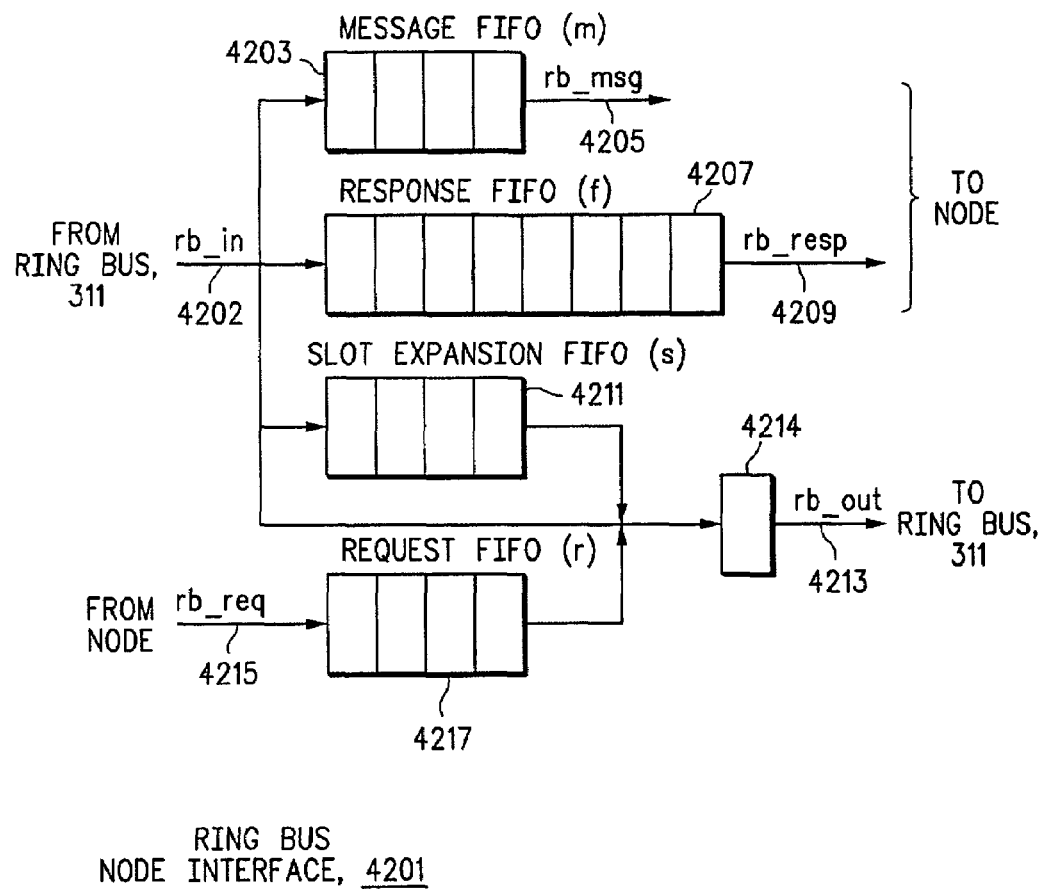
FIG. 42 shows details of the ring bus node interface.

Details of Ring Bus 311: FIGS. 28 and 42

Ring bus 311 is primarily used by the packet processors to send protocol data to TLE 301 for translation and receive the results of the translation from TLE 301. Ring bus 311 may, however, be used to send messages to and receive replies from any of the nodes on ring bus 311. The nodes in a preferred embodiment are the packet processors and TLE 301.

Ring bus 311 is designed to provide guaranteed access bandwidth and bounded latency for messages between the bus's nodes. The bus is 91 bits wide, with 27 bits for control information and 64 bits for the data being sent from the transmitting node to the receiving node. The bus is time-division multiplexed into a variable number of slots, with each slot comprising one core clock cycle. Each slot is passed from node to node in bucket brigade fashion. When the slot that is currently at a node is unoccupied (i.e., contains no ring bus message 2801), the node may write a message for one of the nodes in the slot (other embodiments may permit messages for multiple nodes to be written in a slot). The message then circulates from node to node until the destination node removes it from the slot.

Each node may have between one and five slots in ring bus 311 containing messages whose source is the node. If the node is not using more than one slot, those slots do not exist on ring bus 311. As may be seen from this description, the time required to transmit a message from one node to another on the bus varies with the number of messages on the bus, with the upper bound being the time required when each node has five slots containing messages on the ring node.

There are five types of messages 2801. The type of each message is indicated by the value of type field 2807 in the slot. The node that is the source of the message is indicated by SRC 2825 and the node that is the destination is indicated by DEST 2813. The types are:

unoccupied indication, used by the source to inquire whether the destination is responding to ring bus messages. The indication contains no data.

confirmation, used by the destination of an indication to respond to the source of the indication. The confirmation contains no data.

request, an unsolicited message with data upon which the destination is to operate and in some cases return a response message with the results of the operation to the source of the request.

response, a message which is sent by the destination of the request to the source of the request with the results of an operation performed by the destination for the source.

FIG. 42 shows ring bus interface 4201 which each node has to the ring bus. There are two FIFOs for messages whose destination is the node: FIFO 4203 contains request messages; FIFO 4209 contains response messages whose destination is the node; both FIFO 4203 and FIFO 4209 are read by the node. Overflow FIFO 4211 is used for messages whose source is the node that must continue to circulate on ring bus 311 because their destinations have not read them. When a message whose destination is the node arrives in the node, it is placed in the FIFO required by its type. If there is no room in that FIFO, the message continues to circulate.

The node outputs messages to ring bus 311 via buffer 4214, which receives messages from rbus_in 4202, overflow FIFO 4211, and request FIFO 4217, which contains request messages being sent by the node. If overflow FIFO 4211 is empty, when a message whose source is the node is received in the node, it is immediately placed in buffer 4214 for output in the slot in which it arrived; if overflow FIFO 4211 is not empty, the newly-received message whose source is the node is placed at the tail of overflow FIFO 4211 and the message at the head of overflow FIFO 4211 is placed in buffer 4214 for output in the slot in which the newly-arrived message arrived. If the newly-received message is empty and overflow FIFO 4211 is not full, the message at the head of request FIFO 4217 goes into the empty message's slot; otherwise, the message at the head of overflow FIFO 4211 goes into the slot. This mechanism ensures that a node can send new messages via ring bus 311 only if the other nodes are processing the messages it is sending. Indications and confirmations are handled at the hardware level by interface 4201 and are not enqueued.

The Global and Payload Buses

The following description of the implementation of these buses will begin with a description of the single bus structure used for both buses and will then describe the buses themselves in detail.

Figure 43:
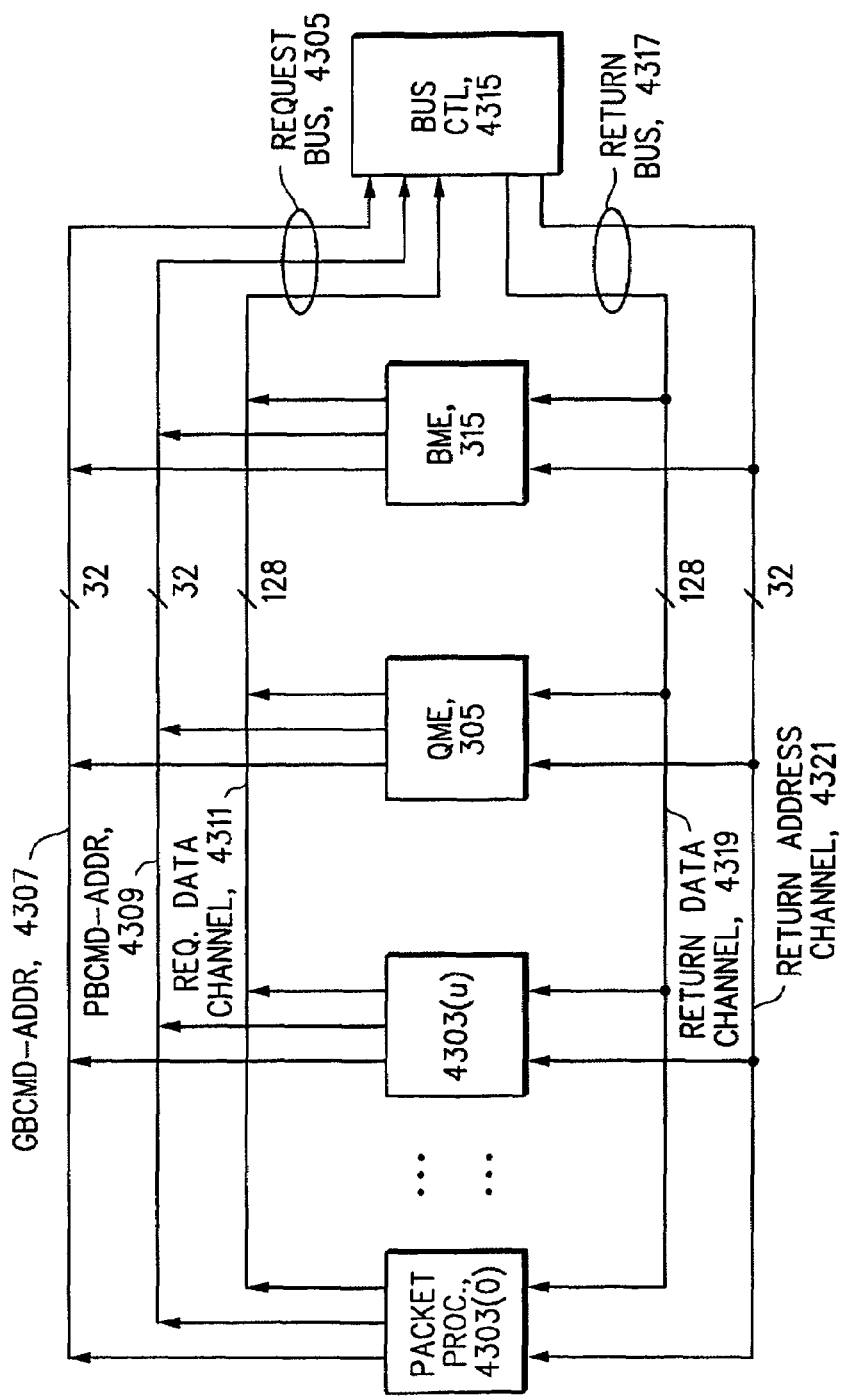
FIG. 43 shows a bus structure upon which global bus 319 and payload bus 317 are implemented.
Figure 44:
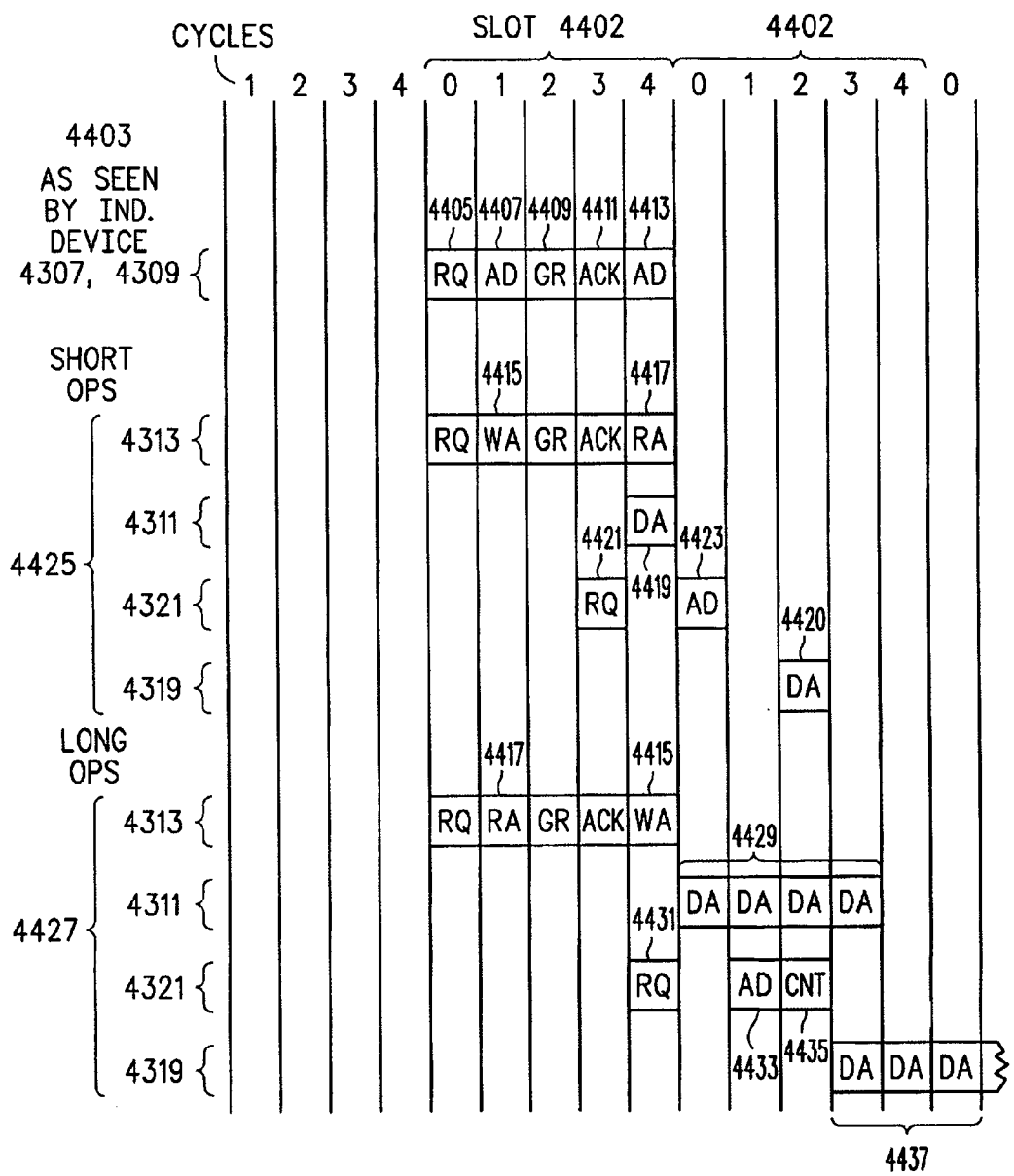
FIG. 44 shows long and short operations on the bus structure of FIG. 43.

The Request Bus and the Return Bus: FIGS. 43 and 44

In the preferred embodiment, global bus 319 and payload bus 317 are time-multiplexed onto a single underlying bus structure. The bus structure is shown at 4301 in FIG. 43. Bus structure 4301 is a slotted, multi-channel, shared, arbitrated bus that permits pipelined and overlapped operations. Each operation begins with a request that occupies a five clock cycle slot. The bus operates at a clock rate of 166 MHz. The packet processors 4303, BME 315, and QME 305 are all connected to the bus structure and will be termed herein bus nodes.

Bus structure 4301 has two parts, request bus 4305, which is used by bus nodes to make bus requests and provide addresses and data for the requests, and return bus 4317, which is used to return the results of a bus request to the requesting bus node. Request bus 4305 has three channels: two command/address channels for carrying commands and addresses, namely global bus command/address channel 4307 for carrying addresses and commands for global bus operations and payload bus command/address channel 4309 for carrying addresses and commands for payload bus operations, and a data channel 4311 for carrying the data for both global bus and payload bus operations. In the preferred embodiment, each of the command-address channels is 32 bits wide and data channel 4311 is 128 bits wide. Return bus 4317 has two channels, return address channel 4321, which carries a request and the address to which the return data is to be returned, and return data channel 4319, which carries the data being returned. Again, return address channel 4321 is 32 bits wide and return data channel 4319 is 128 bits wide. To perform a bus operation, a node which has access to a slot places the command and address required for the operation on one of the command-address channels 4307 and any data required for the operation on request data channel 4311. When an operation returns data to the requester, bus control 4315 places a request to the source of the return data on return address channel, followed by the address to which the return data is to be returned, and the source of the return data then places the data to be returned on return data channel 4319. Access by a node to bus structure 4301 is controlled by bus control 4315. As will be explained in more detail in the following, bus control 4315 provides each node with a guaranteed portion of the bandwidth of both request bus 4305 and return bus 4317.

FIG. 44 shows how a bus operation appears to a node. Each slot occupies five bus cycles. On a command-address channel 4307 or 4309, the information on the bus during the cycles of a slot is shown at 4402:

cycle 0: request 4405, specifying the operation;
cycle 1: address 4407, specifying an address for the operation;
cycle 2: bus grant 4409: bus control 4315 returns a signal during this cycle indicating which requesting node has received access;
cycle 3: acknowledgement 4411: if the operation specified in the preceding slot succeeded, bus control 4315 returns an acknowledgement signal in this cycle.
cycle 4: address 4413, specifying a second address for the operation.

As will be explained in more detail below, usage of the addresses is defined by the operation.

There are two general classes of operations that a node may perform with bus structure 4301: short operations, which transfer 4 bytes of data, and long operations, which transfer 64 bytes of data. In each of these classes, there is a read operation and a write operation. Within a given slot 4402, one packet processor 4303 may perform a read operation and another a write operation of the class. The short operations are specified on global bus command-address channel 4307 and the long operations on payload bus command-address channel.

In FIG. 44, the short operations are illustrated at 4425. In a short operation, the first address in slot 4402 during which the operation is requested on request command-address channel 4309 is write address 4415, if data is to be written in the operation and the last address is read address 4417, if data is to be read. With the write operation, the node that has been granted access to request bus 3305 places 4 bytes of data to be written to the address specified by the write address on request data channel 4311 in the fifth cycle of slot 4402.

With the short read operation, when bus controller 4315 has granted the bus for a read operation, it places a request 4421 for a node on return address channel 4321 in the fourth cycle of slot 4402. Bus controller 4315 places return address for the data 4423 on return address channel 4321 in the first cycle of the next slot 4402 and the node specified in request 4421 puts return data 4420 itself on return address channel 4321 in the third cycle of the next slot 4402.

The long operations are shown at 4427. During the cycles of slot 4402 in which a node requests a long operation, the node places read address 4417 for a long read operation on request address bus in cycle 1; the node places write address 4415 for a long write operation on request address bus in cycle 4. In the long write operation, if the node has been granted access, it places the 64 bytes of data 4429 to be written on request data channel 4311 in 16-byte chunks in cycles 1–4 of the next slot 4402. In the long read operation, if the node has been granted access, bus controller 4315 places a request specifying the responding node on return address channel 4321 in the fifth cycle of slot 4402; it places the address of the requesting node on return address channel 4321 in the first cycle of the next slot 4402; the responding node places a count value 4435 indicating the number of 16-byte chunks in the return data which are valid on return address channel 4321 in the second cycle of the next slot 4402, and the responding node places the return data 4437 on return data channel 4319 in 4 16-byte chunks beginning in the third cycle of the next slot 4402.

Figure 45:
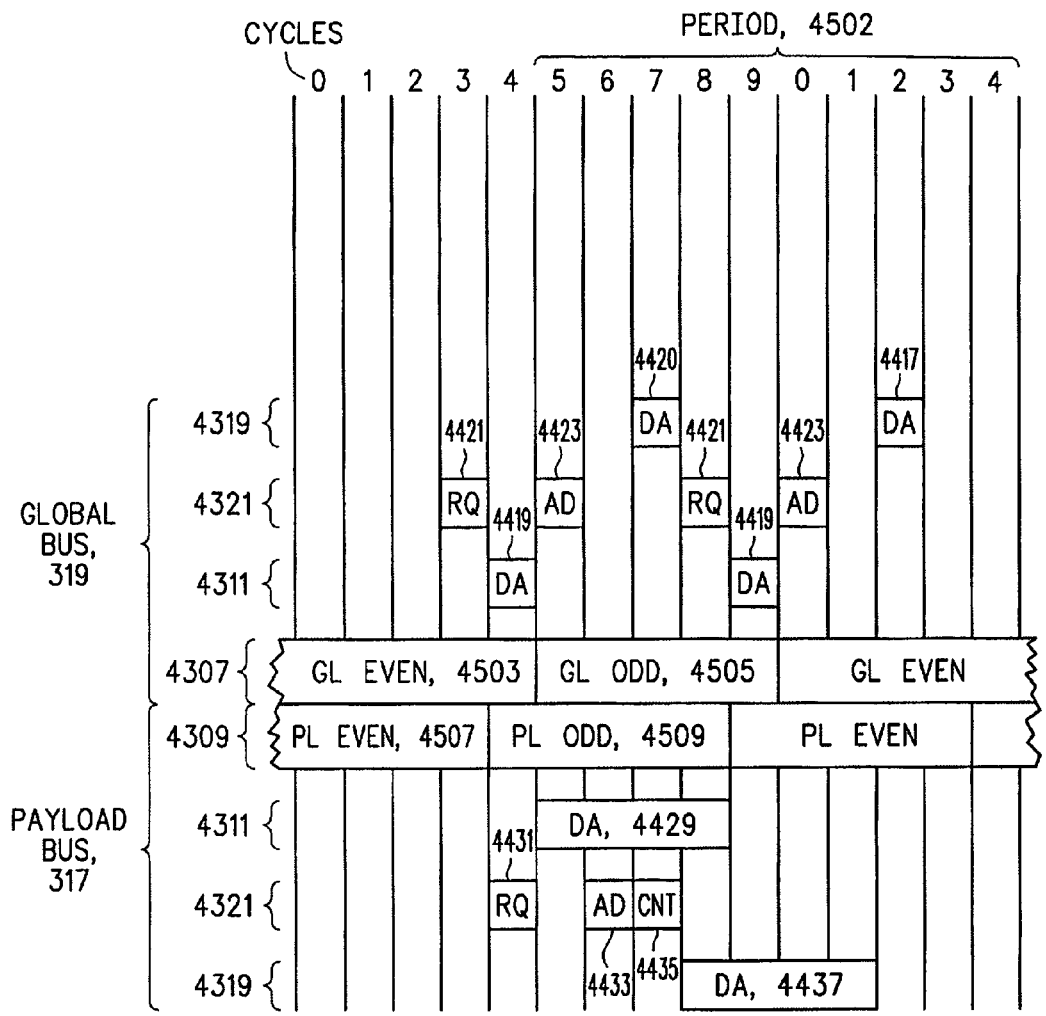
FIG. 45 shows details of the implementation of global bus 319 and payload bus 317.

Implementing Global Bus 319 and Payload Bus 317 on the Request and Return Buses: FIG. 45

FIG. 45 shows at 4501 how both global bus 319 and payload bus 317 are multiplexed onto bus structure 4301. As was apparent from FIG. 4, slot 4402 is five cycles long, while long data to be written 4429 and long data 4437 to be returned are each four cycles long and short data to be written 4419 and short data to be returned 4420 are each a single cycle long.

It is thus possible to overlap short operations and long operations on bus structure 4301 as shown in FIG. 45 and thereby to use four of every five cycles of request data channel 4311 for payload data and the fifth for global bus data and the same for return data channel 4319. In FIG. 45, the short operations which implement global bus 319 are shown in the top half of the figure; the long operations which implement global bus 317 are shown in the bottom half of the figure. As shown in the representations of request command-address channels 4307 and 4309 in the middle of the figure, payload slot 4507 begins one cycle earlier than global slot 4503; thus long data 4429 to be written for payload slot 4507 appears on request data channel 4311 between short data 4419 to be written for global bus slot 4503 and short data 4419 to be written for global bus slot 4505. Similarly, on return bus 4317, long return data 4437 to be returned for payload request 4509 appears on return data channel 4319 between short data to be returned for global request 4503 and short data to be returned for global request 4505.

Bus Access and Addressing on Global Bus 317: FIG. 45

FIG. 45 shows how the slots 4402 for global bus 319 and payload bus 317 are divided into even slots and odd slots. An even slot-odd slot pair makes up a ten-cycle period 4502. The even and odd slots correspond to even and odd groups of packet processors 4303. Membership in the groups is as follows:

| Packet processors 4303 | Group |
|---|---|
| Channel processors 307(15, 13, 11, 9, 7, 5, 3, 1) | Odd |
| Channel processors 307(14, 12, 10, 8, 6, 4, 2, 0) | Even |
| Executive processor 313 | Odd and Even |
| Fabric processor 303 TX | Odd and Even |
| Fabric processor 303 RX | Odd and even |

In each period 4502, four global bus transactions can be performed:
- in the even slot: a short read operation and a short write operation;
- in the odd slot: a short read operation and a short write operation.

There is a separate token for each of these types of transactions. The tokens are rotated in round-robin fashion among the packet processors in a group, with the packet processor which has the token for an operation having the highest priority for that operation in the group. If that packet processor does not request the transaction for which it has the token, the requesting packet processor nearest the token in ascending order is granted the bus. The maximum latency for a packet processor to receive access to the bus is 100 cycles. Slots for which no packet processor has a write request are used by queue management engine 305 to broadcast queue status reports 2915 to the packet processors.

In global bus transactions, read address 4417 and write address 4415 are flat 32-bit addresses. Address 4423 on return data channel 4319 is a valid bit, followed by a processor identifier identifying the recipient as one of the packet processors, BME 315, or QME 305.

Bus Access and Addressing on Payload Bus 317: FIG. 45

Bus access on payload bus 317 works as described above for global bus 319; again, each period 4502 is divided into an odd slot and an even slot, and the packet processors are assigned to odd and even slots as for the global bus. Again, within a single period 4502, there are slots for four payload bus transactions:
- in the even slot: a long read operation and a long write operation;
- in the odd slot: a long read operation and a long write operation.

Tokens are employed to determine priority among the packet processors as described for the global bus, except that there are no special arrangements for QME 305 or executive processor 313. As for addresses, the addresses for long read and write operations are the payload buffer commands shown in FIG. 39. The address for return payload data on return address channel 4321 is like that for return global data, except that it additionally includes a three-bit transaction number, which bus controller 4315 copies from transaction number 3905 in the payload buffer command for which data is being returned.

DCP 203 as a Generalized Data Stream Processor

While the foregoing discussion has disclosed how DCP 203 may be used in a packet switch, it will be apparent to those skilled in the pertinent arts that DCP 203 may be used in any application in which streams of data are being processed. By means of aggregation, DCP 203's channel processors 307 can be configured to handle data in serial bit streams, nybble streams, and byte streams, and fabric processor 303 can handle data in streams consisting of 32-bit words. TLE 301 provides a mechanism for storing and processing per-data stream context information and QME 305 provides a mechanism for passing information about payload contained in streams from the packet processor that receives the stream containing the payload to the packet processor that transmits the stream containing the payload, as well as to external units connected to QME 305. Fabric processor 303 permits DCP 203 to be connected to another DCP 203, to a parallel bus, or to a switching fabric, and thus permits the construction of large devices for processing data streams from a number of DCPs 203 and permits DCPs 203 to be combined with other devices for processing data streams.

Packet processors may be programmed to handle any kind of data stream. The combination of a programmable SDP 420 with a programmable CPRC 401 and a DMA engine in each packet processor permits separation of the operations of extracting control data in the stream from the stream's payload, processing the control data, and transferring the payload to BME 315. The use of data scopes within CPRC 401 to maintain information about the current state of processing of streams by SDP 420 and the DMA engine permits processing the control data to go on in parallel with movement of the payload between BME 315 and the SDP 420 and also enormously simplifies programming of CPRC 401. Transmit processors and receive processors in SDP 420 can be programmed to respond to patterns in the input stream and to bit counts, and the bypass provisions permit easy configuration of the transmit processors and receive processors to deal with different types of streams. Further flexibility is gained by the provisions for configuring an SDP to recirculate a stream, the provisions for aggregating channel processors to handle high-speed serial streams or streams consisting of nybbles or bytes, and the provisions for configuring the I/O pins to work with different types of transmission media.

DCP 203 deals with the timing constraints inherent in the processing of data streams by using a ring bus with guaranteed minimum latency for communication between packet processors and TLE 301, by using a slotted bus that transfers bursts of data for transfers of payload between BME 315 and the packet processors, transfers of buffer tags from BME 315 and to packet processors, and transfers of descriptors between the packet processors and QME 305. Coordination between the packet processors, QME 305, and BME 315 is attained by means of a global address space which permits access by these devices to each other's local memory. In the case of clusters of packet processors, members of the cluster have rapid access to each other's local memory.

CONCLUSION

The foregoing Detailed Description has disclosed to those skilled in the arts to which the invention pertains the best mode presently known to the inventors of employing their techniques for processing data streams to a digital communications processor integrated circuit which is designed to process and route packets. Those who are skilled in the relevant arts will immediately understand that individual features of the digital communications processor can be employed in contexts other than the one disclosed herein and may be combined in different ways from the ones disclosed herein. Those skilled in the relevant arts will further recognize that many different implementations of the features are possible. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. An integrated circuit comprising:
    a plurality of data stream inputs and/or outputs that receive and/or transmit streams of data;
    a plurality of data stream processors that process the streams of data, each data stream processor is programmable and being coupled to a data stream input and/or data stream output and each data stream processor processing a stream of data from the data stream input and/or output, the data stream processor is coupled to as the data stream is received from the data stream input and/or transmitted to the data stream output, each data stream processor including:
        a writeable instruction memory containing instructions, and
        a control data processor that controls the data stream processor by sequentially executing instructions from the writeable instruction memory; and
    the integrated circuit further comprising:
        an aggregator to perform receive aggregation to certain of the data stream processors that receive a data stream and to perform transmit aggregation to certain of the data stream processors that transmit a data stream, so that the aggregated data stream processors cooperate in processing a stream of data;
        a context processor that responds to information received from a given data stream processor that is processing a data stream to produce information about the given data stream's context and provide the context information to the given data stream processor;
    the given data stream processor using the context information to process the data stream; and
        wherein the integrated circuit being constructed on one chip.

2. The integrated circuit set forth in claim 1 wherein:
the control data processor is a general-purpose microprocessor that has an industry-standard architecture, whereby programs for the control data processor are developed using standard tools for the architecture.

3. The integrated circuit set forth in claim 1 wherein:
    the streams of data include a serial stream and a parallel stream.

4. The integrated circuit set forth in claim 1 wherein the aggregator comprises:
    configurable interconnections between the aggregated data stream processors;
    a configurable operation coordinator that coordinates operation of the aggregated data stream processors; and
    a writeable configurator that specifies the configurable interconnections and the configurable operation coordinator as required to aggregate the data stream processors.

5. The integrated circuit set forth in claim 1 wherein:
    a data stream input and/or output includes a plurality of I/O pins that receive and/or transmit signals and
    the integrated circuit further comprises:
        a writeable configuration specifier for specifying a configuration of a data stream input and/or output; and
        configuration circuitry coupled between the plurality of I/O pins and the data stream processor and responsive to the configuration specifier for configuring the data stream input and/or output as specified by the configuration specifier, whereby the integrated circuit may be used with a plurality of transmission protocols.

6. The integrated circuit set forth in claim 1 wherein each data stream processor further comprises:
    a receive processor that operates under control of the control data processor to process the data stream received from the data stream input and/or
    a transmit processor that operates under control of the control data processor to process the data stream for output to the data stream output.

7. The integrated circuit set forth in claim 6 wherein each of the receive processor or the transmit processor further comprises:
    a writeable instruction memory containing instructions; and
    the receive processor or the transmit processor sequentially executes certain of the instructions to process the data stream.

8. The integrated circuit set forth in claim 6 wherein:
    the receive processor and/or the transmit processor have a plurality of processing components and are configurable to bypass one or more of the components in processing the data streams.

9. The integrated circuit set forth in any one of claims 1 through 8 wherein:
    a stream of data contains control data and payload;
    a received stream of data is processed in a receiving data stream processor to extract the control data and the payload and a transmitted stream of data is processed in a transmitting data stream processor to add control data to the payload; and
    the integrated circuit further comprises
    a buffer manager coupled to the data stream processors that provides addresses of buffers for storing payload and responds to a write operation with a buffer address to write payload to the addressed buffer and to a read operation with a buffer address to read payload from the addressed buffer; and
    a queue manager coupled to the data stream processors that manages queues of descriptors of payload, each descriptor including at least a buffer address, the queue manager responding to an enqueue command by enqueuing a descriptor provided with the command to a queue specified in the command and responding to a dequeue command by dequeuing a descriptor from the queue specified in the command, a data stream processor responding to a received stream of data by performing a write operation to the buffer manager with the received data stream's payload and an address provided by the buffer manager and performing an enqueue operation with a descriptor containing the address and transmitting a stream of data by performing a dequeue operation, using the address in a descriptor obtained as a result of the dequeue operation in a read operation to the buffer manager, producing a data stream using the payload received from the buffer manager, and transmitting the produced data stream.

* * * * *